US00RE38479E

(19) United States
(12) Reissued Patent
Henkin et al.

(10) Patent Number: US RE38,479 E
(45) Date of Reissued Patent: Mar. 30, 2004

(54) POSITIVE PRESSURE AUTOMATIC SWIMMING POOL CLEANING SYSTEM

(76) Inventors: Melvyn L. Henkin, 1001 Sharon La., Ventura, CA (US) 93001; Jordan M. Laby, 1389 Beachmont, Ventura, CA (US) 93001

(21) Appl. No.: 10/193,370

(22) PCT Filed: Dec. 23, 1998

(86) PCT No.: PCT/US98/27623

§ 371 (c)(1),
(2), (4) Date: Jun. 26, 2000

(87) PCT Pub. No.: WO99/33582

PCT Pub. Date: Jul. 8, 1999

Related U.S. Patent Documents

Reissue of:
(64) Patent No.: 6,365,039
Issued: Apr. 2, 2002
Appl. No.: 09/582,456
Filed: Dec. 23, 1998

(51) Int. Cl.[7] ..... E04H 4/16

(52) U.S. Cl. ..... 210/103; 210/138; 210/169; 210/416.2; 210/242.1; 15/1.7; 134/167 R; 134/168 R

(58) Field of Search ..... 210/103, 138, 210/169, 416.2, 242.1, 459, 460; 15/1.7; 134/166 R, 167 R, 168 R, 198; 4/490

(56) References Cited

U.S. PATENT DOCUMENTS

| | | | | | |
|---|---|---|---|---|---|
| 4,129,904 | A | * | 12/1978 | Pansini | 4/490 |
| 4,569,361 | A | * | 2/1986 | Frentzel | 134/167 R |
| 4,589,986 | A | * | 5/1986 | Greskovics et al. | 210/483 |
| 4,652,366 | A | * | 3/1987 | Brooks | 210/169 |
| 4,749,478 | A | * | 6/1988 | Brooks | 210/169 |
| 4,776,954 | A | * | 10/1988 | Brooks | 210/169 |
| 4,778,599 | A | * | 10/1988 | Brooks | 210/780 |
| 4,839,063 | A | * | 6/1989 | Brooks | 210/780 |
| 5,985,156 | A | * | 11/1999 | Henkin et al. | 210/744 |
| 6,039,886 | A | * | 3/2000 | Henkin et al. | 210/776 |

* cited by examiner

*Primary Examiner*—Fred G. Prince
(74) *Attorney, Agent, or Firm*—Freilich, Hornbaker & Rosen

(57) ABSTRACT

A method and apparatus responsive to a positive pressure water source (10) for cleaning the interior surface of a pool containment wall (3) and the upper surface (7) of a water pool (1) contained therein. The apparatus includes an essentially unitary cleaner body (6) and a level control subsystem (124, 138) for selectively moving the body (6) to a position either proximate to the surface (7) of the water pool for water surface cleaning or proximate to the interior surface (8) of the containment wall for wall surface cleaning. The cleaner body can have a weight/buoyancy characteristic to cause it to normally rest either (1) proximate to the pool bottom adjacent to the wall surface (i.e., heavier-than-water) or (2) proximate to the water surface (i.e. lighter-than-water).

32 Claims, 32 Drawing Sheets

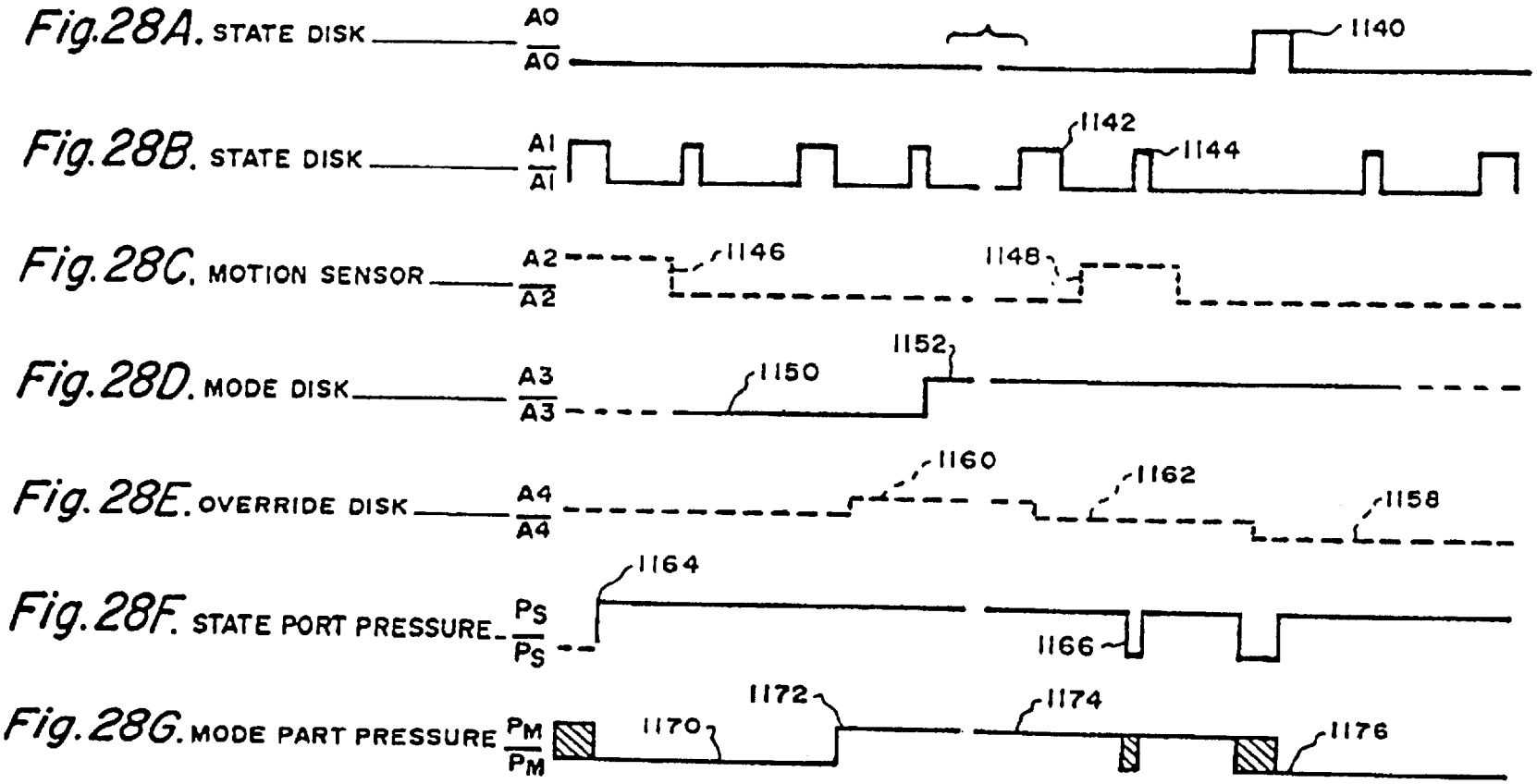
Fig.28A. STATE DISK
Fig.28B. STATE DISK
Fig.28C. MOTION SENSOR
Fig.28D. MODE DISK
Fig.28E. OVERRIDE DISK
Fig.28F. STATE PORT PRESSURE
Fig.28G. MODE PART PRESSURE

POSITIVE PRESSURE AUTOMATIC SWIMMING POOL CLEANING SYSTEM

Matter enclosed in heavy brackets [ ] appears in the original patent but forms no part of this reissue specification; matter printed in italics indicates the additions made by reissue.

FIELD OF THE INVENTION

The present invention relates to a method and apparatus powered from the pressure side of a pump for cleaning a water pool, e.g., swimming pool.

BACKGROUND OF THE INVENTION

The prior art is replete with different types of automatic swimming pool cleaners. They include water surface cleaning devices which typically float at the water surface and skin floating debris therefrom. The prior art also shows pool wall surface cleaning devices which typically rest at the pool bottom and can be moved along the wall (which term should be understood to include bottom and side portions) for wall cleaning, as by vacuuming and/or sweeping. Some prior art assemblies include both water surface cleaning and wall surface cleaning components tethered together.

SUMMARY OF THE INVENTION

The present invention is directed to a method and apparatus driven by a positive pressure water source for cleaning the interior surface of a pool containment wall and the upper surface of a water pool contained therein.

Apparatus in accordance with the invention includes: (1) an essentially rigid unitary structure, i.e., a cleaner body, capable of being immersed in a water pool and (2) a level control subsystem for selectively moving the body to a position either (1) proximate to the surface of the water pool for water surface cleaning or (2) proximate to the interior surface of the containment wall for wall surface cleaning.

The invention can be embodied in a cleaner body having a weight/buoyancy characteristic to cause it to normally rest either (1) proximate to the pool bottom adjacent to the wall surface (i.e., heavier-than-water) or (2) proximate to the water surface (i.e., lighter-than-water). With the heavier-than-water body, the level control subsystem in an active state produces a vertical force component for lifting the body to proximate to the water surface for operation in a water surface cleaning mode. With the lighter-than-water body, the level control subsystem in an active state produces a vertical force component for causing the body to descend to the wall surface for operation in the wall surface cleaning mode.

A level control subsystem in accordance with the invention can produce a desired vertical force component using one or more of various techniques, e.g., by discharging an appropriately directed water outflow from the body, by modifying the body's weight/buoyancy characteristic, and by orienting hydrodynamic surfaces or adjusting the pitch of the body.

Embodiments of the invention preferably also include a propulsion subsystem for producing a nominally horizontal (relative to the body) force component for moving the body along (1) a path adjacent to the water surface when the body is in the water surface cleaning mode and (2) a path adjacent to the wall surface when the body is in the wall surface cleaning mode. When in the water surface cleaning mode, debris is collected from the water surface, e.g., by skimming either with or without a weir. When in the wall surface cleaning mode, debris is collected from the wall surface, e.g., by suction.

Embodiments of the invention are configured to be hydraulically powered, from the positive pressure side of an external hydraulic pump typically driven by an electric motor. This pump can comprise a normally available water circulation pump used alone or in combination with a supplemental booster pump. Proximal and distal ends of a flexible supply hose are respectively coupled to the pump and cleaner body for producing a water supply flow to the body for powering the aforementioned subsystems. The hose is preferably configured with portions having a specific gravity>0.1 so that it typically lies at the bottom of the pool close to the wall surface with the hose distal end being pulled along by the movement of the body.

In preferred embodiments of the invention, the water supply flow from the pump is distributed by one or more control elements (e.g., valves) to, directly or indirectly, create water flows for producing vertical and horizontal force components for affecting level control and propulsion. A preferred propulsion subsystem is operable in either a normal state to produce a force component for moving the body in a first direction, e.g., forward, or a redirection (e.g.,backup) state to produce force components acting to move the body in a second direction, e.g., lateral and/or rearwardly. Water surface cleaning and wall surface cleaning preferably occur during the normal propulsion state. The redirection propulsion state assists the body in freeing itself from obstructions.

In a preferred heavier-than-water embodiment, a water distribution subsystem carried by the cleaner body selectively discharges water flows via the following outlets:

1. forward thrust jet
2. redirection or rearward ("backup") thrust jet
3. forward thrust/lift jet
4. vacuum jet pump nozzle
5. skimmer jets
6. debris retention jets
7. sweep hose
8. front chamber fill The water flows discharged from these outlets produce force components which primarily determine the motion and orientation of the body. However, the actual motion and orientation at any instant in time is determined by the net effect of all forces acting on the body. Additional forces which effect the motion and orientation are attributable, inter alia, to the following:

a. the weight and buoyancy characteristics of the body itself
b. the hydrodynamic effects resulting from the relative movement between the water and body
c. the reaction forces attributable to sweep hose action
d. the drag forces attributable to the supply hose, debris container, etc.
e. the contact forces of cleaner body parts against the wall surface and other obstruction surfaces A preferred cleaner body in accordance with the invention is comprised of a chassis supported on a front wheel and first and second rear wheels. The wheels are mounted for rotation around horizontally oriented axles. The chassis is preferably configured with a nose portion proximate to the front wheel and front shoulders extending rearwardly therefrom. The shoulders taper outwardly from the nose portion to facilitate deflection off obstructions and to minimize drag as the body moves forwardly through the water. Side rails extending rearwardly from the outer ends of the shoulders preferably taper inwardly toward a tail portion to facilitate movement of the body past obstruction surfaces, particularly in the water surface cleaning mode.

The body is preferably configured so that, when at rest on a horizontal portion of the wall surface, it exhibits a nose-down, tail-up attitude. One or more hydrodynamic surfaces, e.g., a wing or deck surface, is formed on the body to create a vertical force component for maintaining this attitude as the body moves through the water along a wall surface in the wall surface cleaning mode. This attitude facilitates hold down of the traction wheels against the wall surface and properly orients a vacuum inlet opening relative to the wall surface. When in the water surface cleaning mode, a hydrodynamic surface preferably rises above the water surface thereby reducing the aforementioned vertical force component and allowing the body to assume a more horizontally oriented attitude in the water surface cleaning mode. This attitude facilitates movement along the water surface and/or facilitates skimming water from the surface into a debris container.

A preferred cleaner body in accordance with the invention is configured with a hollow front fin extending above the water surface when the body is operating in the water surface cleaning mode. The fin has an interior chamber which can be water filled to provide a downward weight to help stabilize the operating level of the body near the water surface. In the wall surface cleaning mode, the water filled fin has negligible effect when the body is submerged but when the body climbs above the water surface, the weight of the filled fin creates a vertical downward force tending to cause the body to turn and re-enter the water.

A preferred cleaner body in accordance with the invention carries a water permeable debris container. In the water surface cleaning mode, water skimmed from the surface flows through the debris container which removes and collects debris therefrom. In the wall surface cleaning mode, water from adjacent to the wall surface is drawn into the vacuum inlet opening and directed through the debris container which removes and collects debris from the wall surface.

The debris container, in one embodiment, comprises a main bag formed of mesh material extending from a first frame. The first frame is configured to be removably mounted on the chassis and defines an open mouth for accepting (1) surface water flowing over a skim deck when in the water surface cleaning mode and (2) outflow from a vacuum path discharge opening when in the wall surface cleaning mode. In accordance with a significant feature of a preferred embodiment, the debris container may also include a second water permeable bag interposed between the vacuum path discharge opening and the aforementioned main bag. The second or inner bag is preferably formed of a finer mesh than the main bag and functions to trap silt and other fine material. The inner bag is preferably formed by a length of mesh material rolled into an essentially cylindrical form closed at one end and secured on the other end to a second frame configured for mounting adjacent to said vacuum path discharge opening. The edges of the mesh material are overlapped to retain fine debris in the inner bag.

The debris container, in another embodiment, comprises a main bag formed of mesh material containing one or more sheets or flaps configured to readily permit water borne debris to flow therepast into the bag but prevent such debris from moving past the sheets in the opposite direction. More specifically, first and second sheets of flexible mesh material are mounted in the bag such that one edge of the first sheet lies proximate to one edge of the second sheet. When the body is moving in its forward direction, pool water flowing into the bag acts to separate the sheet edges to enable debris to move past the edges into the bag. When the body is moving in a direction other than forward, e.g., rearward or laterally, water flow through the bag toward the mouth of the bag acts to close the sheet edges to prevent debris from leaving the bag.

The operating modes of the level control subsystem (i.e., (1) water surface and (2) wall surface) are preferably switched automatically in response to the occurrence of a particular event, such as (1) the expiration of a time interval, (2) the cycling of the external pump, or (3) a state change of the propulsion subsystem (i.e., (1) normal forward and (2) backup rearward). The operating states of the propulsion subsystem (i.e., (1) normal forward and (2) backup rearward) are preferably switched automatically in response to the occurrence of a particular event such as the expiration of a time interval and/or the interruption of body motion.

In a first disclosed embodiment (e.g., FIGS. 2, 3) using a heavier-than-water body, the level control subsystem in an active state produces a water outflow from the body in a direction having a vertical component sufficient to lift the body to the water surface for water surface cleaning.

In a second heavier-than-water embodiment (e.g., FIG. 17), the body is configured with at least one chamber which is selectively evacuated by an on-board water driven pump when the body is at the water surface to enable outside air to be pulled into the chamber to increase the body's buoyancy and stability.

In a third heavier-than-water embodiment (e.g., FIG. 18), a body chamber contains an air bag coupled to an on-board air reservoir. When in a quiescent state, the chamber is water filled and the air bag is collapsed. In order to lift the body to the water surface, an on-board water driven pump pulls water out of the chamber enabling the air bag to expand to thus increase the body's buoyancy and allow it to float to the water surface.

In a fourth embodiment (e.g. FIG. 19), the body is configured with at least one chamber which contains a bag filled with air when in its quiescent state. The contained air volume is sufficient to float the body to the water surface. In order to sink the body to the wall surface, the level control subsystem in its active state supplies pressurized water to fill the chamber and collapse the bag, pushing the contained air under pressure into an air reservoir.

Preferably all of the embodiments include a level override control for enabling a user to selectively place the level valve in either the wall surface cleaning mode or the water surface cleaning mode.

Although multiple specific embodiments of cleaner bodies and level and propulsion control subsystems in accordance with the invention are described herein, it should be recognized that many alternative implementations can be configured in accordance with the invention to satisfy particular operational or cost objectives. For example only, selected features from two or more embodiments may be readily combined to configure a further embodiment.

Among the more significant features is the inclusion of a motion sensor mechanism (e.g., FIGS. 21, 22) to sense when the rate of forward motion of the cleaner body diminishes below a certain threshold. This can occur, for example, when the body gets trapped behind an obstruction. By sensing the motion decrease, a redirection state can be initiated to move the body laterally and/or rearwardly to free it of the obstruction. This motion sensing feature has potential application in various types of pool cleaners regardless of whether they operate at both the water surface and wall surface. In accordance with a preferred embodiment, the motion sensor operates in conjunction with a periodic control device which alternately defines first and second conditions. Redirection is initiated when two conditions occur concurrently; i.e., the period control device defining the second condition and the motion sensor indicating that forward motion has diminished below the threshold.

In accordance with another significant feature, redirection is preferably accomplished by discharging the output of a jet pump (e.g., FIG. 22) in a direction substantially laterally with respect to the body.

In accordance with a further useful feature, a presdure indicator carried by the body is preferably coupled to the water distribute system to indicate to a user whether the pressure magnitude being delivered to the body is within an acceptable operating range.

In accordance with a still further feature (e.g., FIGS. 29, 32), a pitch control subsystem is carried by the body to selectively orient the body's pitch to either (1) nose (i.e., front) up/tail (i.e., rear) down or (2) nose down/tail up. By selectively orienting the pitch of the body and providing forward propulsion, as from a single jet, the body can be driven either up to the water surface or down to the wall surface. The pitch control subsystem can be implemented by shifting weight and/or buoyancy between the front and rear of the body.

BRIEF DESCRIPTION OF THE DRAWINGS

FIG. 28 is a timing chart describing the operation of the controller assembly of FIG. 23;

DESCRIPTION OF PREFERRED EMBODIMENTS

Figure 1:
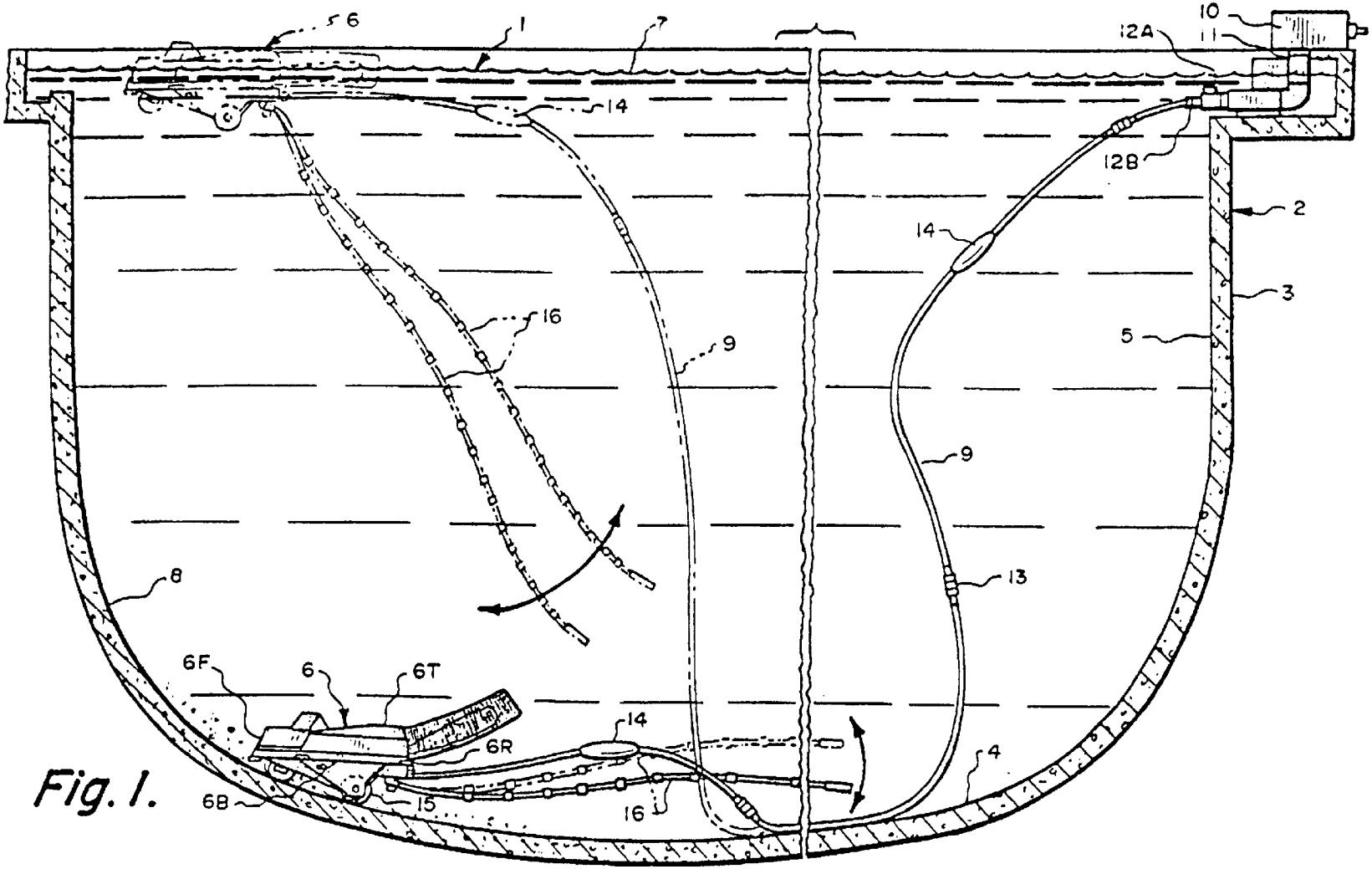
FIG. 1 schematically depicts a positive pressure driven cleaner in accordance with the invention in a water pool operating respectively in (1) a water surface cleaning mode (dashed line) and (2) a wall surface cleaning mode (solid line)

With reference to FIG. 1, the present invention is directed to a method and apparatus for cleaning a water pool 1 contained in an open vessel 2 defined by a containment wall 3 having bottom 4 and side 5 portions. Embodiments of the invention utilize a unitary structure or body 6 configured for immersion in the water pool 1 for selective operation proximate to the water surface 7 in a water surface cleaning mode or proximate to the interior wall surface 8 in a wall surface cleaning mode.

The unitary body 6 preferably comprises an essentially rigid structure having a hydrodynamically contoured exterior surface for efficient travel through the water. Although the body 6 can be variously configured in accordance with the invention, it is intended that it be relatively compact in size, preferably fitting within a two foot cube envelope. FIG. 1 depicts a heavier-than-water body 6 which in its quiescent or rest state typically sinks to a position (represented in solid line) proximate to the bottom of the pool 1. For operation in the water surface cleaning mode, a vertical force is produced to lift the body 6 to proximate to the water surface 7 (represented in dash line). Alternatively, body 6 can be configured to be lighter-than-water such that in its quiescent or rest state, it floats proximate to the water surface 7. For operation in the wall surface cleaning mode, a vertical force is produced to cause the lighter-than-water body to descend to the pool bottom. In either case, the vertical force is produced as a consequence of a positive pressure water flow supplied via flexible hose 9 from an electrically driven motor and hydraulic pump assembly 10. The assembly 10 defines a pressure side outlet 11 preferably coupled via a pressure/flow regulator 12A and quick disconnect coupling 12B to the flexible hose 9. The hose 9 is preferably formed of multiple sections coupled in tandem by hose nuts and swivels 13. Further, the hose is preferably configured with appropriately placed floats 14 and distributed weight so that a significant portion of its length normally rests on the bottom of wall surface 8.

As represented in FIG. 1, the body 6 generally comprises a top portion or frame 6T and a bottom portion or chassis 6B, spaced in a nominally vertical direction. The body also generally defines a front or nose portion 6F and a rear or tail portion 6R spaced in a nominally horizontal direction. The body is supported on a traction means such as wheels 15 which are mounted for engaging the wall surface 8 when operating in the wall surface cleaning mode.

Embodiments of the invention are based, in part, on a recognition of the following considerations:

1. Inasmuch as most debris initially floats on the water surface, prior to sinking to the wall surface, the overall cleaning task can be optimized by cleaning the water surface to remove debris before it sinks.

2. A water surface cleaner capable of floating or otherwise traveling to the same place that debris floats to can capture debris more effectively than a fixed position skimmer.

3. The water surface can be cleaned by skimming with or without a weir, by a water entrainment device, or by scooping up debris as the cleaner body moves across the water surface. The debris can be collected in a water permeable container.

4. A single essentially rigid unitary structure or body can be used to selectively operate proximate to the water surface in a water surface cleaning mode and proximate to the wall surface in a wall surface cleaning mode.

5. The level of the cleaner body in the water pool, i.e., proximate to the water surface or proximate to the wall surface, can be controlled by a level control subsystem capable of selectively defining either a water surface mode or a wall surface mode. The mode defined by the subsystem can be selected via a user control, e.g., a manual switch or valve, or via an event sensor responsive to an event such as the expiration of a time interval.

6. The movement of the body in the water pool can be controlled by a propulsion subsystem, preferably operable to selectively propel the body in either a forward or rearward direction. The direction is preferably selected via an event sensor which responds to an event such as the expiration of a time interval or an interruption of the body's motion.

7. A cleaning subsystem can be operated in either a water surface cleaning mode (e.g., skimming) or a wall surface cleaning mode (e.g., vacuum or sweeping).

8. The aforementioned subsystems can be powered by a positive pressure water flow supplied preferably by an electrically driven hydraulic pump.

As will be explained in greater detail hereinafter, in typical operation, the body 6 alternately operates in (1) a water surface cleaning mode to capture floating debris and (2) a wall surface cleaning mode in which it travels along bottom and side wall portions to clean debris from the wall surface 8. The body 6 preferably tows a flexible hose 16 configured to be whipped by a water outflow from a nozzle at its free end to sweep against the wall surface 8.

Four exemplary embodiments of the invention will be described hereinafter. The first three of these embodiments will be assumed to have a weight/buoyancy characteristic to cause it to normally rest proximate to the bottom of pool 1 adjacent to the wall surface 8 (i.e., heavier-than-water). The fourth embodiment (FIGS. 19A, 19B, 19C) will be assumed to have a characteristic to cause it to rest (i.e., float) proximate to the water surface 7 (i.e., lighter-than-water).

With a heavier-than-water embodiment, an on-board level control subsystem in an active state produces a vertical force component for lifting the body to proximate to the water surface 7 for operation in a water surface cleaning mode. With a lighter-than-water embodiments, the level control subsystem in an active state produces a vertical force component for causing the body to descend to the wall surface 8 for operation in the wall surface cleaning mode.

FIRST EMBODIMENT (FIGS. 2–16)

Figure 2:
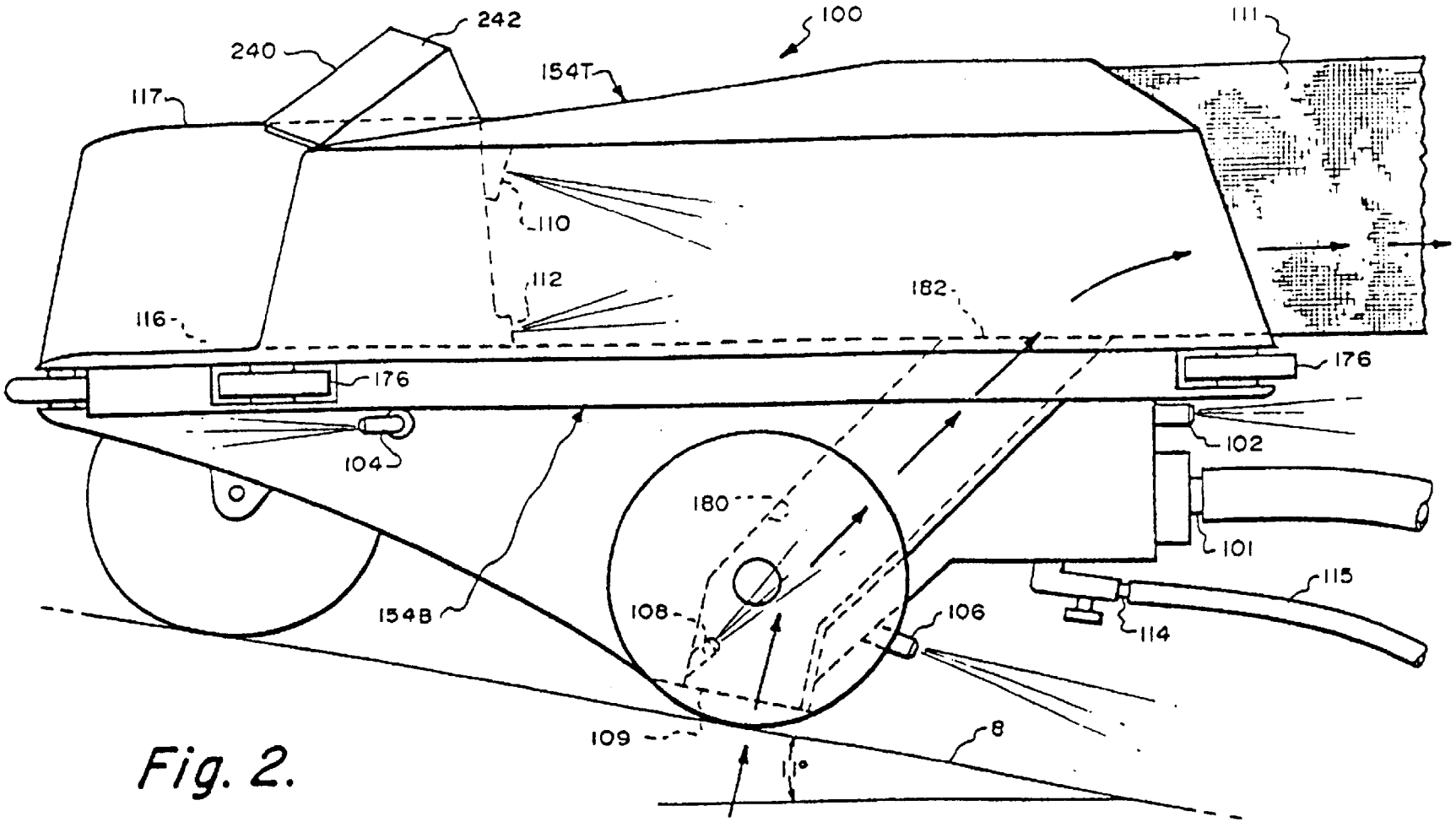
FIG. 2 schematically depicts a side view of a first cleaner body in accordance with the invention showing multiple water flow outlets which are selectively activated to enable the cleaner to operate in the water surface or wall surface cleaning mode and forward or backup state.
Figure 9:
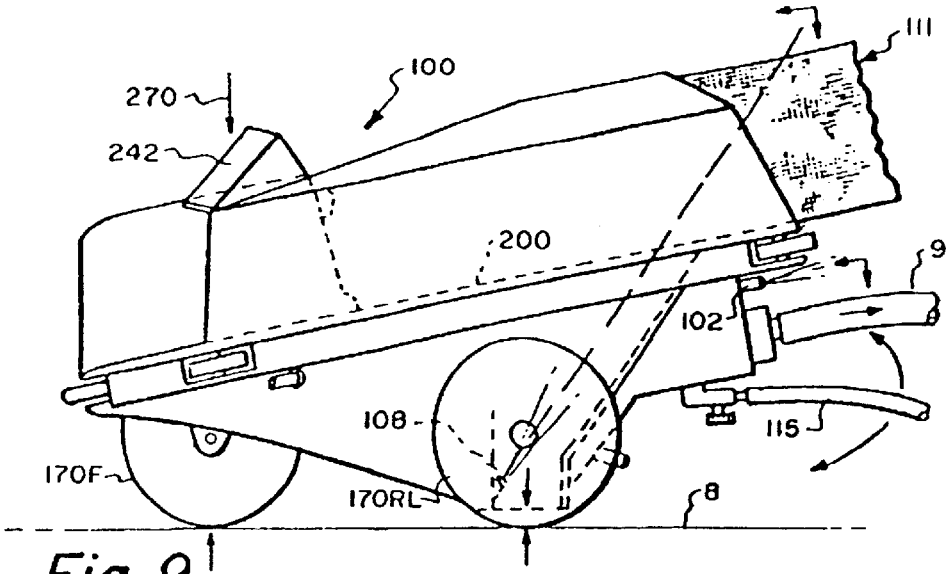
FIG. 9 is a side view similar to FIG. 2 particularly showing the water flow outlets active during the wall surface cleaning mode.
Figure 10:
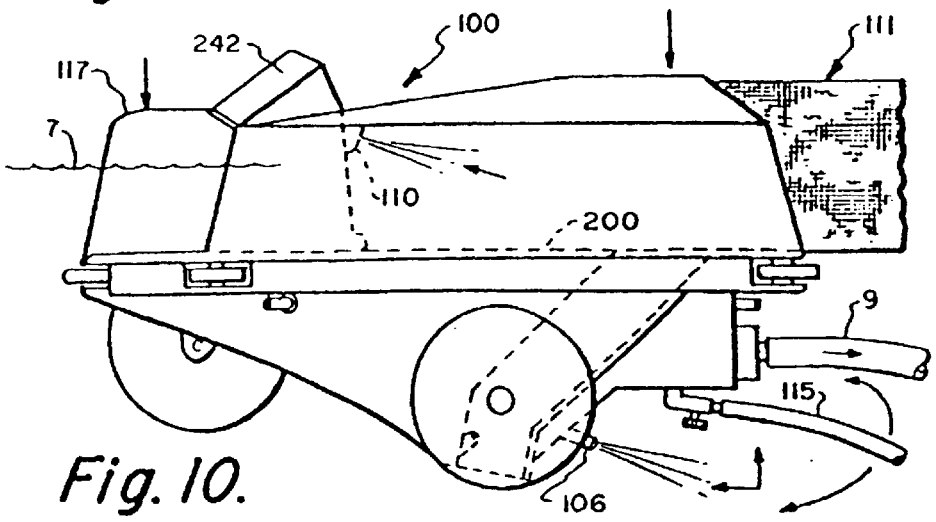
FIG. 10 is a side view similar to FIG. 2 particularly showing the water flow outlets active during the water surface cleaning mode.

Attention is now directed to FIG. 2 which schematically depicts a first embodiment comprised of a unitary body 100 having a positive pressure water supply inlet 101 and multiple water outlets which are variously used by the body 100 in its different modes and states. The particular outlets active during particular modes and states are represented in FIGS. 9, 10 and 11 which schematically respectively represent (1) wall surface cleaning mode, (2) water surface cleaning mode, and (3) backup state.

Figure 11:
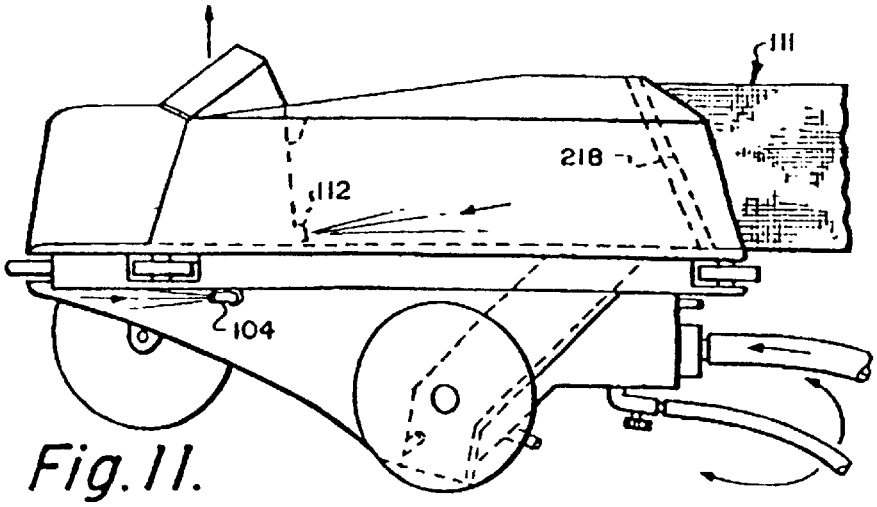
FIG. 11 is a side view similar to FIG. 2 particularly showing the water flow outlets active during the backup state.

With reference to FIG. 2, the following water outlets are depicted:

102—Forward Thrust Jet; provides forward propulsion and a downward force in the wall surface cleaning mode (FIG. 9) to assist in holding the traction wheels against the wall surface 8;

104—Rearward ("backup") Thrust Jet; provides backward propulsion and rotation of the body around a vertical axis when in the backup state (FIG. 11);

106—Forward Thrust/Lift Jet; provides thrust to lift the cleaner body to the water surface and to hold it there and propel it forwardly when operating in the water surface cleaning mode (FIG. 10);

108—Vacuum Jet Pump Nozzle; produces a high velocity jet to create a suction at the vacuum inlet opening 109 to pull in water and debris from the adjacent wall surface 8 in the wall surface cleaning mode (FIG. 9);

110—Skimmer Jets; provide a flow of surface water and debris into a debris container 111 when operating in the water surface cleaning mode (FIG. 10);

112—Debris Retention Jets; provides a flow of water toward the mouth of the debris container 111 to keep debris from escaping when operating in the backup state (FIG. 11);

114—Sweep Hose; discharges a water flow through hose 115 to cause it to whip and sweep against wall surface 8;

116—Front Chamber Fill; provides water to fill a chamber interior to hollow front fin 117 for creating a downward force on the front of body 100 when operating in the water surface cleaning mode (FIG. 10).

Figure 3:
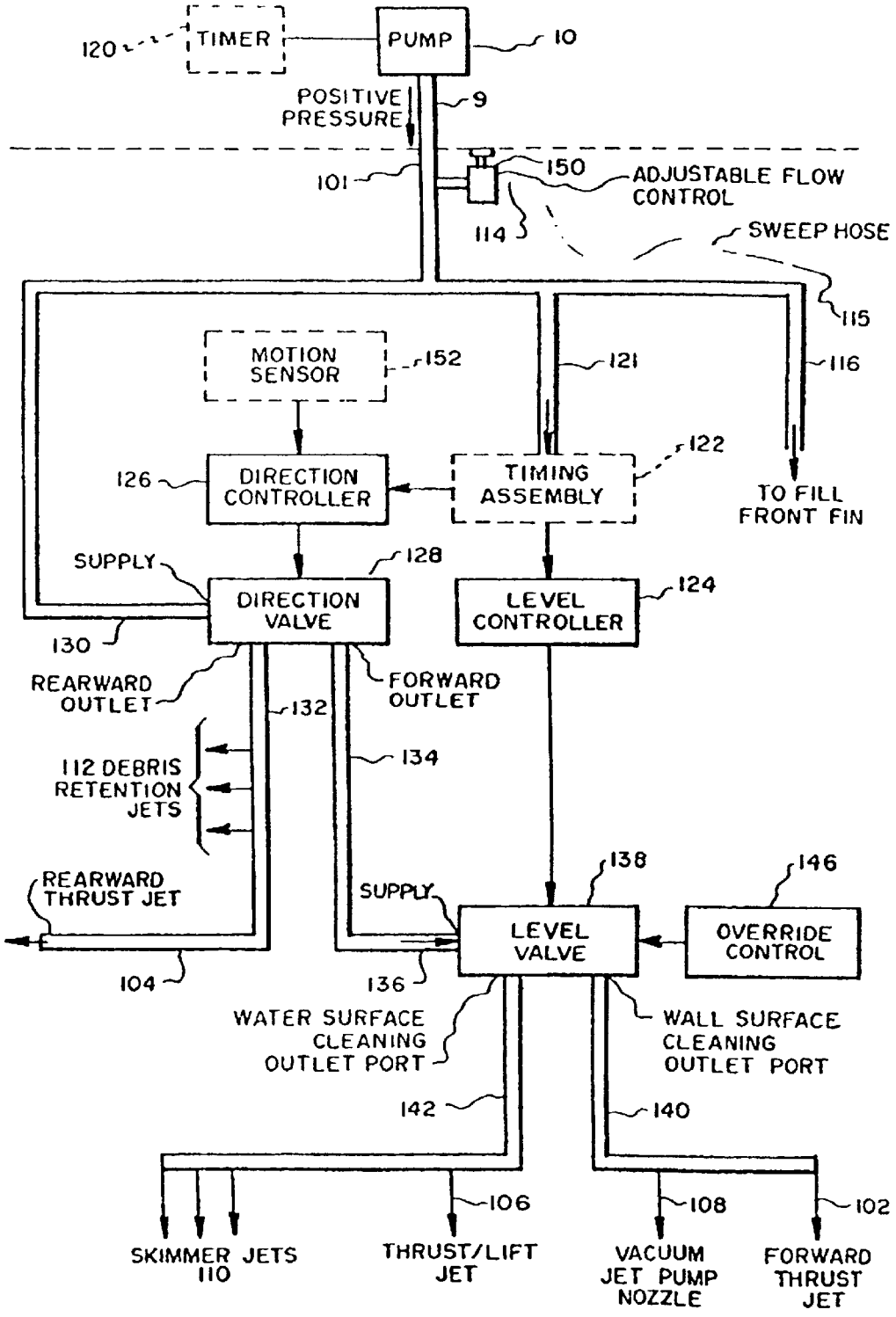
FIG. 3 is a functional block diagram depicting water flow distribution in the embodiment of FIG. 2.

Attention is now directed to FIG. 3 which schematically depicts how positive pressure water supplied to inlet 101 from pump 10 is distributed to the various outlets of the body 100 of FIG. 2. The pump 10 is typically controlled by an optional timer 120 to periodically supply positive pressure water via supply hose 9 to inlet 101. The supplied water is then variously distributed as shown in FIG. 3 to the several outlets depending upon the defined mode and state.

More particularly, water supplied to inlet 101 is directed to an optional timing assembly 122 (to be discussed in detail in connection with FIG. 12) which operates a level controller 124 and a direction controller 126. The direction controller 126 controls a direction valve 128 to place it either in a normal forward state or a backup rearward state. When in the backup state, water from supply inlet 101 is directed via valve supply inlet 130 to rearward outlet 132 for discharge through the aforementioned Rearward Thrust Jet 104 and Debris Retention Jets 112. When in the forward state, water from supply inlet 101 is directed through outlet 134 to supply inlet 136 of level valve 138.

Level valve 138 is controlled by controller 124 capable of defining either a wall surface cleaning mode or a water surface cleaning mode. When in the wall surface cleaning mode, water flow to supply port 136 is discharged via outlet 140 to Vacuum Jet Pump Nozzle 108 and Forward Thrust Jet 102. When the level control valve 138 is in the water surface leaning mode, water flow supplied to port 136 is directed via outlet port 142 to Forward Thrust/Lift Jet 106 and to Skimmer Jets 110.

Note also in FIG. 3 that an override control 146 is provided for enabling a user to selectively place the level valve 138 in either the wall surface cleaning mode or the water surface cleaning mode. Also note that positive pressure water delivered to supply inlet 101 is preferably also distributed via an adjustable flow control device 150 and the aforementioned Sweep Hose outlet 114 to sweep hose 115. Additionally, note that the positive pressure water supplied to inlet 101 is preferably also directed to Fill outlet 116 for filling a chamber interior to hollow front fin 117 to be discussed in detail in connection with FIG. 8.

The system of FIG. 3 can be implemented and operated in many different manners, but it will be assumed for purposes of explanation that the level valve 138 is caused to be in the water surface cleaning mode and about fifty percent of the time and the wall surface cleaning mode about fifty percent of the time. This scenario can be implemented by, for example, responding to a particular event such as the cycling of external pump 10 or by the expiration of a time interval defined by timing assembly 122. The timing assembly 122 will typically, via direction controller 126, place the direction valve 128 in its normal forward state a majority of the time and will periodically switch it to its backup state. For example, in typical operation the direction valve 128 will remain in its forward state for between one and one half to five minutes and then be switched to its backup state for between five to thirty seconds, before returning to the forward state. In a typical swimming pool situation this manner of operation will minimize the possibility of the cleaner body becoming trapped behind an obstruction for an extended period of time. In certain pool environments, where obstructions are more likely to be encountered, it may be desirable to more promptly initiate the backup state once the forward motion of the body has diminished below a threshold rate. Accordingly, the distribution system of FIG. 3 is preferably equipped with an optional motion sensor 152 which is configured to recognize a diminished forward motion of the body to cause the direction valve 128 to switch to its backup state. An exemplary implementation of the water flow distribution system of FIG. 3 will be described hereinafter in connection with FIG. 12. An exemplary implementation of the water distribution system of FIG. 3 including the motion sensor 152 will be described hereinafter with reference to FIG. 13.

Attention is now directed to FIGS. 4–8 showing a structural implementation of the first body embodiment 100 which is essentially comprised of upper and lower molded sections 154T and 154B. The lower section or chassis 154B is formed of a concave floor member 160 having side rails extending around its periphery. More particularly, note left and right shoulder side rails 162L,162R which diverge rearwardly from a chassis nose portion 164. Side rails 166L, 166R extend rearwardly from the shoulder rails 162L, 162R converging toward the rear or tail end 168 of the chassis 154B. The chassis is supported on three traction wheels 170 mounted for free rotation around horizontally oriented parallel axes. More particularly, the wheels 170 are comprised of a front center wheel 170F, mounted proximate to the chassis nose portion 164, and rear left and rear right wheels 170RL and 170RR. The wheels typically carry tires 171 which provide circumferential surfaces preferably having a sufficiently high coefficient of friction to normally guide the body along a path essentially parallel to its longitudinal axis. However, front wheel 170F preferably has a somewhat lower coefficient of friction than wheels 170RL and 170RR to facilitate turning.

The chassis preferably carries a plurality of horizontally oriented guide wheels 176 mounted around the perimeter of the chassis for free rotation around vertical axes to facilitate movement of the body past wall and other obstruction surfaces.

Figure 6:
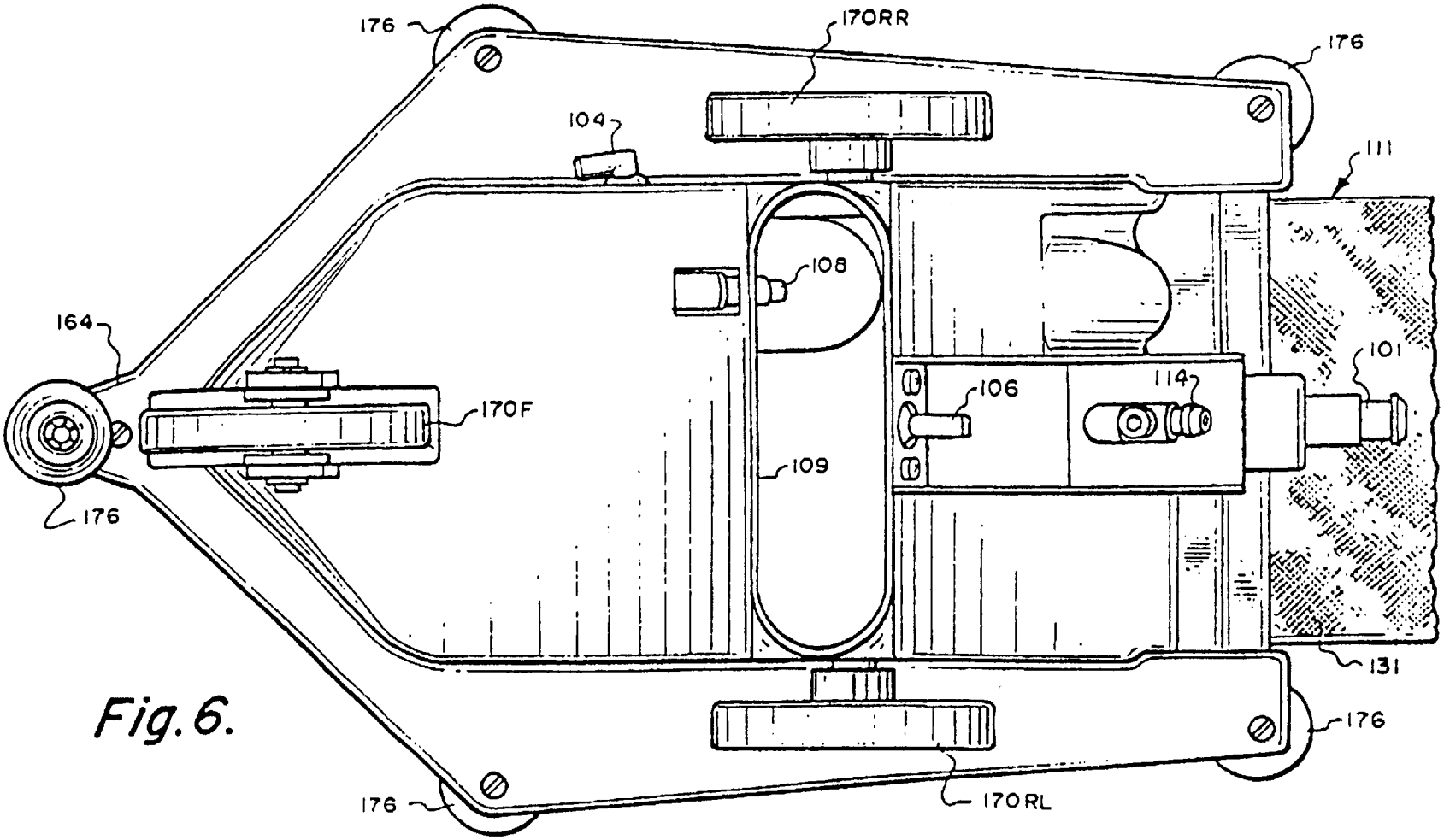
FIG. 6 is a bottom plan view of the cleaner body of FIG. 4.
Figure 7:
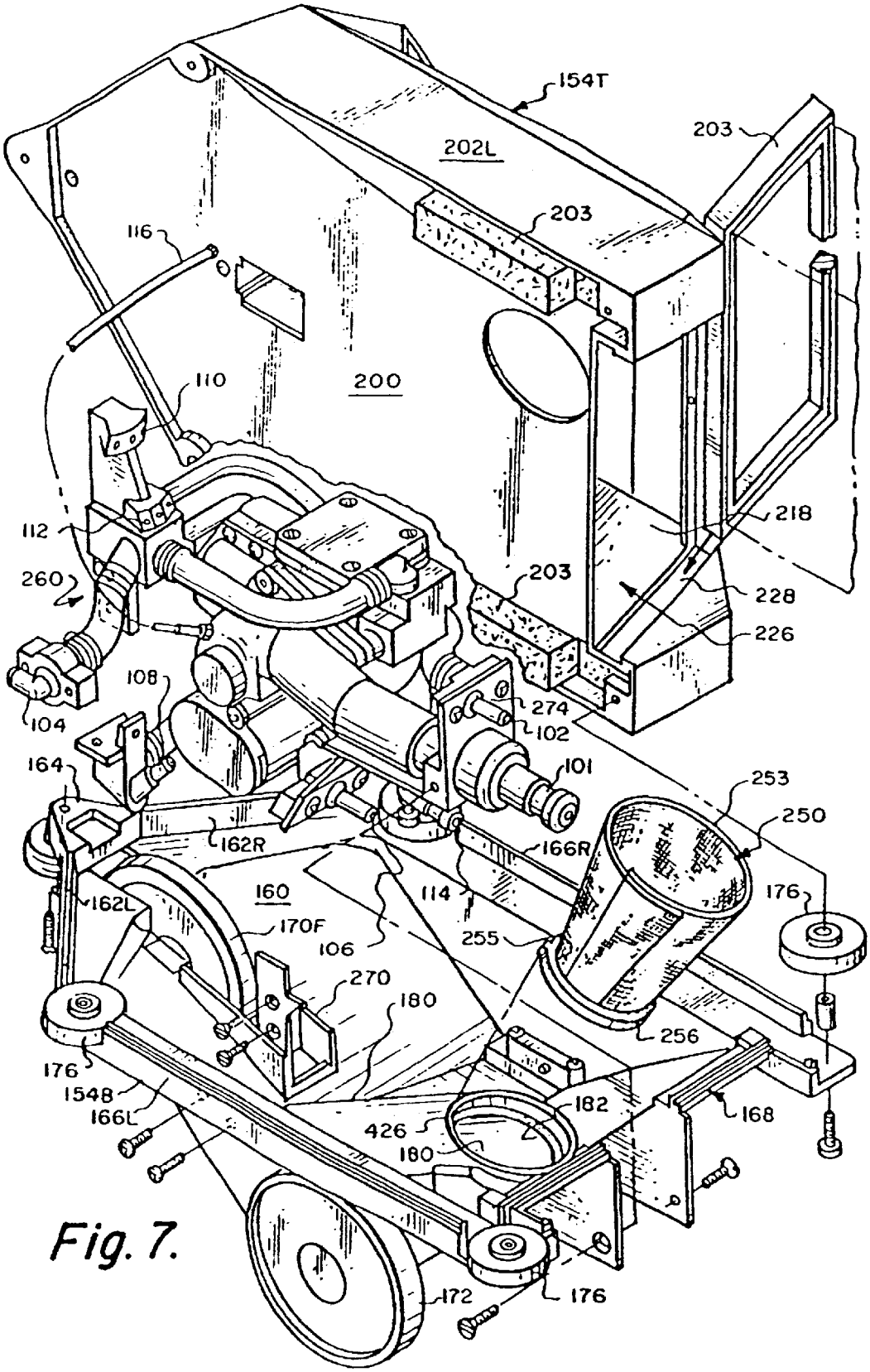
FIG. 7 is an exploded isometric view of the cleaner body of FIG. 4 showing the primary parts including the chassis, the water flow distributor, and the upper frame.

As can best be seen in FIGS. 2, 6 and 7, the chassis 154B defines an inclined vertical passageway 180 which extends upwardly from a vacuum inlet opening 109 on the underside of the chassis (see FIG. 6). The passageway 180 is inclined rearwardly from the opening 109 extending to a vacuum discharge opening 182 proximate to the tail end 168 of the chassis 154B. The aforementioned Vacuum Jet Pump Nozzle 108 is mounted within the passageway 180 proximate to the opening 109 and oriented to discharge a high velocity stream upwardly and rearwardly along the passageway 180, as represented in FIG. 2. This high velocity stream creates a suction at the vacuum opening 109 which draws water and debris from adjacent the wall surface 8 into the passageway 180 for discharge at the opening 182. The vertical component of the stream assists in producing a hold down force when the unit is operating in the wall surface cleaning mode acting to urge the wheels 170 against the wall surface 8.

The body 100 upper portion or frame 154T defines a perimeter essentially matching that of the chassis 154B. The frame is comprised of a deck 200 having upstanding side walls 202L and 202R extending therefrom. Each of the walls 202 defines an interior volume containing material 203 (FIG. 5), e.g., solid foam, selected to provide a weight/buoyancy characteristic to facilitate the body's assuming a desired orientation in the wall and water surface cleaning modes and in transition therebetween. The frame 154T also defines the aforementioned front fin 117 which is centrally mounted on deck 200 proximate to the forward or nose portion. The fin 117 is shaped with a rounded front surface 208 and with side surfaces 210L and 210R converging toward a rear edge 212. Aforementioned Skimmer Jets 110 and Debris Retention Jets 112 are mounted proximate to the rear edge 212. The Jets 110 are comprised of three rearwardly directed outlets including a center outlet 110C and left and right outlets 110L and 110R. The outlet 110C is directed essentially along the center line of the body 100 whereas the Jets 110L and 110R diverge or fan out slightly from the center line. All of the Jets 110 are preferably oriented slightly downwardly with respect to deck 200 (see FIG. 10) to produce a vertical lift force component when active. The Debris Retention Jets 112 are also comprised of three outlets including a center outlet 112C and left and right outlets 112L and 112R. Outlets 112L, 112R also diverge in an essentially fan pattern similar to the Skimmer Jets 110. However, whereas the Skimmer Jets 110 are oriented slightly downwardly, the Debris Retention Jets 112 are oriented slightly upwardly (see FIG. 11) directed toward a rear debris entrance opening 218.

More particularly, the side walls 202L, 202R respectively define inner surfaces 220L, 220R which converge rearwardly to guide water moving past fin 117 toward the rear debris opening 218 which is framed by rear cross member 227, deck 200, and the side wall surfaces 220L, 220R. A slot 228 is formed around opening 218 for removably accommodating an open frame member 230. The frame member 230 has the aforementioned debris container 111, preferably comprising a bag formed of flexible mesh material 231, secured thereto so that water flow through opening 218 will flow into the container 111.

A front cross member 240 extends between the walls 202L and 202R, preferably supported by the fin 117 proximate to the rear edge 212. The cross member 240 defines rearwardly inclined hydrodynamic surfaces 242 (see FIG. 2) which, together with deck surface 200, act to produce a downward force on the body as the body moves forward in the wall surface cleaning mode. This force assists in maintaining the traction wheels 170 against the wall surface 8 to properly position the vacuum inlet opening 109 in close proximity to the wall surface 8 (see FIG. 9).

Figure 4:
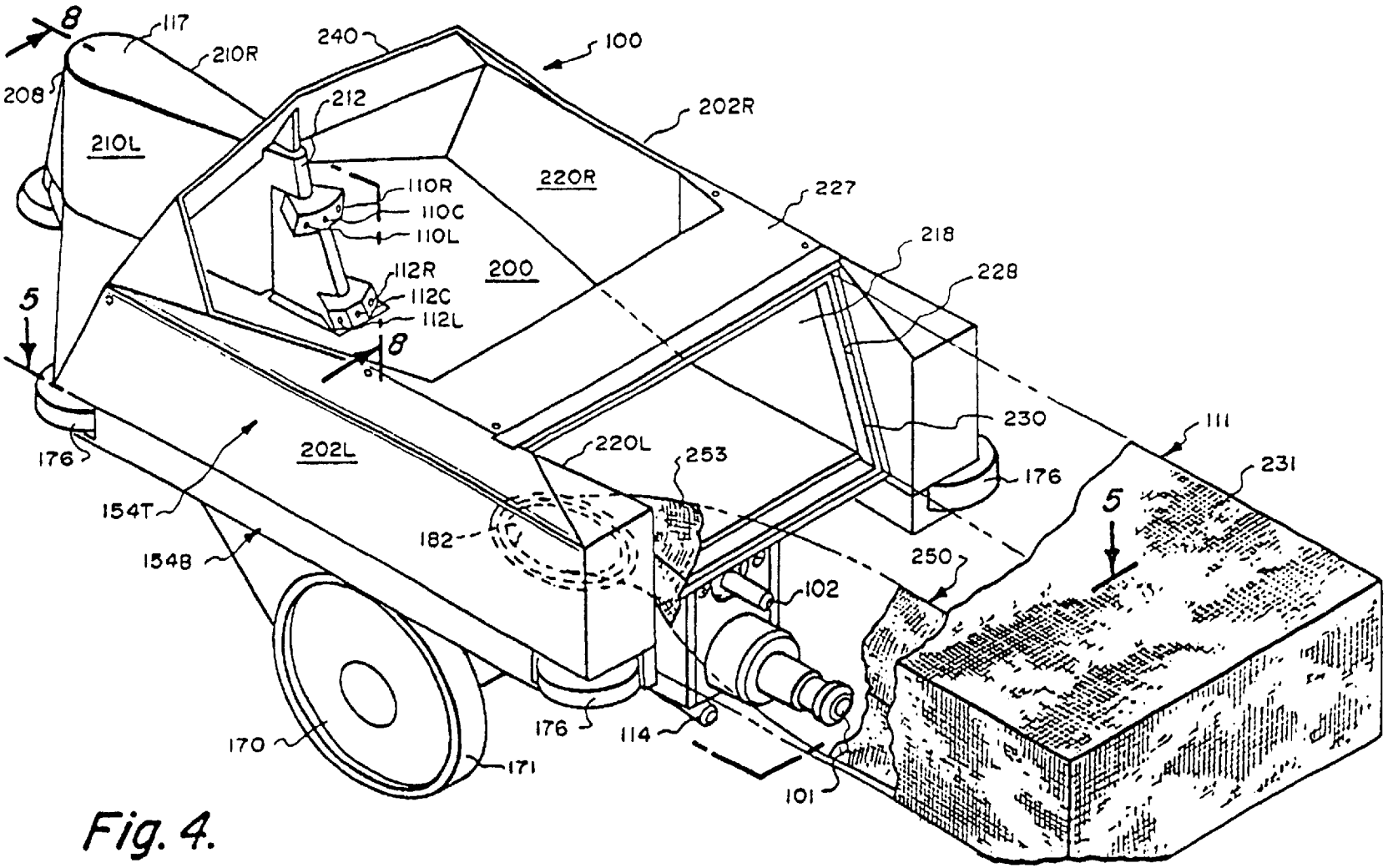
FIG. 4 is a rear isometric view, partially broken away, of a preferred cleaner body in accordance with the invention.
Figure 14:
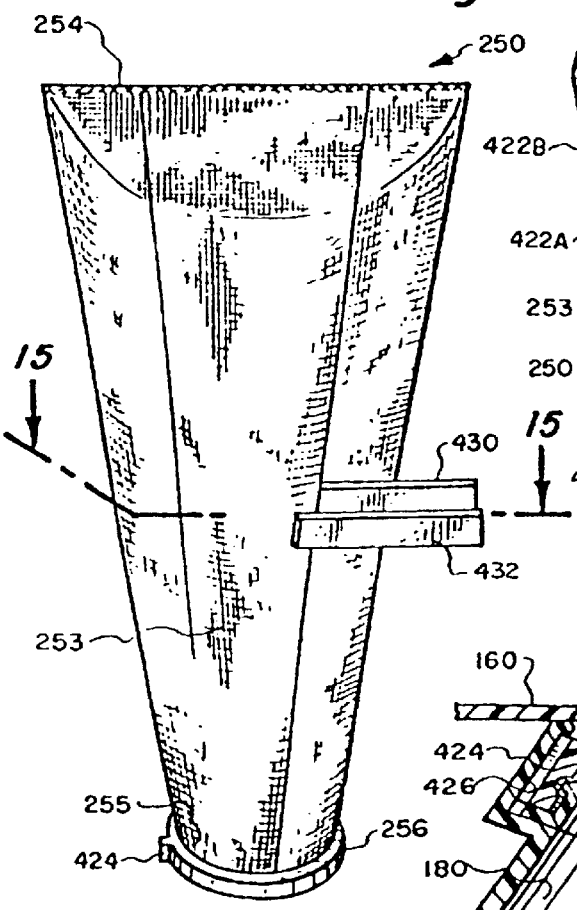
FIG. 14 is a side view of a preferred debris container inner bag.

The vacuum passageway 180 extends from vacuum inlet opening 109 and terminates at vacuum discharge opening 182 in close proximity to the upper surface of deck 200. Thus, water drawn from the wall surface 8 through the vacuum passageway 180 will exit at the discharge opening 182 and be directed rearwardly through opening 218 and into the aforementioned debris container 111. In order to assure relatively unobstructed water flow through debris container 111, it is formed of a relatively coarse mesh material 231 sufficient to trap small pieces of leaves, for example, but insufficient to trap finer debris such as silt. In order to trap such finer material which sometimes accumulates on the wall surface 8, a second or auxiliary debris container 250 is provided for mounting adjacent the vacuum discharge opening 182 (FIG. 7). The details of a preferred implementation of container 250 will be discussed in connection with FIGS. 14–16. However, at this juncture, it is to be noted that the container 250 comprises a bag formed of mesh material 253 (preferably having a finer mesh than that of bag 111) closed at an upper end 254 (FIG. 14). The bag 250 lower end 255 defines an open mouth extending around frame member 256 which is configured to be mounted in the vacuum discharge opening 182 so that the bag 250 extends rearwardly, into the main debris container bag 111, as represented in FIG. 4.

Figure 5:
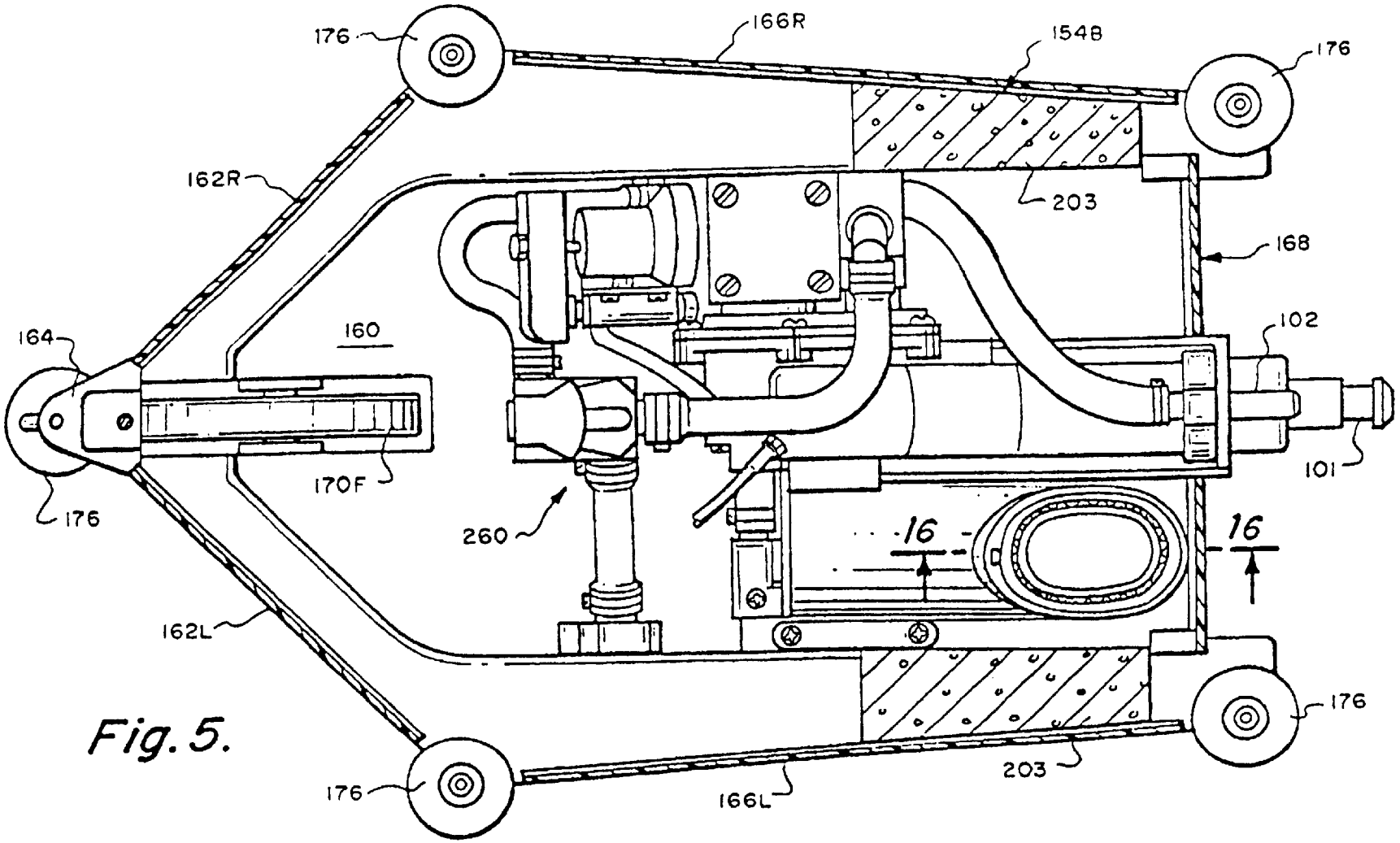
FIG. 5 is a sectional view taken substantially along the plane 5—5 of FIG. 4.

Attention is now specifically directed to FIGS. 5 and 7 which generally depict a "plumbing" subassembly 260 for implementing the water distribution system schematically represented in FIG. 3. It will be recalled from FIG. 3 that positive pressure water is supplied via supply inlet 101 and then distributed to the various outlets 102, 104,106,108,110, 112,114, and 116, all of which can be seen in FIG. 7. The plumbing subassembly 260 is mounted between the body chassis 154B and the body frame 154T. More specifically, the chassis floor member 160 is concaved and defines a recess for accommodating the plumbing subassembly 260 which is retained to the chassis by bracket 270. Although the plumbing subassembly 260 contains the various elements of the distribution system shown in FIG. 3, including the timing assembly 122, the direction controller 126, the direction valve 128, the level controller 124, and the level valve 138, they are not visible in FIG. 7 but will be discussed hereinafter in connection with FIG. 12.

Figure 8:
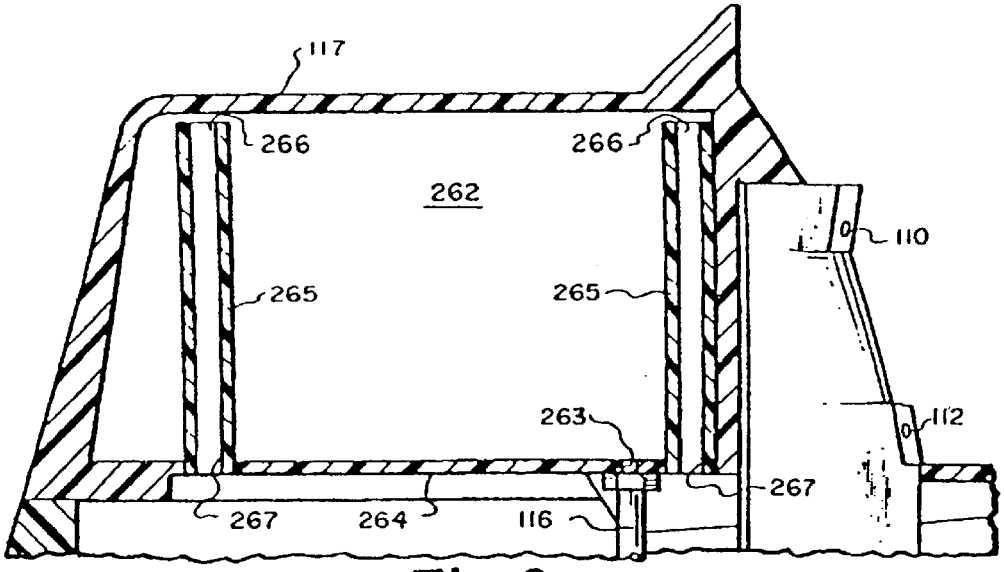
FIG. 8 is a sectional view of the front fin taken substantially along the plane 8—8 of FIG. 4.

FIG. 8 shows a cross-section of front fin 117 and depicts interior chamber 262 having awater inklet 263 in its bottom wall 264. The inlet 263 is coupled to aforementioned Front Chamber Filled outlet 116. Overflow tubes 265 are mounted in chamber 262 having entrances 266 positioned to establish the height of the water volume in the chamber. The tubes 265 are open at their lower ends 267 to permit overflow water to exit from the chamber 262.

Attention is now directed to FIGS. 9, 10 and 11 which respectively depict operation in the wall surface cleaning mode (forward state), the water surface cleaning mode (forward state), and the backup state (either mode). In each of FIGS. 9, 10, and 11, a water discharge stream is represented as exiting from the outlets active during that mode and/or state. The primary force components acting on the body are also represented in FIGS. 9–11.

FIG. 9 shows the body 100 in the wall surface cleaning mode with its wheel 170 engaged against a horizontally oriented portion of wall surface 8. In this situation, note that the body assumes a nose down, tail up attitude, being oriented at an approximately 11° angle with respect to the horizontal. This attitude facilitates the development of appropriate vertical forces as the body moves forwardly through the water pool to hold the wheels against the wall surface 8. More particularly, when operating in the wall surface cleaning mode, water is discharged from the Forward Thrust Jet 102 and the Vacuum Jet pump Nozzle 108. Note that with the attitude depicted in FIG. 9, both of these outflows are directed to develop nominal vertical force components in the direction to press the wheels 170 against the wall surface 8. Additionally, both of these outflows provide nominally horizontal thrust components acting to propel the body in a forward direction, i.e., to the left as depicted in FIG. 9. This forward motion of the body through the water in turn develops vertical force components, e.g., 270, attributable to relative motion of the water acting against the various hydrodynamics surfaces, particularly surfaces 200 and 242. The motion of the body 100 through the water in the wall surface cleaning mode will be somewhat randomized by the totality of forces acting on the body including the drag force of the supply hose 9 and debris container 111, as well as the reaction forces produced by the whipping of the sweep hose 15. The precise path followed by the body 100 will additionally be largely affected by the contours of the containment wall surfaces acting against the traction wheels 170. As the body 100 moves along the wall surface, different ones of the forces will dominate at different times to cause the body to deviate from an essentially straight line travel path defined by the traction wheels 170. This deviation is an intended consequence of the overall design of the apparatus and serves to randomize the motion of the body along the wall surface to clean the entire wall surface including bottom and side portions. To achieve optimum path travel for the contours of a particular containment wall, various ones of the thrust jets, e.g., Forward Thrust Jet 102, are preferably mounted so that they can be adjustably directed, e.g., via a ball and socket configuration 274 (FIG. 7). Additionally, front wheel 170F preferably exhibits a lower coefficient of friction than the other wheels 170 to facilitate turning from a single line path.

Attention is now directed to FIG. 10 which depicts the body 100 operating in the water surface cleaning mode adjacent to the water surface 7. Note that in the water surface cleaning mode, Forward Thrust/Lift Jet 106 and Skimmer Jets 110 discharge water with a downward component to produce a vertical lift force to overcome the weight of the unit and maintain the body with an essentially horizontal attitude adjacent the water surface 7. Note that in the water surface cleaning mode (FIG. 10), deck surface 200 is essentially parallel to the water surface 7 and the hydrodynamic surface 242 is above the water surface. Thus, neither surface produces the vertical downward force component in the water surface cleaning mode that it does in the wall surface cleaning mode of FIG. 9. Also, note that the water filled front fin 117 is at least partially lifted out of the water in FIG. 10 so that its weight contributes a vertical downward force component. The path of travel along the water surface taken by the body 100 will be primarily determined by the direction of discharge of the Forward Thrust/Lift Jet 106 and Skimmer Jets 110. Additionally, of course, it will be affected by the totality of other forces acting on the body including the drag forces attributable to the supply hose 9 and debris bag 111, the reaction forces produced by the whipping of the sweep hose 115, and the contact with wall and other obstruction surfaces.

Attention is now directed to FIG. 11 which depicts the active water outflows during the backup state which, it will be recalled, is defined by the direction valve 128 (FIG. 3). In the backup state, water is discharged from the Debris Retention Jets 112 and the Rearward Thrust Jet 104. It will be recalled from FIG. 6 that the Thrust Jet 104 is displaced from the center line of the body 100 so that in providing rearward thrust, the body will tend to rotate around a vertical axis and thus be able to work its way around obstructions. The Debris Retention Jets 112 discharge through opening 218 into the bag 111 and thus prevent debris from coming out of the bag when the body is moving rearward as represented in FIG. 11.

Although the embodiment described in FIGS. 2–11 has been assumed to use a heavier-than-water body, which uses water outflows to thrust it to the water surface, it should be understood that it could alternatively use a lighter-than-water body with the water outflows being directed to thrust the body down to the wall surface.

Figures 12A, 12B:
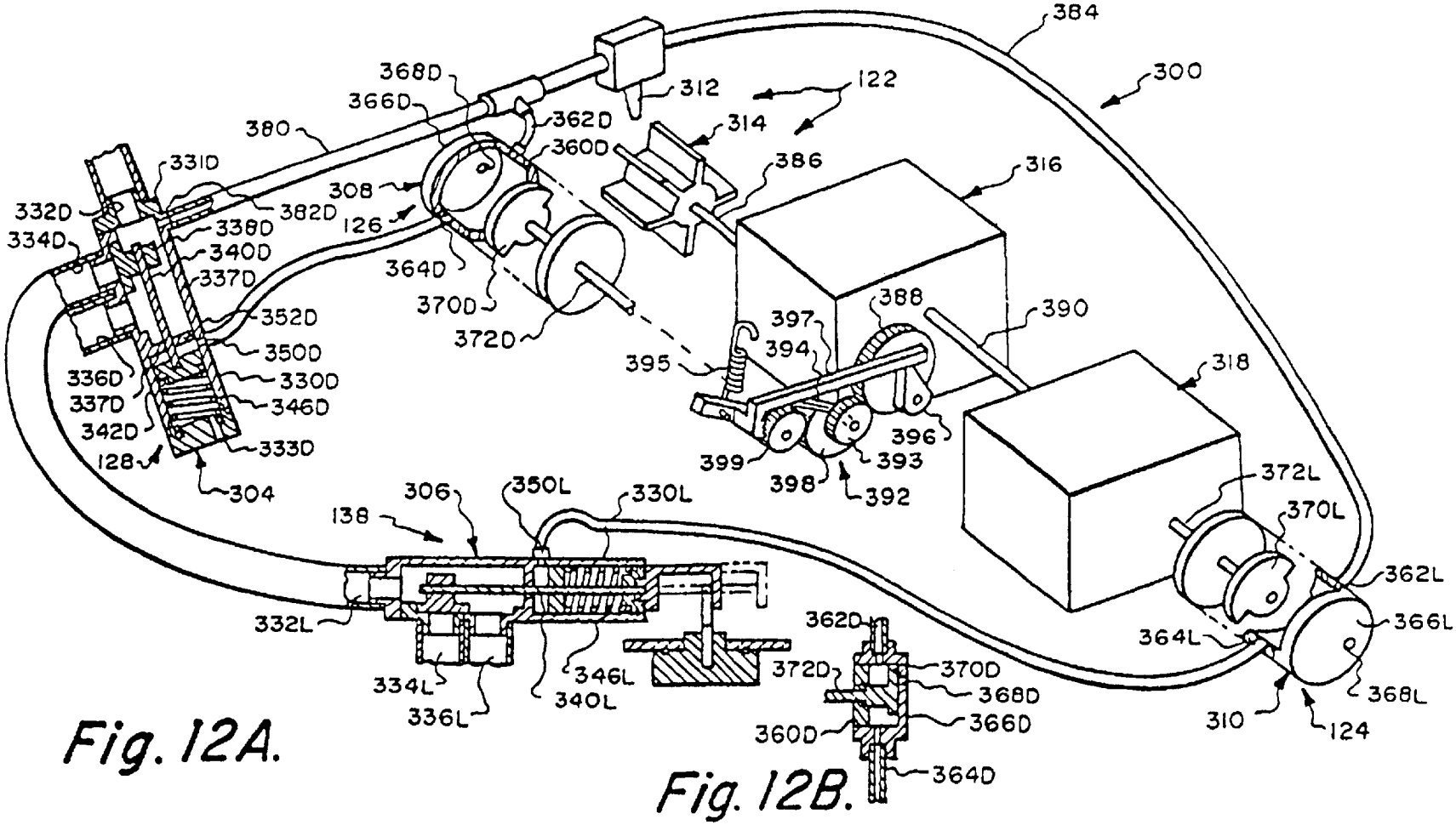
FIG. 12A is a schematic representation of a preferred implementation of the water flow distributor of FIG. 3 and FIG. 12B comprises a sectional view through the direction controller of FIG. 12A.

Attention is now directed to FIG. 12A which schematically represents a preferred implementation 300 of the water distribution system depicted in FIG. 3. The implementation 300 is basically comprised of:

a. Direction valve 128 implemented by valve assembly 304;

b. Level valve 138 implemented by a valve assembly 306;

c. Direction controller 126 implemented by controller assembly 308;

d. Level controller 124 implemented by controller assembly 310; and e. Timing assembly 122 implemented by nozzle 312, turbine 314, timing gear train 316, and reduction gear train 318.

For clarity of explanation, it will be assumed that the implementation 300 is designed to cause the body 100 to operate in accordance with the following exemplary schedule:

| CLEANING MODE | DURATION | PROPULSION STATE | DURATION |
|---|---|---|---|
| WATER SURFACE | 30 Min. | FORWARD | 90 Sec. |
| | | BACKUP | 7 Sec. |
| WALL SURFACE | 30 Min. | FORWARD | 90 Sec. |
| | | BACKUP | 7 Sec. |

Direction valve assembly 304 comprises a cylindrical valve body 330D having a first end 331D defining a supply inlet 332D and a sealed second end 333D. Forward outlet 334D and rearward outlet 336D open through side wall 337D (respectively corresponding to outlets 134 and 132 in FIG. 3). The inlet 332D communicates with either outlet 334D or 336D depending upon the position of valve element 338D. Valve elements 338D is carried by rod 340D secured to piston 342D. A spring 346D contained within the valve body 330D normally pushed piston 342D toward the end 331D of the valve body to seat outlet 334D and communicate inlet 332D with outlet 336D. The valve body 330D also defines a control post 350D which opens through side wall 337D between fixed partition 352D and piston 342D. Positive pressure water supplied to control port 350D acts to move piston 342D toward end 333D against spring 346D, thus causing valve element 338D to seal rearward outlet 336D and open forward outlet 334D.

Direction valve control port 350D is controlled by the output 364D of the direction controller assembly 308. The direction controller assembly 308 is preferably comprised of a cylindrical controller body 360D having a circumferential wall defining an inlet 362D and an outlet 364D. Additionally, body 360D defines an end wall 366D having an exhaust port 368D formed therein. A disk shaped valve element 370D is mounted on shaft 372D for rotation within the controller body as depicted in FIG. 12B. During a portion of its rotation, the valve element 370D seals exhaust port 368D enabling positive pressure water supplied to controller inlet 362D to be transferred via outlet 364D to direction valve control port 350D. During the remaining portion of its rotation, exhaust port 368D is open, and positive pressure water from inlet 362D is exhausted through port 368D so that no significant pressure is applied to control port 350D. Positive pressure water is supplied to inlet 362D from tubing 380 coupled to direction valve body outlet 382D which communicates directly with supply inlet 332D.

In the implementation of FIG. 12, the direction valve assembly 304 inlet 332D is connected to the aforementioned positive pressure supply inlet 101 shown in FIG. 3. The direction valve assembly 304 forward outlet 334D is connected to the inlet 332L of level valve assembly 306. Level valve assembly 306 is implemented essentially identical to direction valve assembly 304 and defines outlets 334L and 336L which respectively correspond to the water surface cleaning outlet 142 and the wall surface cleaning outlet 140 of FIG. 3.

The positive pressure water from outlet 382D is also delivered to turbine nozzle 312 and, via tubing 384, to the inlet 362L of the level controller assembly 310. The outlet 364L of the level controller assembly 310 is connected to the control port 350L of the level valve assembly 306. Level controller assembly 310 is implemented essentially identical to direction controller assembly 308.

Nozzle 312 is positioned to turn turbine 314 which rotates drive shaft 386 of timing gear train 316 which drives both output gear 388 and output drive shaft 390. Gear 388 forms part of a train to rotate the direction controller valve element 370D. Shaft 390 forms part of a train to rotate the level controller valve element 370L. More specifically, shaft 390 drives reduction gear train 318 to rotate the level controller valve element 370L at a slow rate, e.g., once per hour, to alternately define thirty minute intervals for the water surface and wall surface cleaning modes.

Gear 388 drives the direction controller valve element 370D via a clutch mechanism 392 depicted in FIG. 12A. The clutch mechanism 392 normally disengages gear 388 from direction controller shaft 372D but periodically (e.g., fifteen seconds during each ninety second interval) engages to rotate the shaft 372D and direction controller valve element 370D. The clutch mechanism 392 is implemented via a throw-out gear 393 carried by swing arm 394. A tension spring 395 normally acts on swing arm 394 to disengage gears 393 and 388. However, gear 388 carries cam 396 which, once per cycle, forces cam follower 397 to pivot swing arm 394 so as to engage gears 393 and 388. Gear 393 is coupled via gear 398 to gear 399 which is mounted to rotate direction controller shaft 372D.

In the operation of the apparatus of FIG. 12A, assume initially that the apparatus is in its quiescent state with direction valve assembly 304 rearward outlet 366D open and forward outlet 334D closed and with level valve assembly 306 wall surface cleaning outlet 336L open and water surface cleaning outlet 334L closed. When positive pressure water is supplied via inlet 101 to inlet 332D of direction valve assembly 304, it will be directed via tubing 380 to inlet 362D of direction controller assembly 308. Positive pressure water will also be supplied to nozzle 312 to drive turbine 314. As a consequence, gear train 316 and reduction gear train 318 will rotate the level controller valve element 370L to periodically seal exhaust port 368L and periodically pressurize control port 350L of level valve assembly 306. When pressurized, it will move the piston of assembly 306 against spring 364L to open water surface cleaning outlet 334L. When control port 350L is not pressurized, wall surface cleaning port 366L will be open. Thus, the level valve assembly 306 will alternately open outlets 334L and 336L depending upon the position of the disk valve member 370L of the level controller assembly 310. In the assumed implementation, the water and wall surface cleaning modes will be alternatively defined for approximately equal periods of about thirty minutes each.

The direction valve assembly 304 similarly will open forward outlet 334D when its control port 350D is pressurized. When control port 350D is not pressurized, then the rearward outlet 336D will be open. Water pressure delivered to control port 350D is determined by the position of disk valve element 370D within direction controller 308. In the assumed implementation, the direction controller 308 defines the forward propulsion state for approximately ninety seconds and then switches the direction valve assembly 304 to the backup propulsion state for approximately seven seconds.

Figure 13:
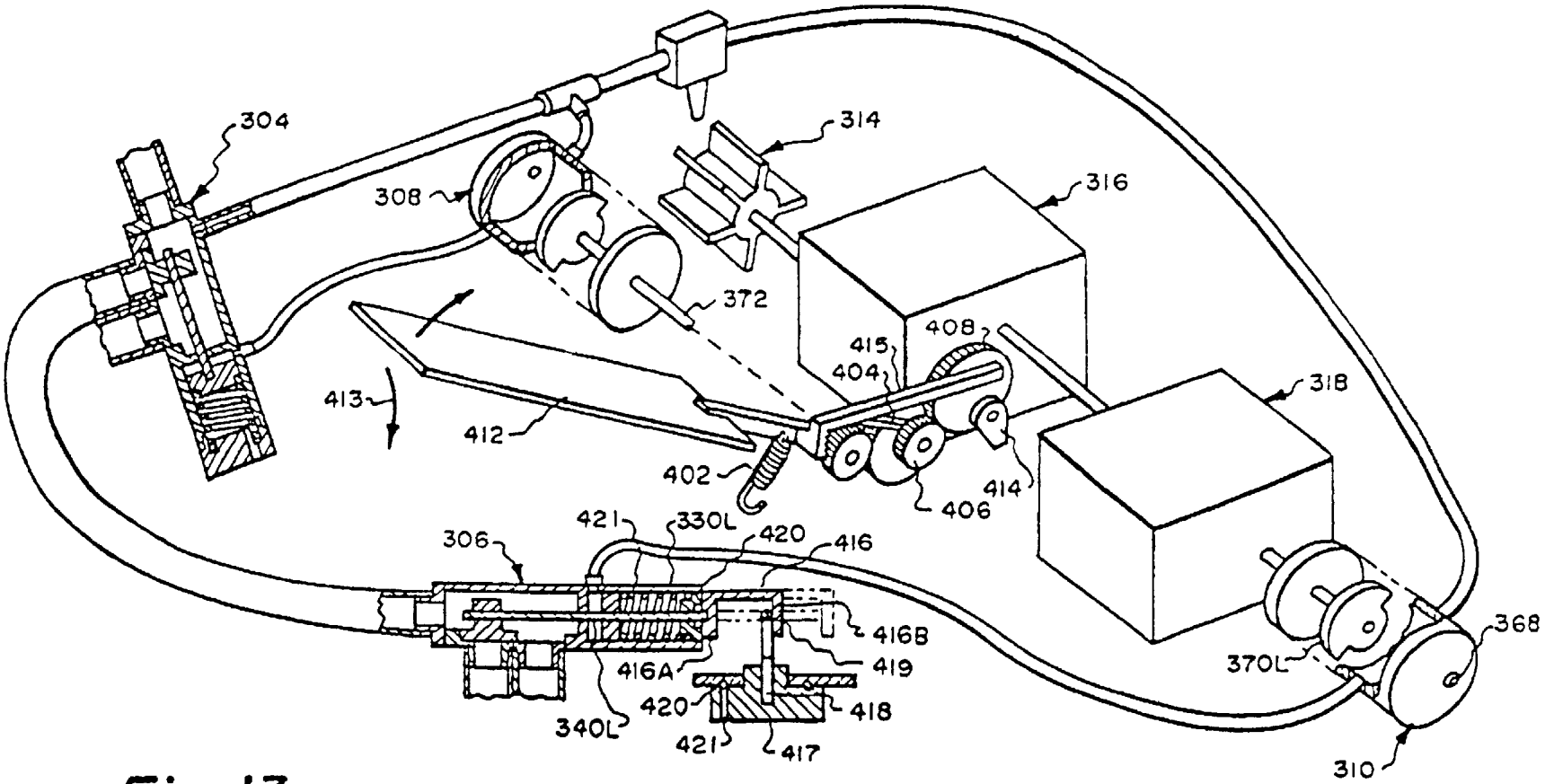
FIG. 13 is a schematic representation of a preferred implementation of the water flow distributor of FIG. 3 including a motion sensor.

From the foregoing explanation of FIG. 12A, it should be understood that the spring 395 normally acts to disengage gears 393 and 388 so that direction controller valve element 370D is not driven. However, cam 396 periodically raises cam follower 397 to engage gears 393 and 388 to rotate the valve element 370D to switch direction valve 304 to its backup state. Attention is now directed to FIG. 13 which illustrates an alternative water distribution implementation which incorporates a motion sensor (152 in FIG. 3) for the purpose of sensing when the forward motion of the body 100 has diminished below a certain threshold. This may occur, for example, when the body 100 gets trapped behind an obstruction, such as the entrance of a built-in skimmer. In such an instance, it is desirable to promptly switch the direction valve 128 to the back-up state. Whereas in FIG. 12A, spring 395 operates to normally disengage gears 393 and 388, in the embodiment of FIG. 13, spring 402 is connected to swing arm 404 to normally engage gear 406 and output drive gear 408. A motion sensor in the form of paddle 412 is structurally connected to the swing arm 404. The paddle 412 is mounted so that when the body 100 is moving through the water in a forward direction (413), the relative water flow will act to pivot the paddle in a clockwise direction (as viewed in FIG. 13) to overcome the action of spring 402 to disengage gears 406 and 408. So long as the body keeps moving in a forward direction above a threshold rate, the paddle 412 will overcome the spring 402 to disengage gears 406,408 and the direction controller shaft 372 will not rotate. However, when the forward motion of the body diminishes to below the threshold rate, the paddle 412 no longer overcomes the force of spring 402 and the shaft 372 is caused to rotate to switch the direction valve 304 to the backup state.

Notwithstanding the foregoing, even if the forward motion of the body is maintained, it is nevertheless desirable to periodically switch the direction valve 304 to its backup state. For this purpose, gear 408 carries a cam 414 which periodically lifts cam follower 415 to force engagement of gears 406 and 408.

As noted, it has been assumed that the embodiments of FIGS. 12A and 13 define substantially equal intervals for the water surface cleaning mode and the wall surface cleaning mode. The relative split between the mode is, of course, determined by the configuration of level controller valve element 370L. As depicted, valve element 370L defines an arc of about 180° and thus, during each full rotation of valve element 370L, it will open and close exhaust port 368 for essentially equal intervals. If desired, the valve element could be configured to define an arc either greater or less than 180° to extend one of the cleaning mode intervals relative to the other cleaning mode interval. For example, in order to extend the water surface cleaning interval, the exhaust port 368L must remain closed for a greater portion of the valve element rotation, meaning that the valve element 370L should extend through an arc greater than 180°.

It is sometimes desirable to enable a user to maintain the apparatus in either the water surface cleaning mode or the wall surface cleaning mode for an extended period. For this purpose, the piston rod 340L of valve assembly 306 can be configured so that it extends through the closed end of the level control valve body 330L. The free end of rod 340L is connected to a U-shaped bracket 416 (FIG. 13) having legs 416A and 416B. Bracket 416 moves with the piston rod 340L between the two positions respectively represented in solid and dash line in FIG. 13. A user operable control knob 417 is provided for selectively rotating shaft 418, carrying a perpendicular arm 419, between the three positions shown in FIG. 13 to selectively (1) bear against bracket leg 416A to hold piston rod 340L in its left-most position defining the wall surface cleaning mode, (2) bear against the bracket leg 416B to hold piston rod 340L in its right-most position defining the water surface cleaning mode, or (3) move clear of the bracket legs to allow the bracket 416 to move without interference. The control knob 417 is preferably provided with a ball 420 which can be urged by spring 421 into a fixed recess to selectively detent the knob in any of the three positions.

Figure 15:
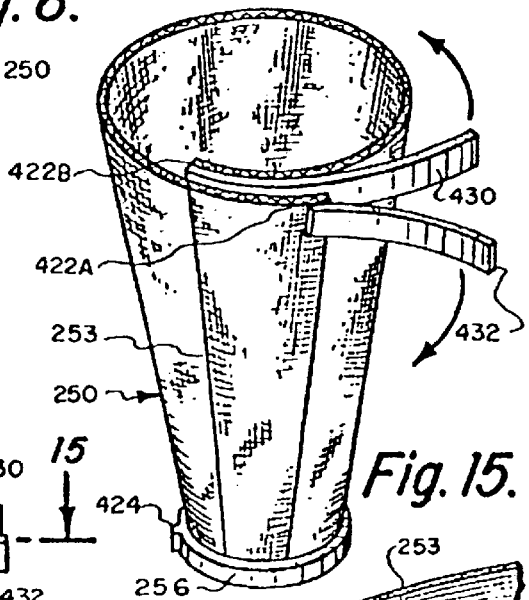
FIG. 15 is a sectional view taken substantially along the plane 15—15 of FIG. 14 showing how the overlapped edges of the inner debris container bag are overlapped.
Figure 16:
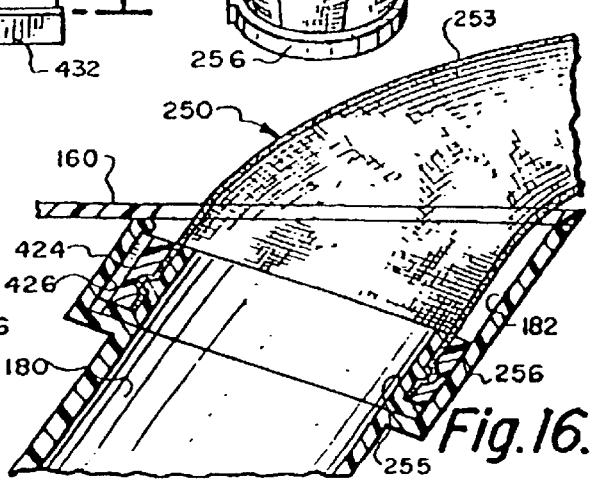
FIG. 16 is a sectional view taken substantially along the plane 16—16 of FIG. 5 showing how the inner bag of FIGS. 14, 15 is mounted to the cleaner body chassis.

Attention is now directed to FIGS. 14–16 which illustrate the inner debris container 250 in greater detail. The container 250 is formed of fine mesh material 253 rolled into an essentially cylindrical form with edge 422A overlapping edge 422B. The material 253 is sewn or otherwise sealed to close end 254. The second bag end 255 is secured to frame member 256 so that the position of the access opening defined by overlapping edges 422A, 422B is keyed to the frame member 256. More particularly, frame member 256 defines projecting key 424 which is configured to be received in keyway 426 adjacent vacuum discharge opening 182 to orient the overlapping edges 422A, 422B upwardly. This orientation allows silt to be collected in the bag 250 without tending to bear against and leak out from between the edges. However, this configuration still allows a user to readily remove the frame 256 from the discharge opening 182 and spread the edges 422A,422B to empty debris from bag. Short pull tables 430,432 are preferably provided to facilitate spreading the edges.

SECOND EMBODIMENT (FIGS. 17A, 17B, 17C)

In the first embodiment depicted in FIGS. 2–16, the heavier-than-water body 100 is lifted to and maintained at the water surface by a vertical force produced primarily by water outflow from the body (e.g., outlets 106, 110) in a direction having a vertical component.

Figure 17A:
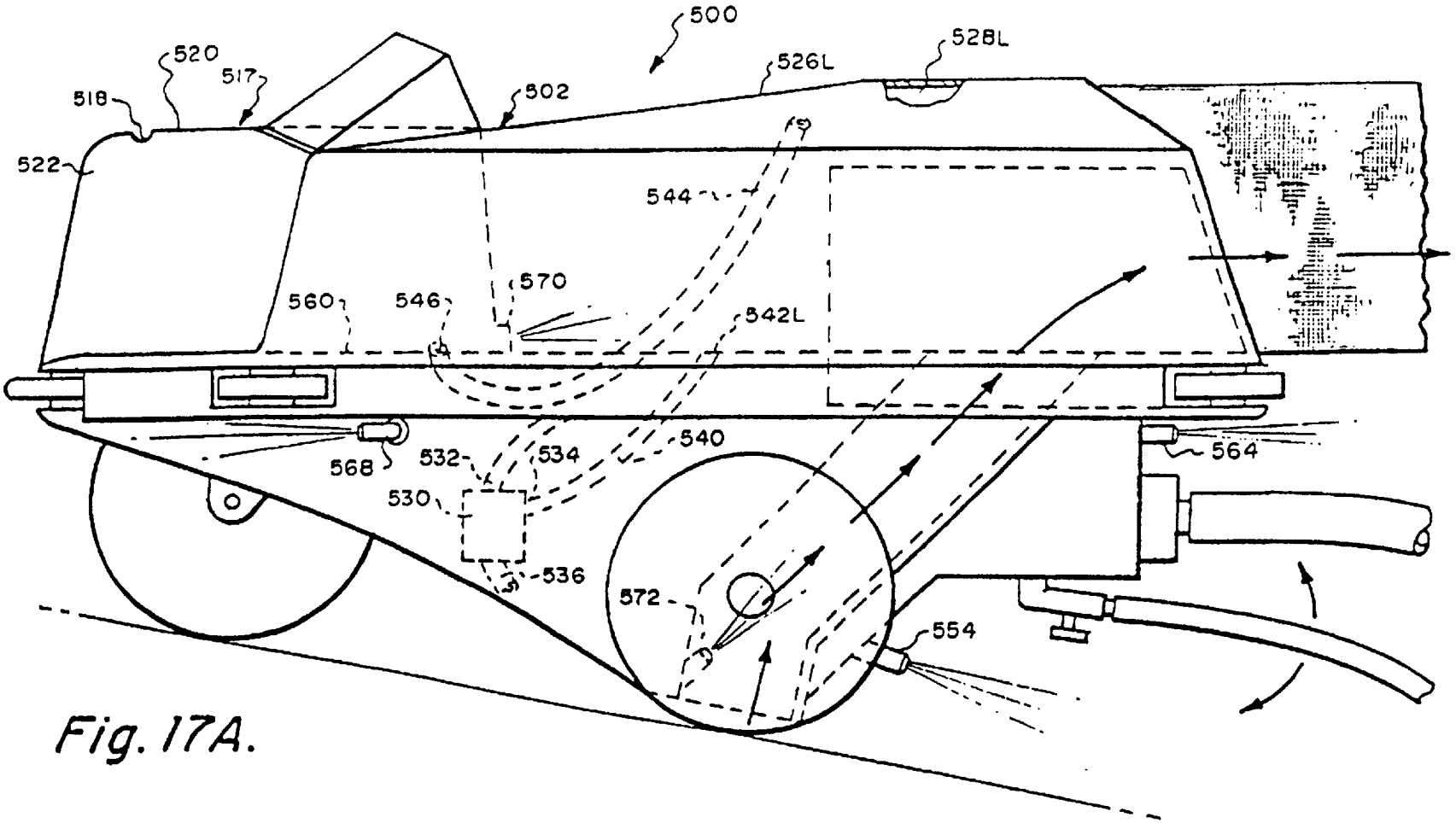
FIGS. 17A, 17B and 17C depict a second heavier-than-water embodiment of the invention respectively schematically showing a side view, an isometric view, and a functional block diagram.
Figure 17B:
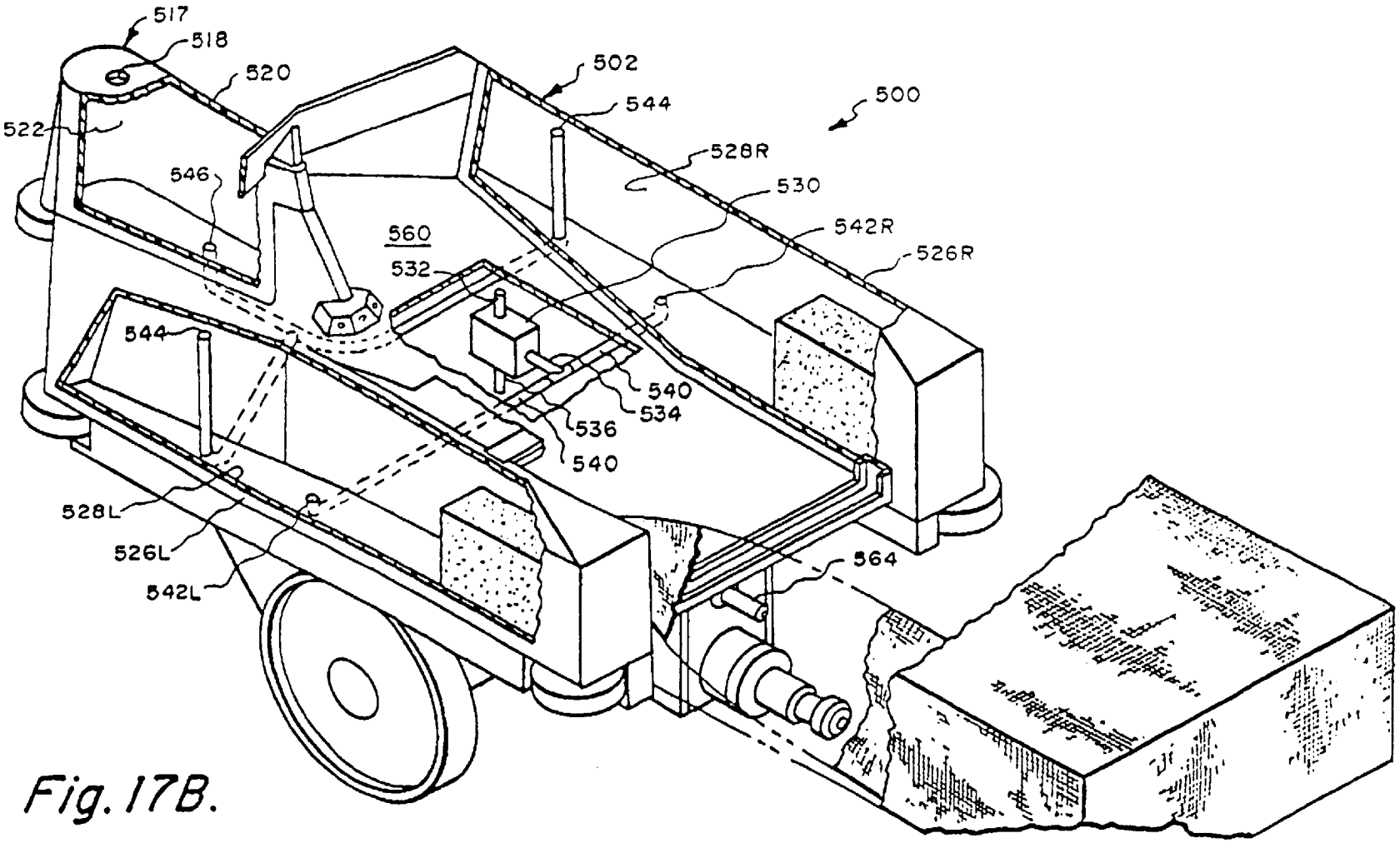
Figure 17C:
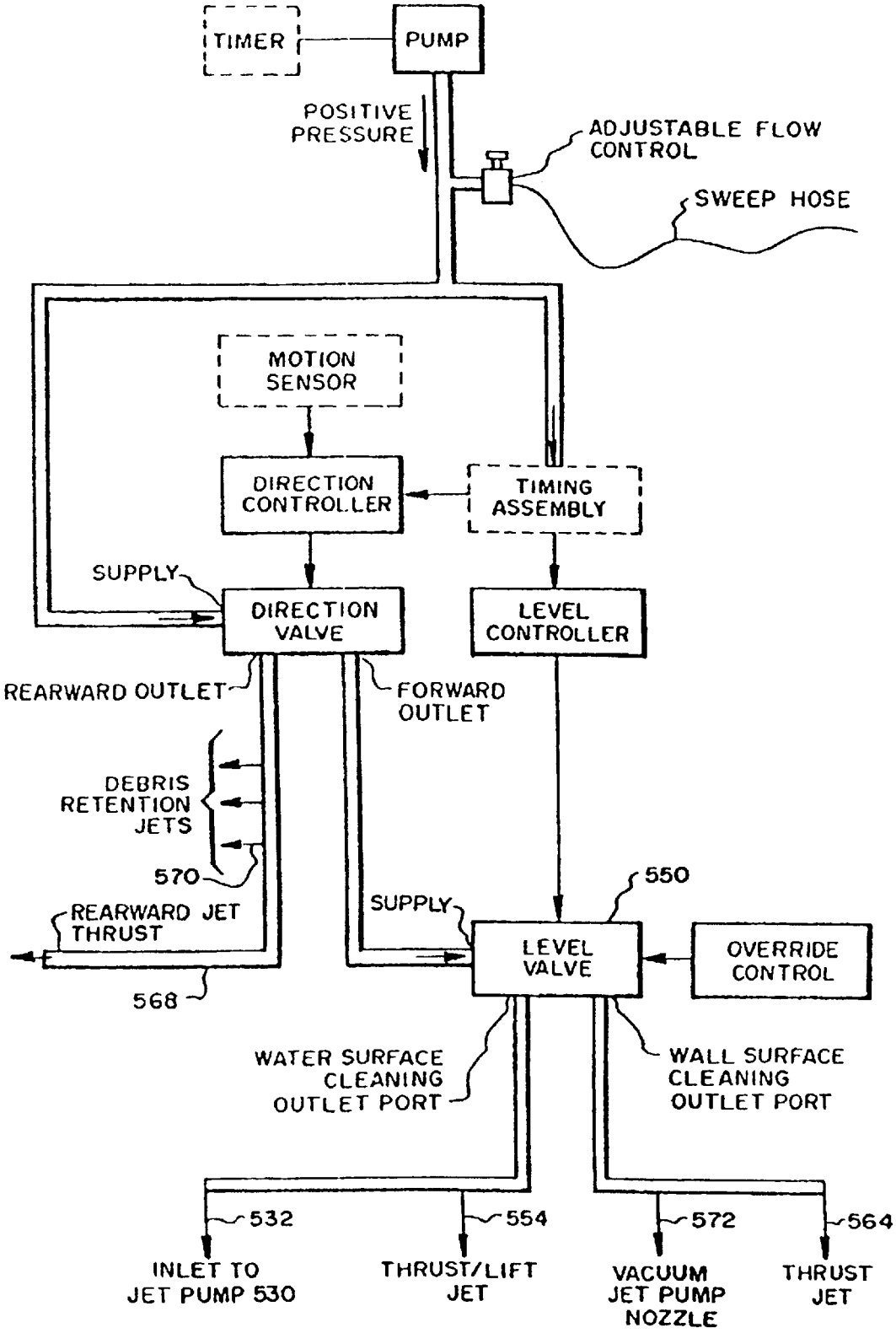

In the second heavier-than-water embodiment 500 depicted in FIGS. 17A–17C, the vertical force to maintain the body at the water surface is produced in part by selectively modifying the weight/buoyancy characteristic of the body 502. The body 502 is configured similarly to body 100 but differs primarily in the following respects:

1—Front fin 517 is provided with an air hole 518, preferably near its upper edge 520, opening into interior chamber 522.

2—Side walls 526L, 526R respectively define interior chambers 528L, 528R.

3—Awater powered jet pump 530 is provided for selectively pulling water out of, and air into, chambers 522, 528L, 528R. Jet pump 530 is supplied by positive pressure water via inlet 532 to create a suction at port 534 and a discharge at outlet 536.

4—Tubing 540 extends from suction port 534 to drain ports 542L, 542R in the bottom panel of chambers 528L, 528R. Tubing 544 extends from the top of chambers 528L, 528R to drain port 546 in the bottom panel of front chamber 522.

5—Skimmer jets 110 can be deleted.

In the wall surface cleaning mode, the body 502 (FIGS. 17A–15 17C) will operate essentially the same as the body 100 (FIGS. 2–16). However, in the water surface cleaning mode, the level valve 550 (FIG. 17C) will supply positive pressure water to inlet 532 of pump 530 to draw water from chambers 522, 528L 528R, via tubing 540, 544, while the body is concurrently lifted by water outflow from Forward Thrust/Lift Jet 554. After the body rises sufficiently to place air hole 518 above the water surface, pump 530 will pull air in via hole 518 to fill chambers 522, 528L, 528R. By replacing the water in chambers 522, 528L, 528R with air, the weight/buoyancy characteristic of the body 502 is modified to first elevate and then stabilize body 502 proximate to the water surface with the deck 560 just below the water surface for effective skimming action. When level valve 550 next switches to the wall surface cleaning mode, positive pressure water flow to pump inlet 532 terminates, allowing pool water to backflow into jet pump 530 to fill the chambers 522, 528L, 528R with water, and force air out through hole 518, thus causing the body 500 to descend to the wall surface bottom.

The Skimmer Jets 110 of the first embodiment may be deleted from the embodiment 500. The outer water outlets (i.e., Forward Thrust Jet 564, Rearward (backup) Thrust Jet 568, Debris Retention Jet 570, and Vacuum Jet Pump Nozzle 572) perform essentially the same in body 502 as in previously described body 100.

THIRD EMBODIMENT (FIGS. 18A, 18B, 18C)

Figure 18A:
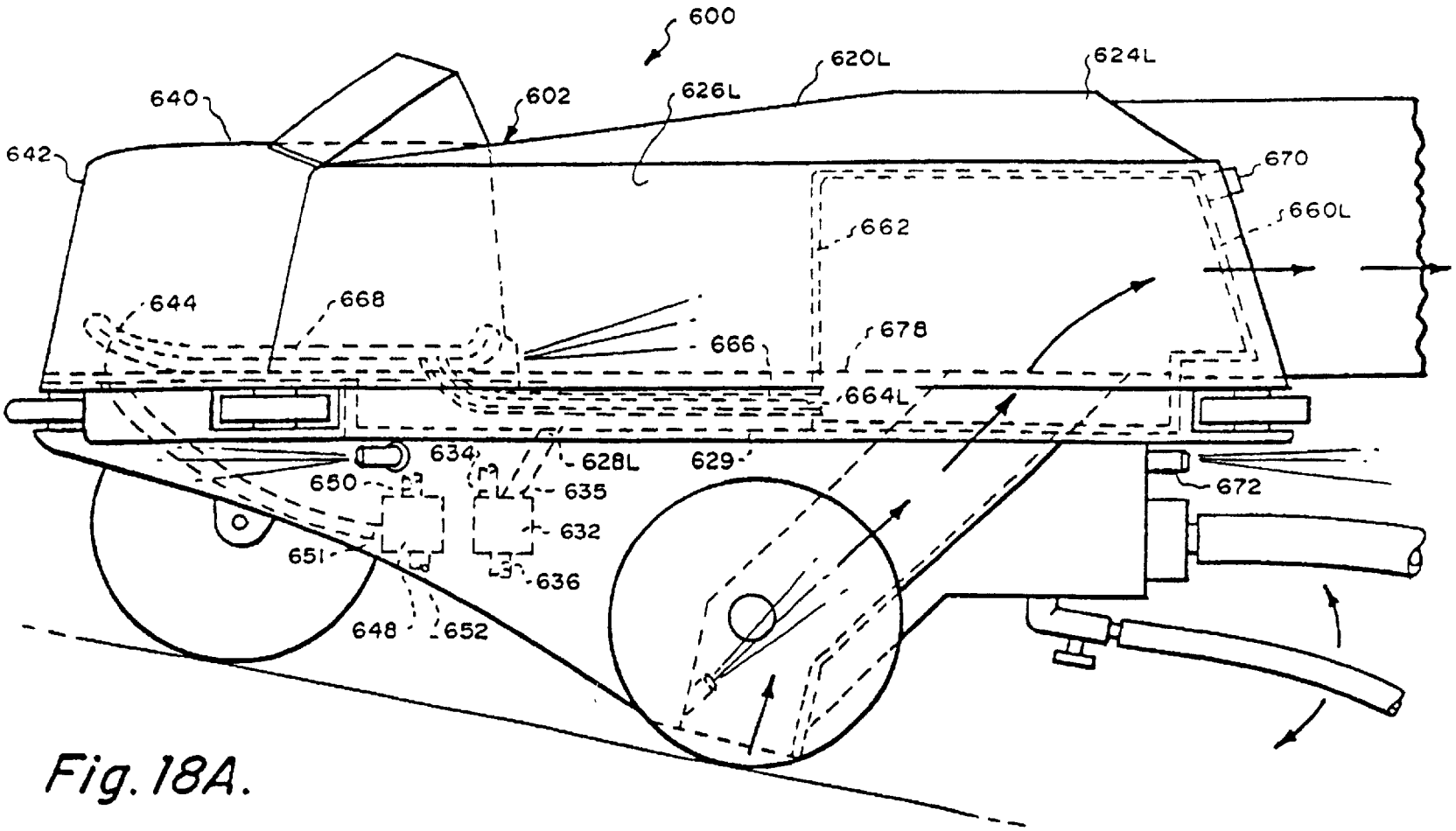
FIGS. 18A, 18B and 18C depict a third heavier-than-water embodiment of the invention respectively schematically showing a side view, an isometric view, and a functional block diagram.
Figure 18B:
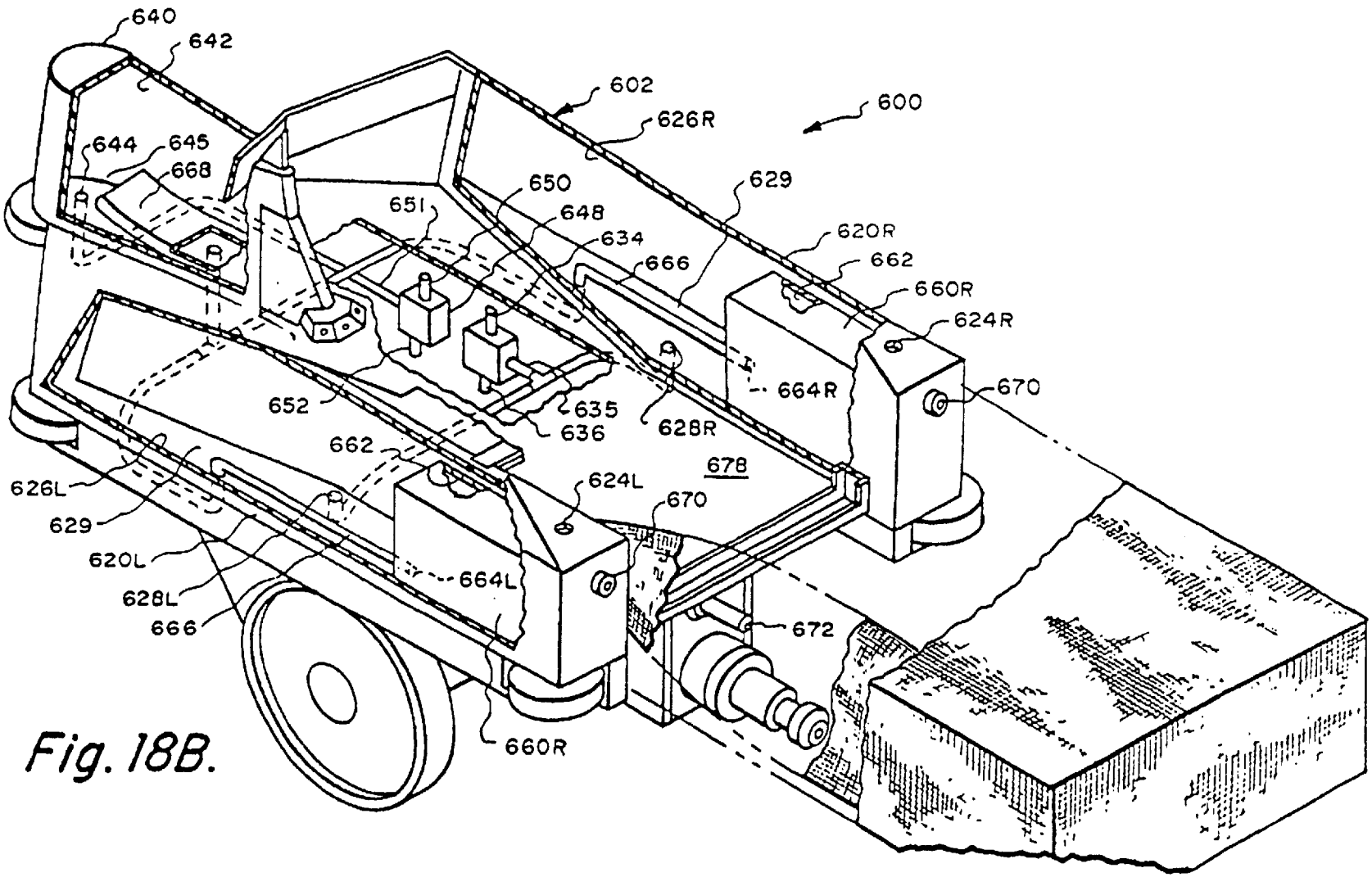
Figure 18C:
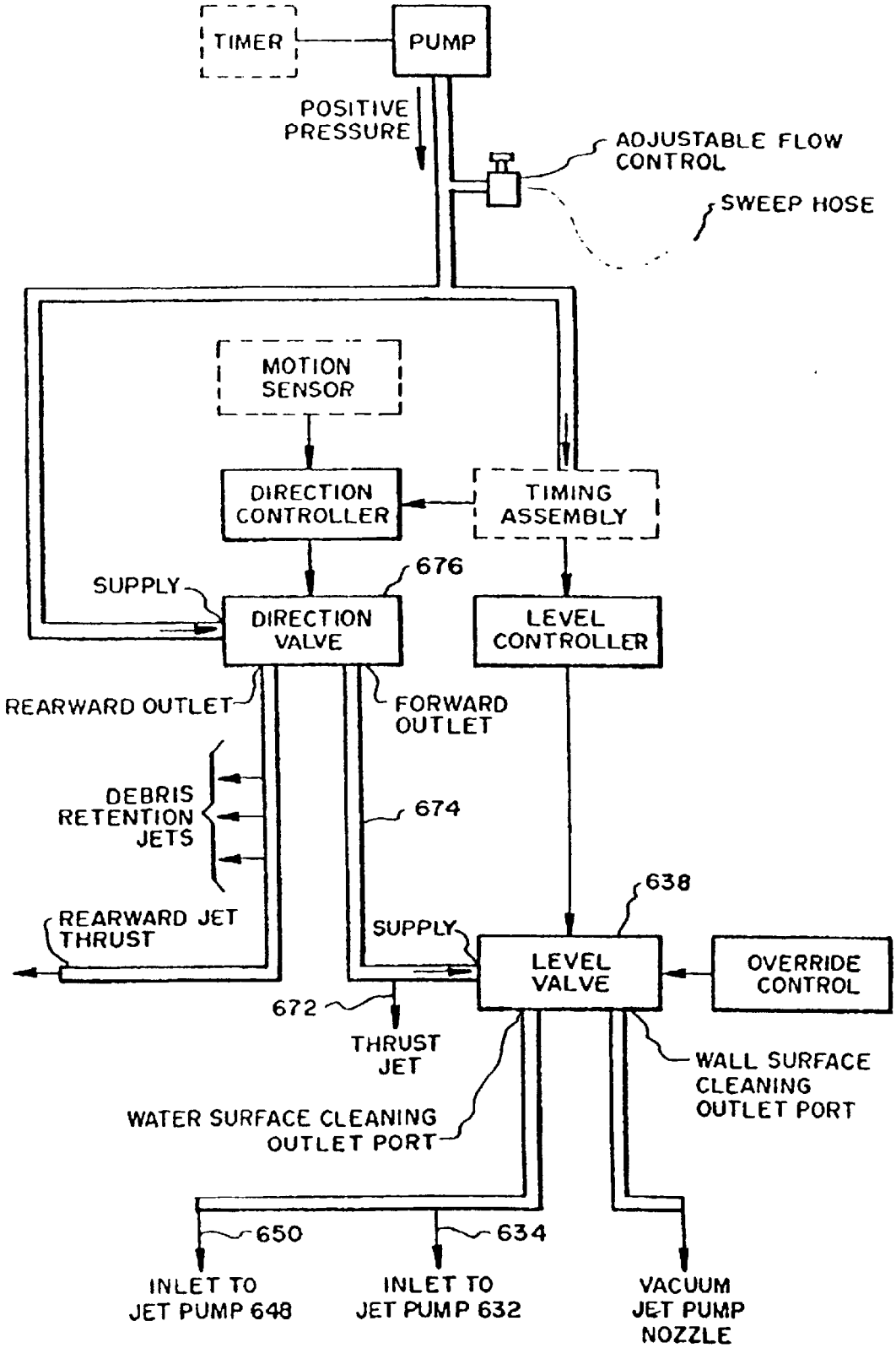

Attention is now directed to FIGS. 18A–18C which illustrate a third embodiment 600 comprising a heavier-than-water body 602. As will be seen, the embodiment 600 differs from the first embodiment depicted in FIGS. 2–16 in that the vertical force required to lift the body 602 to the water surface and maintain it at the water surface is produced primarily by selectively modifying the weight/buoyancy characteristic of the body 602 rather than directly by a water outflow. The body 602 is configured similarly to body 100 but differs primarily in the following respects:

1—Sidewalls 620L, 620R respectively define air holes 624L, 624R near their upper surfaces which open into central interior chambers 626L, 626R, The chambers 626L, 626R respectively define drain ports 628L, 628R opening through bottom panel 629.

2—A water powered jet pump 632 is provided having a supply inlet 634, a suction port 635, and a discharge outlet 636. The suction port 653 is coupled to drain ports 628L, 628R. When positive pressure water is supplied to pump inlet 634 from level valve 638 (FIG. 18C) in the water surface cleaning mode, a suction is created at port 635 to draw water out of chambers 626L, 626R. When valve 638 switches to the wall surface cleaning mode, the positive pressure supply to inlet 634 terminates and pool water flows backwards through pump 632 to fill central chambers 626L, 626R via drain ports 628L, 628R.

3—Front fin 640 defines a front interior chamber 642 having a drain port 644 in bottom panel 645.

4—A water powered jet pump 648 is provided having a supply inlet 650, a suction port 651 and a discharge outlet 652. When positive pressure water is supplied to jet pump 648 from level valve 638 (FIG. 18C) in the water surface cleaning mode, a suction is created at port 651 to draw water out of chamber 642. When the supply to inlet 650 terminates, pool water flows backwards through pump 648 to fill front chamber 642 via drain port 644.

5—Rear interior chambers 660L, 660R are respectively formed rearwardly of central chambers 626L, 626R by partition wall 662. The chambers 660L, 660R open via ports 664L, 644R and tubing 666 to a flaccid bag 668 physically contained within front chamber 642. The chambers 660L, 660R are filled with air at atmospheric pressure (prior to installation) via a removable plug 670.

6—Skimmer Jets 110 and Forward Thrust Lift Jet 106 of the first embodiment can be deleted from the embodiment 600 of FIGS. 18A–18C. Note in FIG. 18C that the Thrust Jet 672 is supplied from the forward outlet 674 of the direction valve 676 rather than from the level valve 638.

When operating in the wall surface cleaning mode, the front chamber 642 and central chambers 626L, 626R will be filled with water, primarily via backflow through pumps 648, 632, and flaccid bag 668 will be collapsed by the water in chamber 642. When operation is switched to the water surface cleaning mode by level valve 638, jet pump 648 pumps water out of front chamber 642 to permit bag 668 to inflate with air supplied from rear chambers 660L, 660R. This action fills chamber 642 with air (at a pressure less than atmospheric) enabling the body 602 to float to the water surface and lift air holes 624L, 624R above the water surface. With the holes 624L, 624R above the water surface, jet pump 632 evacuates water from central chambers 626L, 626R and fills them with air thereby providing additional buoyancy to elevate and stabilize the body 602 and position the deck 678 at just below the water surface for effective skimming action.

When valve 638 switches back to the wall surface cleaning mode, the positive pressure water supply to pump inlets 634 and 650 terminates allowing pool water to backflow through jet pumps 632, 648 into central chambers 626L, 626R and front chamber 642. As a consequence, bag 668 collapses forcing its interior air back into rear chambers 660L, 660R while the air in central chambers 626L, 626R flows out of air holes 624L, 624R as pool water fills the central chambers. As a consequence, the body 602 will descend to the wall surface bottom.

The Skimmer Jets 110 and Forward Thrust/Lift Jet 106 of the first embodiment may be deleted from the embodiment 600. The other water outlets (i.e., Forward Thrust Jet, Rearward (backup) Thrust Jet and Vacuum Jet Pump Nozzle) perform essentially the same in body 602 as in previously described body 100. Note that the Thrust Jet 672, because of its placement at the forward outlet 674 of direction valve 676 (FIG. 18C), operates to provide forward propulsion in both cleaning modes.

FOURTH EMBODIMENT (FIGS. 19A, 19B, 19C)

Figure 19A:
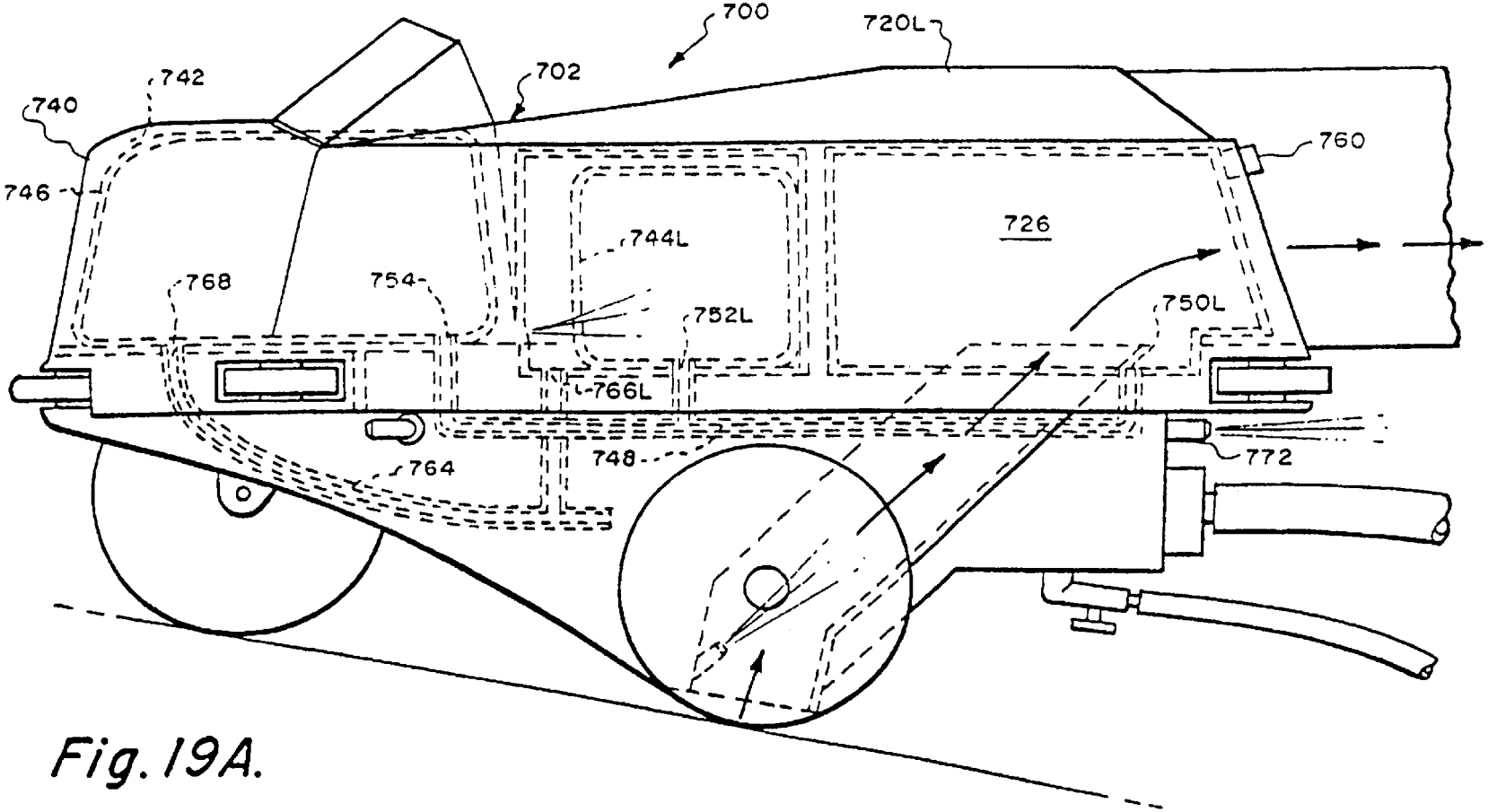
FIGS. 19A, 19B, and 19C depict a fourth lighter-than-water embodiment of the invention respectively schematically showing a side view, an isometric view, and a functional block diagram.
Figure 19B:
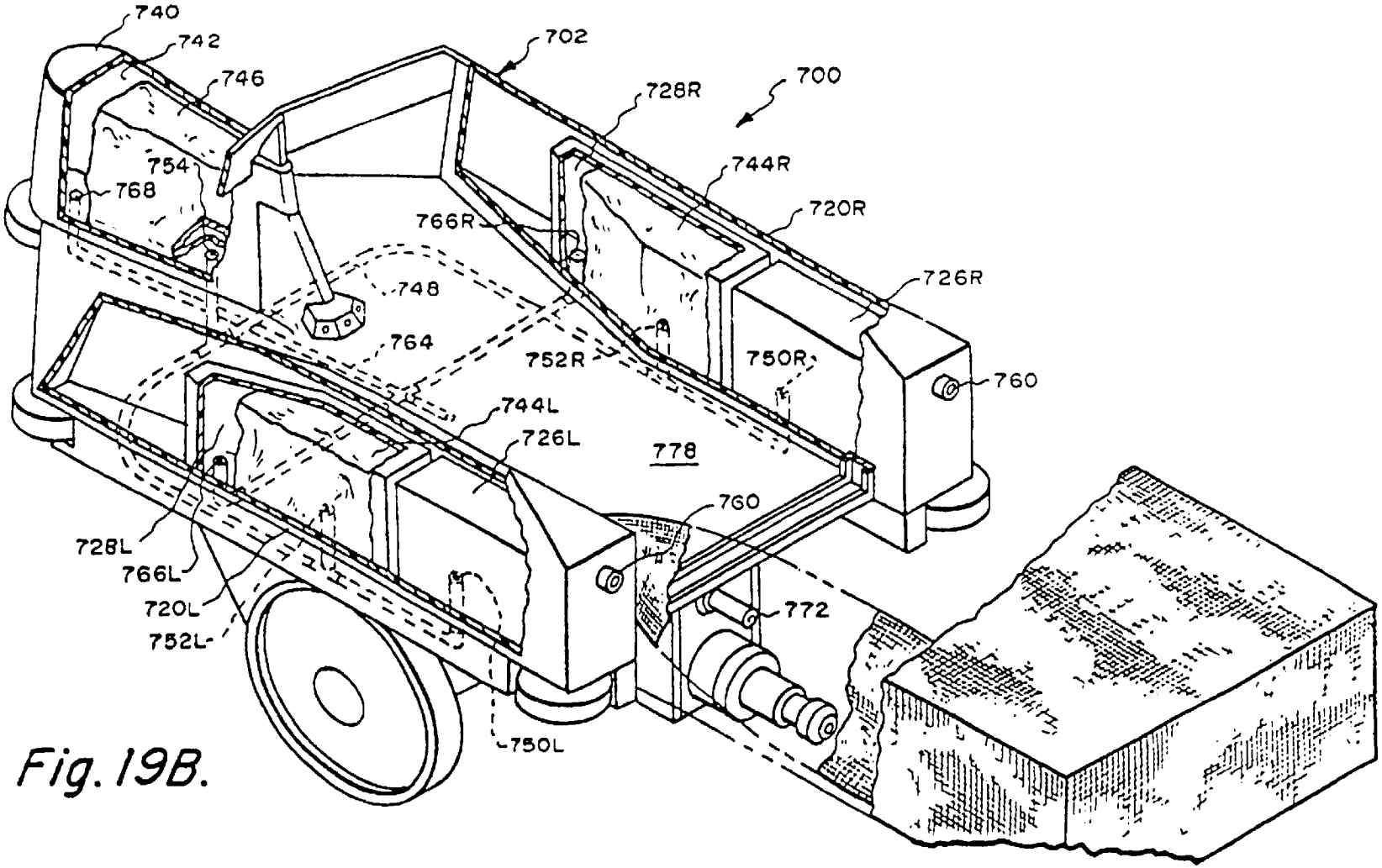
Figure 19C:
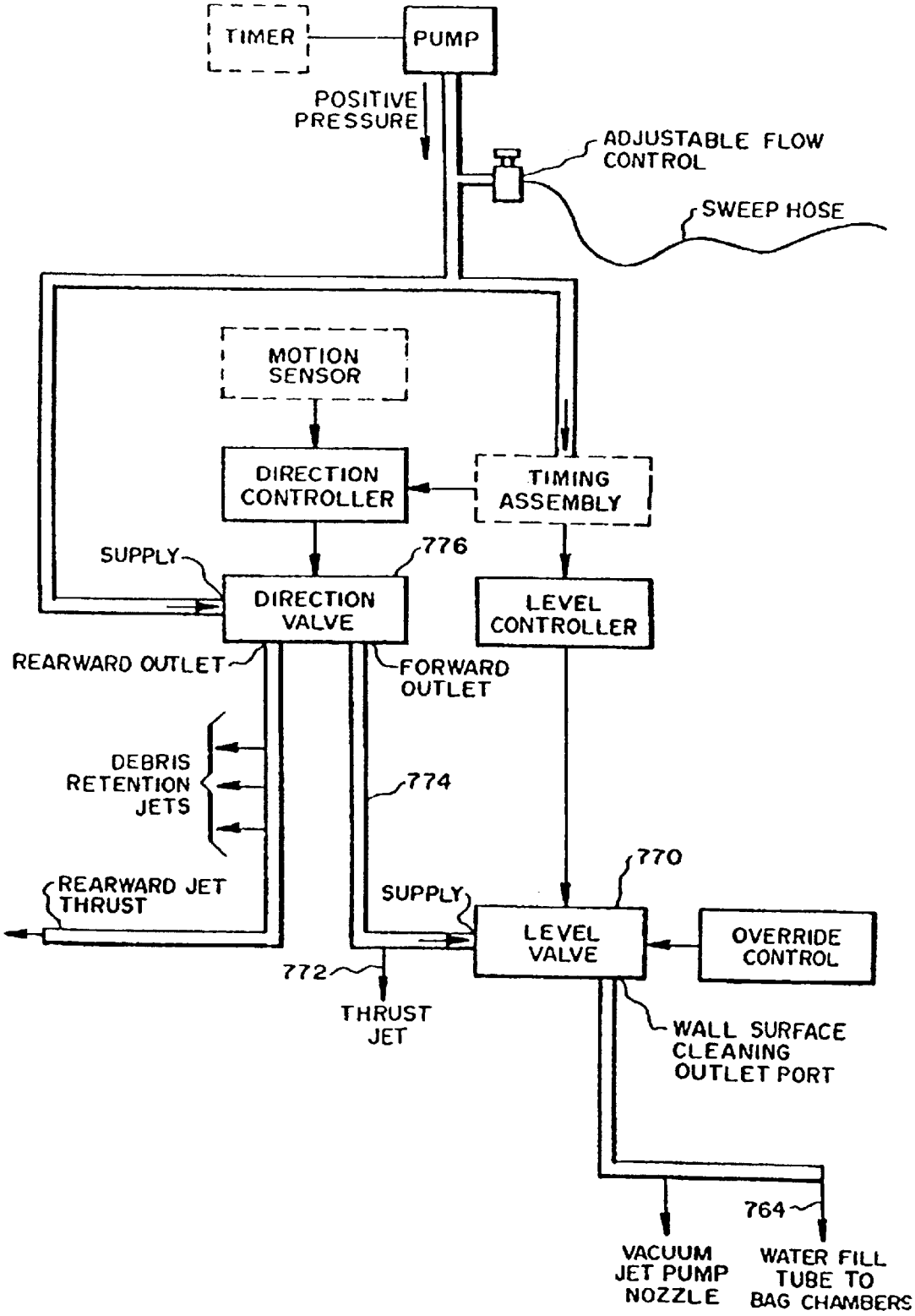

Attention is now directed to FIGS. 19A–19C which illustrate a fourth embodiment 700 comprising a body 702. Whereas the first three embodiments thus far described were referred to as being heavier-than-water inasmuch as they sink in a quiescent or rest state and are lifted to the water surface in an active state, the body 702 can be considered as being lighter-than-water inasmuch as it floats in its quiescent state and is caused to descend in an active state. As will be described hereinafter, the body 702 is caused to descend in the wall surface cleaning mode primarily by selectively modifying its weight/buoyancy characteristic. The body 702 is configured similarly to body 100 but differs primarily in the following respects:

1—Sidewalls 720L defines a rear interior chamber 726L and a central chamber 728L. Similarly sidewall 720R defines rear and central chambers 726R, 728R.

2—Front fin 740 defines a front interior chamber 742.

3—Central chambers 728L, 728R and front fin chamber 742 respectively contain flaccid bags 744L, 744R, and 746.

4—An air tube 748 is provided opening into rear chambers 726L, 726R at 750L, 750R and into flaccid bags 744L, 744R and 746 at 752L, 752R and 754. The rear chambers 726L, 726R and flaccid bags 744L, 744R and 746 are filled with air at atmospheric pressure (prior to installation) via removable plugs 760.

5—A tube 764 is provided to selectively supply positive pressure water to central chambers 728L, 728R via outlets 766L, 766R and to front fin chambers 742 via outlet 768.

6—Skimmer Jets 110 and Forward Thrust Lift Jet 106 of the first embodiment can be detected from the embodiment 700 of FIGS. 19A–19C.

In operation in the water surface cleaning mode, rear chambers 726L, 726R and flaccid bags 744L, 744R and 746 will all be filled with air at atmospheric pressure to produce a net buoyancy which floats the body at the water surface. When operation is switched to the wall surface cleaning mode by valve 770 (FIG. 19C), this will supply pressurized water via water fill tube 764 to outlets 766L, 766R and 768. This action will collapse flaccid bags 744L, 744R, and 746 and force the air therein via air tube 748, into rear chambers 726L, 726R at a pressure above atmospheric.

When valve 770 (FIG. 19C) switches back to the water surface cleaning mode, the positive water pressure supplied to tube 764 is terminated, permitting the compressed air in rear chambers 726L, 726R to expand to fill bags 744L, 744R and 746 thus modifying the weight/buoyancy characteristic of the body to enable it to float to the water surface.

The water outlets (i.e., Rearward (backup) Thrust Jet, and Vacuum Jet Pump Nozzle) perform essentially the same in body 702 as in previously described body 100. However, the Forward Thrust Jet 772 is supplied directly from the forward outlet 774 (FIG. 19C) of the direction valve 776 (FIG. 19C) so that it operates in both cleaning modes to provide forward propulsion.

Figure 20:
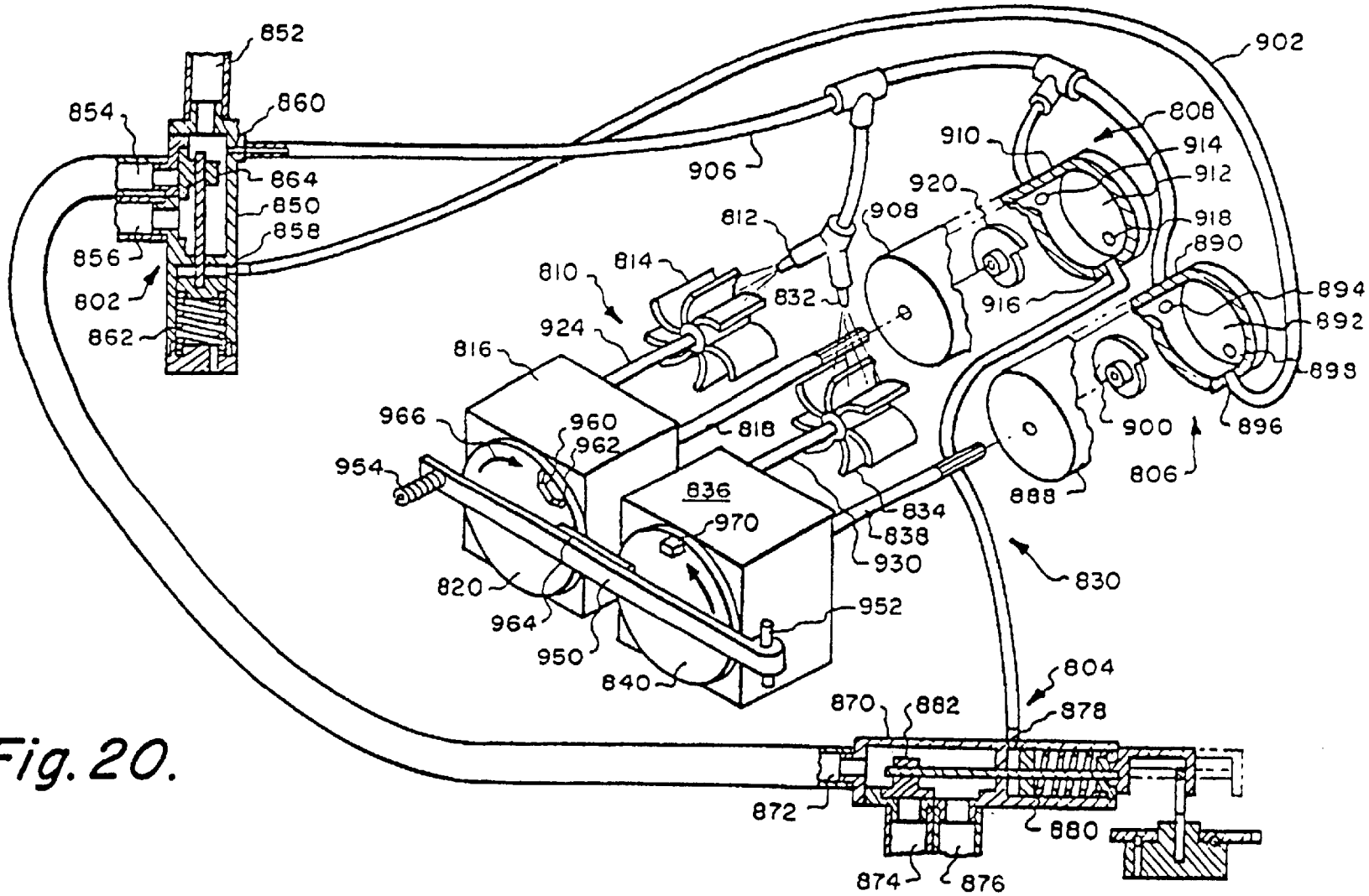
FIG. 20 is a schematic representation of a water flow distributor implementation alternative to FIG. 12A.
Figure 21:
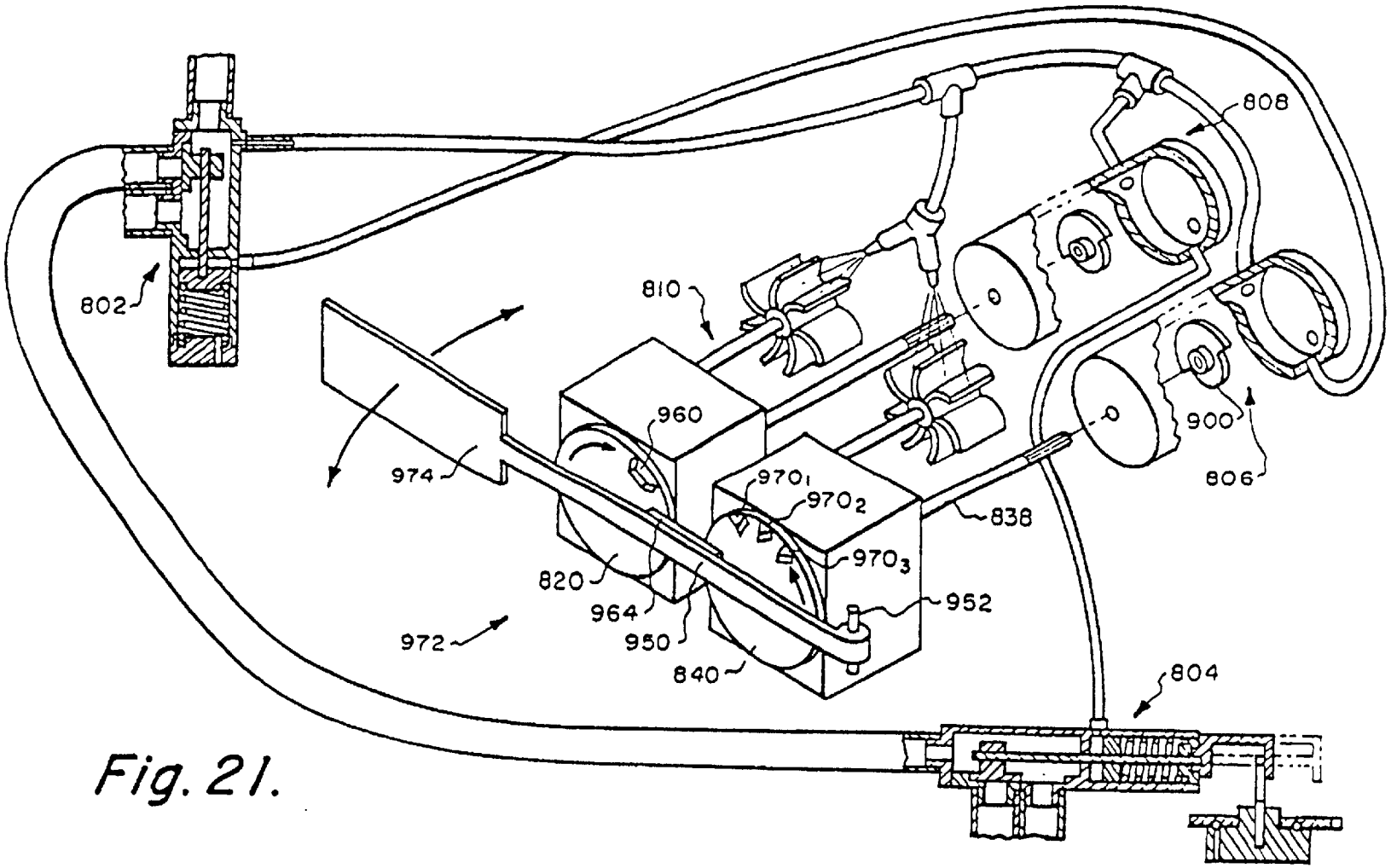
FIG. 21 is a schematic representation of a water flow distributor implementation alternative to FIG. 13.

The water distribution systems of FIGS. 17C, 18C, and 19C can each be implemented substantially as shown in FIGS. 12A or 13. Attention is now directed to FIGS. 20 and 21 which respectively depict implementations alternative to those shown in FIGS. 12 and 13.

More particularly, FIG. 20 illustrates a water distribution system implementation 800 basically comprised:

a. Direction valve assembly 802 b. Level valve assembly 804 c. Direction controller 806 d. Level controller 808 e. Level controller timing assembly 810 primarily comprised of nozzle 812, turbine 814, timing gear train 816, output shaft 818, and timing disk 820.

f. Direction controller timing assembly 830 primarily comprised of nozzle 832, turbine 834, timing gear train 836, output shaft 838, and timing disk 840.

The direction valve assembly 802 and level valve assembly 804 can be substantially identical to the corresponding elements discussed in conjunction with FIG. 12A. More particularly, direction valve assembly 802 is comprised of a cylindrical body 850 defining a supply inlet 852, a forward outlet 854, a rearward outlet 856, a control port 858, and a pressurized water outlet 860. Spring 862 biases valve element 864 to the backup state, i.e., with forward outlet 854 closed and rearward outlet 856 open. When positive water pressure is supplied to control port 858, valve element 864 moves downwardly to define the forward state, i.e., with forward outlet 854 open and rearward outlet 856 closed.

Level valve assembly 804 is similarly comprised of a cylindrical body 870 which defines a supply inlet 872, a wall surface outlet 874, a water surface outlet 876, and a control port 878. Spring 880 biases valve element 882 to the water surface cleaning mode, i.e., with wall surface outlet 874 closed and water surface outlet 876 open. When positive water pressure is supplied to control port 878, valve element 882 is moved to define the wall surface mode with water surface outlet 876 closed and wall surface outlet 874 open.

Direction controller 806 and level controller 808 are substantially identical to the corresponding elements discussed in conjunction with FIG. 12A. Direction controller 806 is comprised of a cylindrical body 888 having a peripheral wall 890 and an end wall 892. The peripheral wall 890 defines an inlet 894 and an outlet 896. The end wall 892 defines an exhaust port 898. A disk shaped valve element 900 is mounted on the aforementioned output shaft 838 for rotation in the body 888. During a portion of its rotation, valve element 900 seals exhaust port 898 enabling positive pressure applied to inlet 894 to be transferred via outlet 896 and tube 902 to direction valve control port 858. During the remaining portion of its rotation, exhaust port 898 is open and positive pressure water from inlet 894 is exhausted through port 898 so that no significant pressure is applied to control port 858. Positive pressure water is supplied to inlet 894 via tubing 906 coupled to pressurized water outlet 860.

Level controller 808 also comprises a cylindrical body 908 having a peripheral wall 910 and an end wall 912. The peripheral wall 910 defines an inlet 914 and an outlet 916. The end wall defines an exhaust port 918. A disk shaped valve element 920 is mounted on aforementioned output shaft 818 for rotation in the level controller body 908. During a portion of its rotation, valve element 920 seals exhaust port 918 enabling positive pressure applied to inlet 914 to be transferred via outlet 916 to level valve control port 878. During the remaining portion of its rotation, exhaust port 918 is open and positive pressure water from inlet 914 is exhausted through port 918 so that no significant pressure is applied to control port 878. Positive pressure water is supplied to inlet 910 via aforementioned tubing 906.

Tubing 906 also supplies positive pressure water to nozzles 812 and 832 to respectively rotate turbines 814 and 834. Turbine 814 is mounted on shaft 924 and drives gear train 816 to drive output shaft 818. Additionally, gear train 816 drives timing disk 820. Similarly, turbine 834 drives shaft 930 which via gear train 836 drives output shaft 838. Gear train 836 additionally drives timing disk 840.

As can be seen in FIG. 20, timing disks 820 and 840 are mounted side by side in the same plane. A latch bar 950 mounted for hinged movement around pin 952 between a latched and unlatched position extends across the faces of disks 820 and 840. Spring 954 normally urges latch bar 950 toward the latched position proximate to the faces of disks 820 and 840. Disk 820 carries one or more lifter cams 960 on its face. Lifter cam 960 preferably has a ramp at its leading edge 962 configured to engage latch element 964 to lift latch 950 to its unlatched position as the disk 820 rotates in the direction of arrow 966.

Disk 840 carries one or more stop elements 970 on its face, each configured to engage latch element 964 to stall rotation of disk 840 and output shaft 838 in its forward state when latch bar 950 is in its latched position. Stop element 970 is oriented relative to valve element 900 such that its engagement against latch element 964 acts to maintain direction controller 806 and direction valve 802 in the forward state. Periodically, when lifter cam 960 on disk 820 lifts latch bar 950 to its unlatched position, stop element 970 moves past latch element 964 enabling disk 840 and valve element 900 to rotate through substantially 360° passing through the backup or rearward state and returning to the forward state. At some point in its cycle, stop member 970 again engages latch element 964 thus stalling direction controller 806 in the forward state.

Thus, to summarize the operation of FIG. 20, rotation of the turbine 814 drives the gear train 816 to cause the level controller 808 to alternately define the wall surface and water surface cleaning modes. As the gear train 816 rotates, lifter cam 960 periodically lifts latch bar 950 to its unlatched position enabling stop element 970 of disk 840 (driven by turbine 834) to move past latch element 964 to cycle through the backup state. Although FIG. 20 depicts a single fixedly positioned lifter cam 960 and a single fixedly positioned stop element 970 on the face of disks 820 and 840 respectively, it is pointed out that a more complex and detailed timing pattern could be achieved if desired by utilizing multiple lifter cams and/or stop elements, and/or mounting them so that their respective positions on the disks can be varied.

Attention is now directed to FIG. 21 which illustrates a water distribution system 972 similar to that depicted in FIG. 20 but modified to sense when the forward motion of the cleaner body diminishes below a certain threshold. This can occur, for example, when the body gets trapped by an obstruction, such as the entrance to a built-in pool skimmer. In such an instance, it is generally desirable to promptly cycle the direction controller 806 to the backup state in order to free the cleaner body. To introduce this capability, the system of FIG. 21 differs from FIG. 20 in that the latch. bar 950 is no longer spring urged to the latched position. Rather, a paddle 974 is mounted at the free end of latch bar 950 and oriented such that forward motion of the cleaner body through the water pivots bar 950 around pin 952 toward the disks 820, 840, i.e., the latched position. As long as the forward motion of the cleaner body remains above a certain threshold sufficient to press the latch element 964 with sufficient force to prevent movement of stop element 970 past latch element 964, direction controller 806 will remain in its forward state (except for periodic interruption by lifter cam 960, e.g., once every five minutes). If, however, the forward motion of the cleaner body diminishes below the threshold, the ramped leading edge of stop element 970, will lift bar 950 and move past latch element 964 as disk 840 and output shaft 838 are allowed to turn. If disk 840 carries only a single stop element 970, this action immediately initiates the valve element 900 cycle through the backup state and then to the forward state. FIG. 21, however, depicts multiple spaced stop elements $970_1$, $970_2$, $970_3$ which function to essentially introduce a time delay in the forward state before the valve element 900 cycle is launched. Thus, if in the interval after the first stop element $970_1$ passes latch element 964, and prior to a subsequent stop element, i.e., $970_2$ or $970_3$ passing latch element 964, the cleaner body frees itself and resumes its forward motion, then the initiation of the subsequent stop element will engage latch element 964 to stall output shaft 838 movement and defer rotation of valve element 900 to the backup state.

Figure 22A:
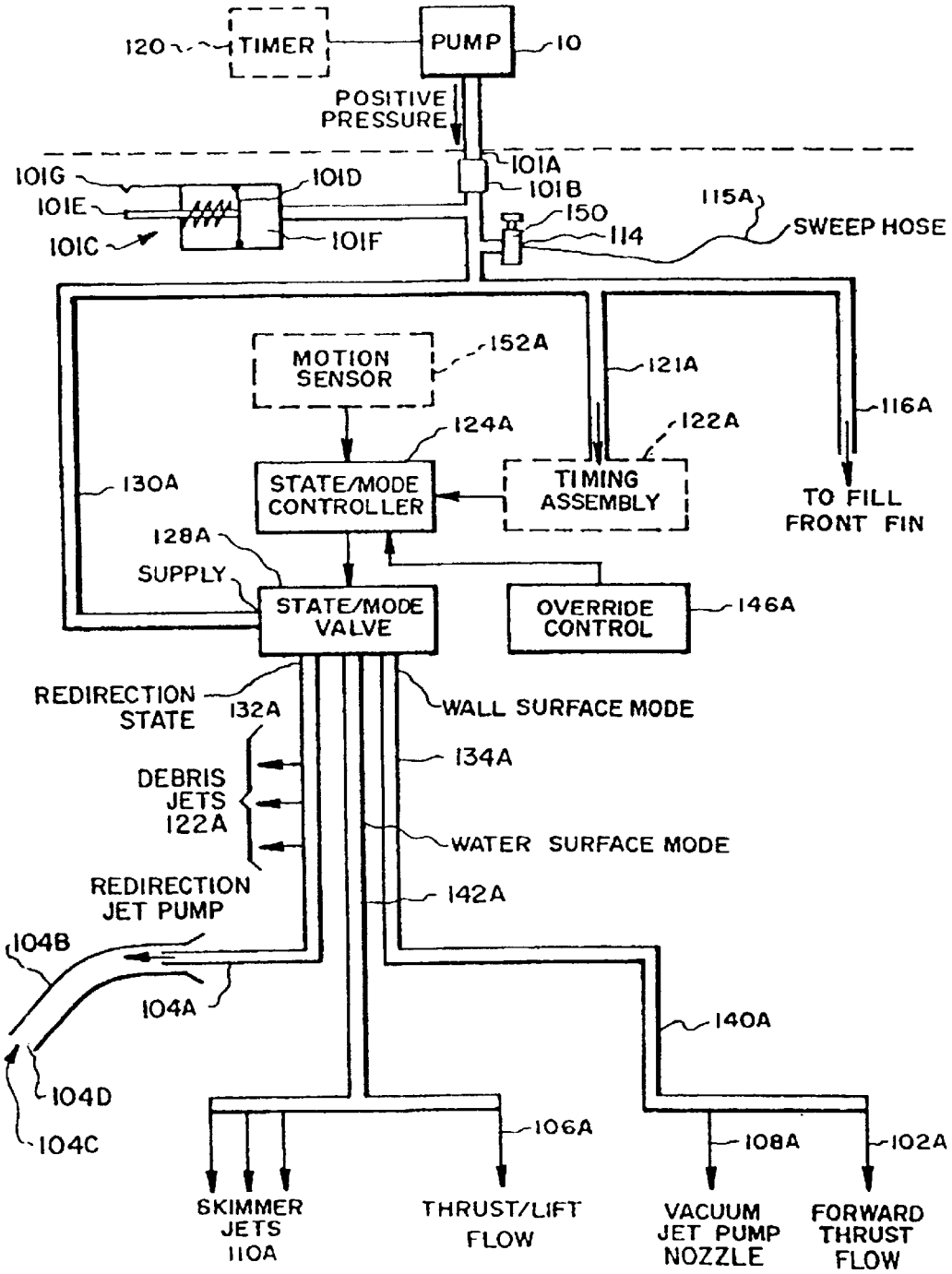
FIG. 22A is a functional block diagram of a water flow distribution subsystem alternative to that shown in FIG. 3 for use with the cleaner body of FIG. 2.

Attention is now directed to FIG. 22A which schematically depicts a preferred arrangement, alternative to FIG. 3, for distributing positive pressure water supplied to inlet 101A to the various outlets of the body 100 of FIG. 2, depending upon the defined mode and state.

Figure 22C:
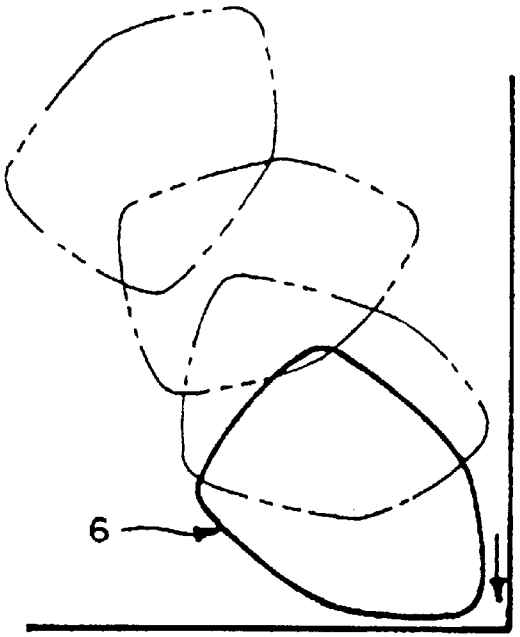
FIG. 22B shows the orientation of the redirection jet pump discharge relative to the body, and FIG. 22C schematically depicts how the body typically reacts during the redirection state.
Figure 22B:
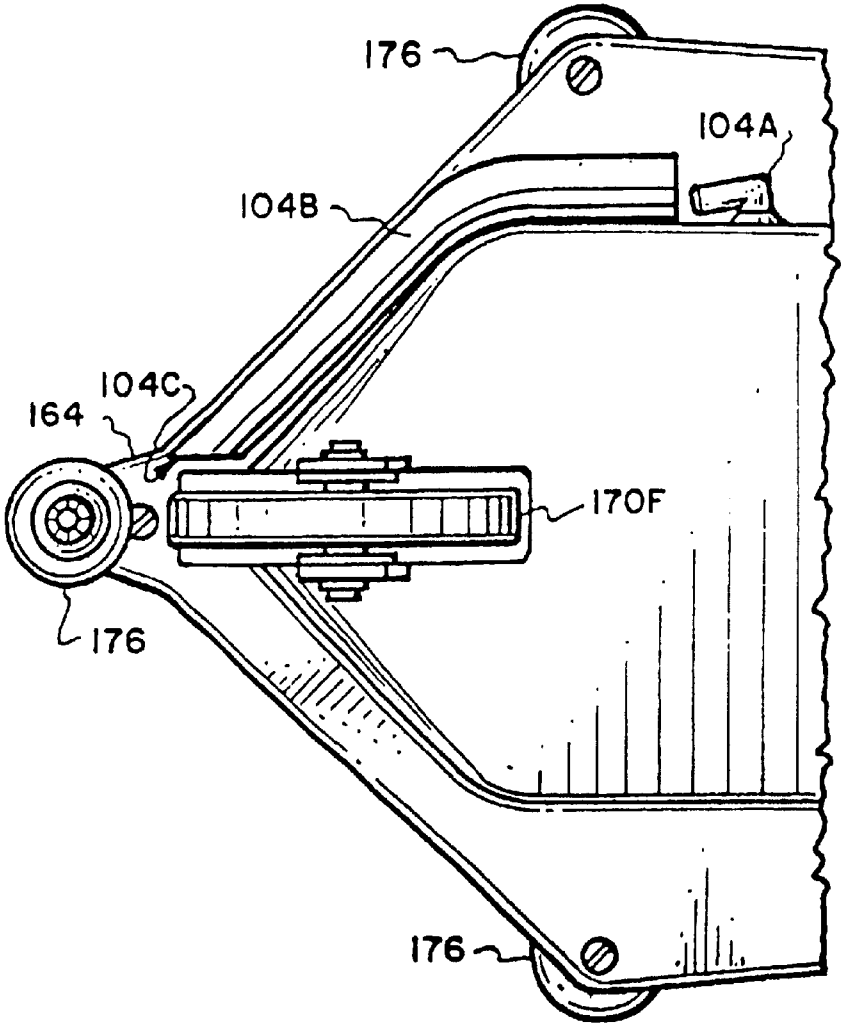

More particularly, water supplied to inlet 101A passes through in-line filter 101B and is directed via inlet 121A to an optional timing assembly 122A (to be discussed in detail in connection with FIG. 23) which operates a state/mode controller 124A. The controller 124A controls a state/mode valve 128A to place it either in a redirection (e.g., backup) state, or in a forward state defining a water surface mode or a wall surface mode. When in the redirection state, water from supply inlet 101A is directed via valve supply inlet 130A to outlet 132A for discharge through the debris jets 112A and redirection nozzle 104A. Nozzle 104A and open tube 104B from a jet pump 104C which increases the effectiveness of the discharge from nozzle 104A. That is, nozzle 104A discharges into the throat of tube 104B to pull or entrain additional pool water into the tube so that discharge orifice 104D delivers an outflow of greater mass at lower velocity as compared to the discharge from nozzle 104A. Note (FIG. 22B) that the tube 104B preferably bends toward the nose of the body to discharge an outflow having a significant lateral component, i.e., substantially perpendicular to the longitudinal front-to-rear direction of the body. The effect of the outflow is to redirect the body, that is extricate from obstructions, as is generally represented in FIG. 22C which first shows the body in solid line and then succeeding positions in phantom line. When the redirection state expires, controller 124A will switch to the forward state to resume body forward motion.

When in the forward state/wall surface mode, water from supply inlet 101A is directed through outlet 134A to the vacuum jet pump nozzle 108A and the forward thrust jet 102A. When in the forward state/water surface mode, water from supply inlet 101A is directed through outlet 142A to the thrust lift jet 106A and the skimmer jets 110k.

Note also in FIG. 22A that an override control 146A is provided for enabling a user to selectively place the valve 128A, via controller 124A, in either the wall surface cleaning mode or the water surface cleaning mode. Also note that the positive pressure water delivered to supply inlet 101 A is preferably also distributed via an adjustable flow control device 150A and the aforementioned sweep hose outlet 114A to sweep hose 115A. Additionally, note that the positive pressure water supplied to inlet 101A is preferably also directed to fill outlet 116A for filling a chamber interior to the hollow front fin previously discussed in connection with FIG. 8. It is also pointed out that the body preferably carries a pressure indicator 101C comprised of a housing containing a diaphragm 101D carrying an indicator pin 101E. The diaphragm and housing together define a chamber 101F which is coupled to the water distribution system (FIG. 22A) just downstream from in-line filter 101B. The pressure in chamber 101F bears against diaphragm 101D to establish the position of indicator pin 101E relative to an index marker 101G. This relative positioning indicates to a user whether or not the magnitude of the supplied positive pressure is within the appropriate operating range for the unit.

The system of FIG. 22A can be implemented and operated in many different manners, but it will be assumed for purposes of explanation that the valve 128A is caused to be in the water surface cleaning mode about fifty percent of the time and the wall surface cleaning mode about fifty percent of the time. As was mentioned in conjunction with the description of FIG. 3, this scenario can be implemented by, for example, responding to a particular event such as the cycling of an external pump, or by the expiration of a time interval. The valve 128A switches from the forward state to the backup state in response to the expiration of a time interval and/or a reduction of forward body motion. Reduced forward body motion can be detected by an optional motion sensor 152A configured to recognize diminished forward motion below a certain threshold to cause valve 128A to switch to its backup state. A preferred implementation of the water flow distribution system of FIG. 22A is depicted in FIGS. 23–28, described hereinafter.

Figures 23A, 23B:
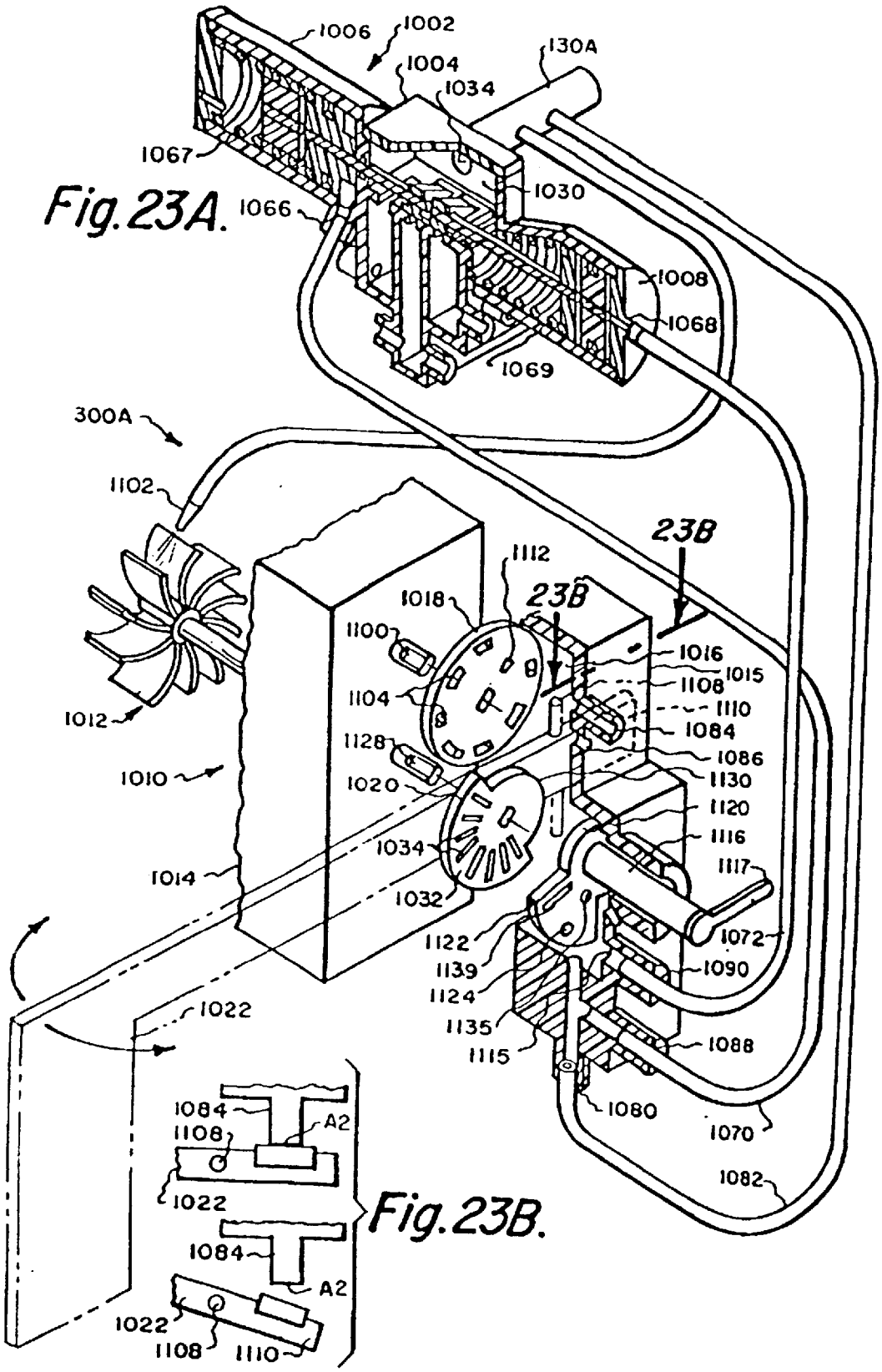
FIG. 23A is a schematically representation of a preferred implementation of the distributed subsystem of FIG. 22
FIG. 23B is an enlarged view of a portion of FIG. 23A showing the relationship between the motion sensor paddle and the main relief port.

Attention is now directed to FIG. 23A which illustrates a preferred implementation 300A of the water distribution system depicted in FIG. 22A. The implementation 300A is basically comprised of:

a. Valve assembly 1002 (implementing state/mode valve 128A of FIG. 22A) comprising valve body 1004, state actuator 1006 and mode actuator 1008; and b. Controller assembly 1010 (implementing sate/mode controller 124A, motion sensor 152A, timing assembly 122A and override control 146A of FIG. 22A) comprising turbine 1012, gear box 1014, housing 1015 defining interior chamber 1016, state disk 1018, mode disk 1020, motion sensor paddle 1022, and override disk 1024.

Figure 24A:
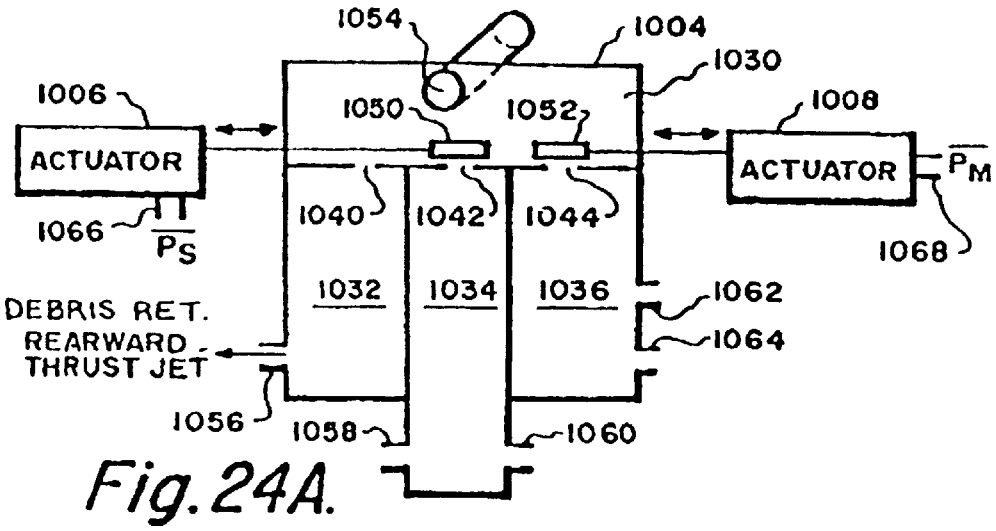
FIGS. 24A, 24B, 24C depict different positions of the valve subassembly of FIG. 23A for the backup state, the forward state/water surface mode, and the forward state/wall surface mode, respectively.
Figure 24B:
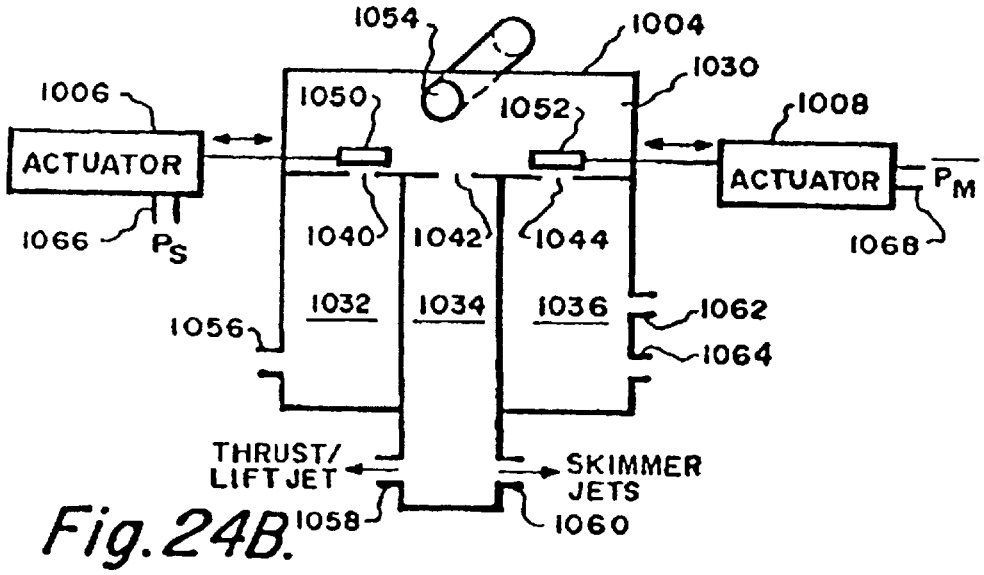
Figure 24C:
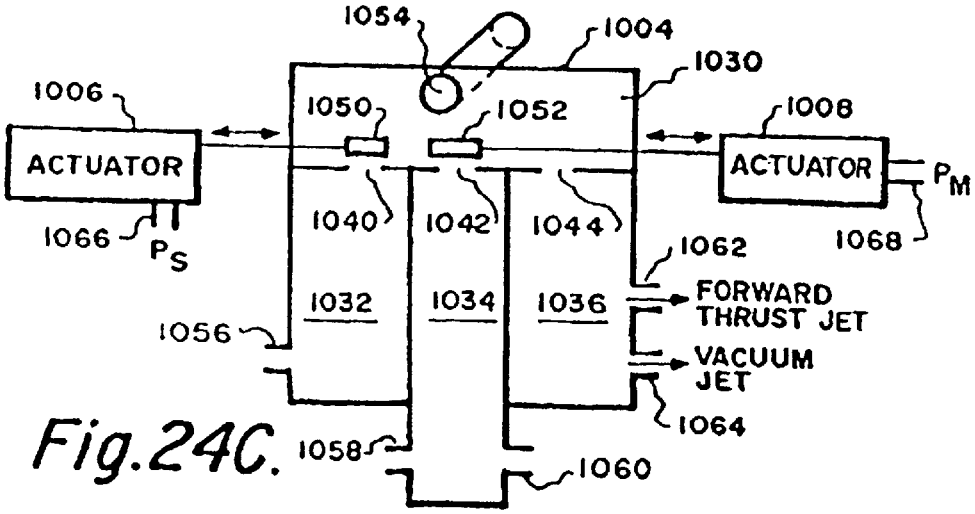

FIGS. 24A, 24B, 24C schematically depict the various operational states and modes of the valve assembly 1002; i.e., the backup state (FIG. 24A), the forward state/water surface mode (FIG. 24B), and the forward state/wall surface mode (FIG. 24C). The valve body 1004 defines an inlet chamber 1030 and three outlet chambers 1032, 1034, 1036. Ports 1040, 1042, 1044 respectively couple inlet chamber 1030 to outlet chambers 1032, 1034, 1036. Valve elements 1050 and 1052, respectively controlled by actuators 1006 and 1008, operate to selectively couple the inlet chamber 1030 to only one outlet chamber at a time.

Inlet chamber 1030 defines an inlet port 1054 which is supplied with high pressure water via supply inlet 130A. Outlet chamber 1032 defines an outlet port 1056 which is coupled to the aforementioned rearward thrust jet 104A and debris retention jets 112A. Outlet chamber 1034 defines outlet ports 1058 and 1060 which are respectively coupled to the aforementioned thrust lift jet 106A and skimmer jets 110A. Outlet chamber 1036 defines the outlet ports 1062 and 1064 which are respectively coupled to the aforementioned forward thrust jet 102A and vacuum jet pump nozzle 108A.

The actuators 1006 and 1008 comprise conventional hydraulic cylinders and are controlled by the selective application of a positive control pressure to their respective control ports 1066 and 1068. The absence of a positive pressure applied to state actuator control port 1066 is represented by the terms $\overline{Ps}$ and allows state actuator spring 1067 to position valve element 1050 to close port 1042. The presence of a positive pressure applied to port 1066 is represented by the terms Ps and causes state actuator 1006 to move valve element 1050 to the left to close port 1040. Similarly, with respect to mode actuator 1008, a positive pressure applied to control port 1068 is represented by the term Pm which moves valve element 1052 to the left to close port 1042. The absence of a positive pressure applied to control port 1068, represented by the term $\overline{Pm}$, allows mode actuator spring 1069 to move valve element 1052 to the right to close port 1044.

The following table I summarizes the various operational conditions for the valve assembly 1002 which are depicted in FIGS. 24A, 24B,24C:

| STATE CONT. PRESS. | MODE CONT. PRESS. | STATE/MODE | FIG. |
|---|---|---|---|
| $\overline{Ps}$ (default) | (default) | BACKUP | 24A |
| Ps | $\overline{Pm}$ | FORWARD/WATER SURFACE | 24B |
| Ps | Pm | FORWARD/WALL SURFACE | 24C |

The controller assembly 1010 functions to selectively apply positive pressure to actuator control ports 1066 and 1068, via tubes 1070 and 1072 in accordance with various operating conditions to be discussed hereinafter with reference to FIGS. 23A, 23B and 25–28.

Initially note that the controller assembly housing 1015 defines the following external ports communicating with interior chamber 1016:

a. inlet supply port 1080 which receives high pressure water via tube 1082 to fill interior chamber 1016;

b. main relief port 1084, which is either open or closed dependent on the action of state disk 1018 and motion sensor paddle 1022 to either relieve or maintain pressure in the chamber 1016;

c. supplemental relief port 1086 which is normally closed to maintain pressure in chamber 1016 but which opens once per cycle of the state disk 1018 to relieve pressure in the chamber;

d. outlet state port 1088 which transfers the pressure in chamber 1016 to state actuator control port 1066 (i.e., either Ps or $\overline{Ps}$);

e. outlet mode port 1090 which is either open or closed dependent on the action of mode disk 1020 and override disk 1024; when open, port 1090 transfers the pressure in chamber 1016 to mode actuator control port 1068 (i.e., either Pm or $\overline{Pm}$).

The state disk 1018 is mounted on shaft 1100 which is continuously rotated by turbine 1012, via gearing (not shown) in gear box 1014, driven by a waterflowdelivered by nozzle 1102 from the high pressure supply 130A. The state disk 1018 defines a plurality of openings 1104 extending therethrough arranged along an outer annular track. The disk 1018 is mounted on shaft 1100 in interior chamber 1016 adjacent to the entrance aperture A1 to main relief port 1084. When the disk 1018 aligns an opening 1104 with aperture A1, aperture A1 is said to be open and its open condition is represented by the term A1. When no disk opening 1104 is aligned with aperture A1, the aperture is said to be closed and its condition is represented by the term $\overline{A1}$.

The exit aperture A2 of main relief port 1084 is open or closed by the action of paddle 1022. The paddle is mounted to pivot on pin 1108 such that when the cleaner body 100 is moving forward, in either the water surface or wall surface modes, the paddle tail 1110 will close the aperture A2. When forward motion falls below a certain threshold, the exit aperture will open attributable to water pressure within chamber 1016. These open and closed conditions of exit aperture A2, respectively represented by the terms A2 and $\overline{A2}$, are depicted in FIG. 23B.

Inasmuch as the entrance aperture A1 and exit aperture A2 are arranged in series, the relief port 1084 will be open to relieve pressure in chamber 1016 and at outlet state port 1088 when apertures A1 AND A2 are open (which can be expressed in logic notation as (A1*A2). Relief port 1084 is closed when either aperture A1 OR A2 is closed; i.e., A1+A2.

State disk 1018 defines an inner annular track shown as containing a single opening 1112 placed to align with supplemental relief port 1086 once per state disk cycle. When aligned, the entrance aperture A0 to port 1086 is open, expressed as A0, and when misaligned, the aperture is closed, expressed as $\overline{A0}$.

Thus, the pressure available at outlet state port 1088 for application to state actuator control port 1066 can be summarized in logic notation as:

$$\overline{Ps}=(A1*A2)+A0$$

$$Ps=(\overline{A1}+\overline{A2})+\overline{A0}$$

It will be recalled from table I that when the state control pressure is $\overline{Ps}$, the valve assembly 1002 defines the default backup state. When the control pressure has a value of Ps, the forward state is defined which for a mode control pressure value of Pm will be the water surface mode and for value $\overline{Pm}$ will be the wall surface mode.

In typical operation, the cleaner body will stay in the forward state for a full cycle of state disk 1018. It will be switched to the backup state once per cycle when opening 1112 moves into alignment with supplemental relief port 1086. Throughout the remainder of the state disk cycle, if the forward motion of the body is sufficient to cause the paddle tail 1110 to close aperture A2, the periodic opening of aperture A1 (attributable to movement of disk openings 1104 therepast) will have no effect. If the body's forward motion falls below a certain threshold allowing paddle tail 1110 to swing away and open aperture A2, then when a disk opening 1104 moves into alignment with aperture A1, the backup state will be initiated. It is parenthetically pointed out that the openings 1104 are preferably comprised of different length openings (long and short) alternately arranged along the annular track. In typical situations, a short backup state interval (initiated by a short opening 1104) will suffice to extricate the cleaner body from an obstruction which interrupted its forward motion. The longer openings 1104 are provided to create longer backup state intervals which may occasionally be desired for more significant obstructions.

Figure 27:
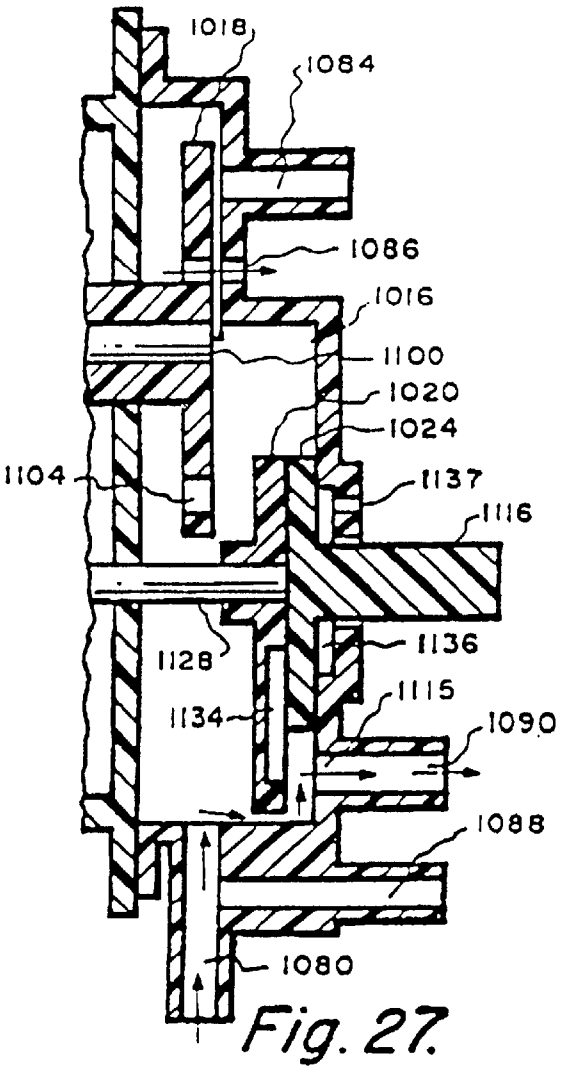
FIGS. 25, 26, 27 show a cross-section through a preferred control assembly for different respective positions of the manual override disk.

In the forward state, the pressure at the outlet mode port 1090, i.e., either Pm or $\overline{Pm}$, is determined by the rotational position of mode disk 1020 and override disk 1024 relative to the entrance to port 1090. The override disk 1024 is mounted immediately adjacent to the entrance 1115 to port 1090 on shaft 1116 whose rotational position is intended to be set by a user, e.g., by a handle 1117. The override disk 1024 is configured so it can define three distinct user selectable conditions relative to the port entrance 1115; namely, a. Condition A4 in which entrance 1115 is open regardless of the position of mode disk 1020 (FIG. 27);

b. Condition $\overline{A4}$ in which entrance 1115 is closed regardless of the position of mode disk 1020 (FIG. 26); and c. Condition A4 in which entrance 1115 is either open or closed dependent on position of mode disk 1020 (FIG. 27). In this position, the override disk is essentially disabled and the system operates automatically.

Figure 26:
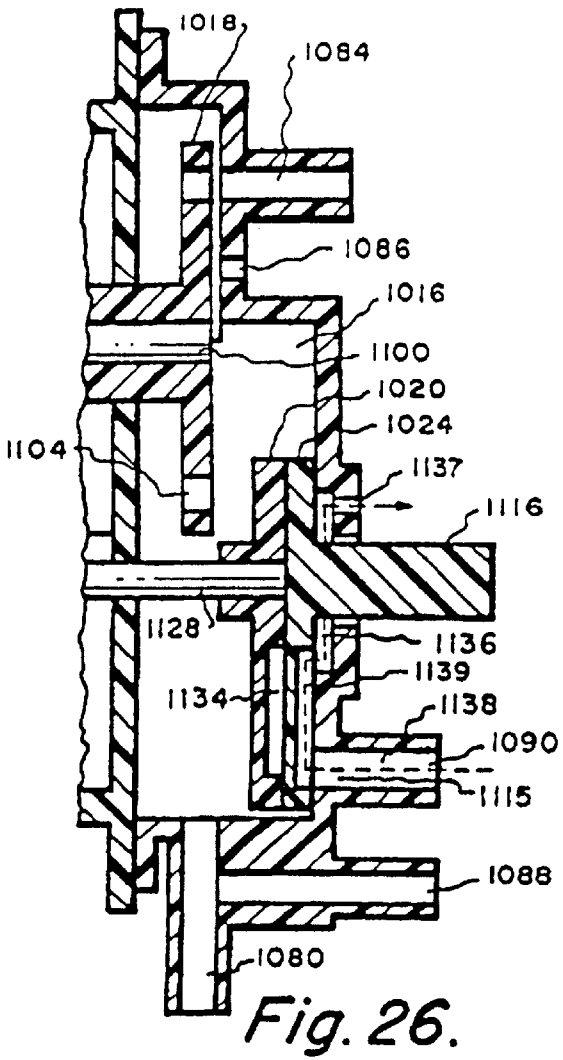
Figure 25:
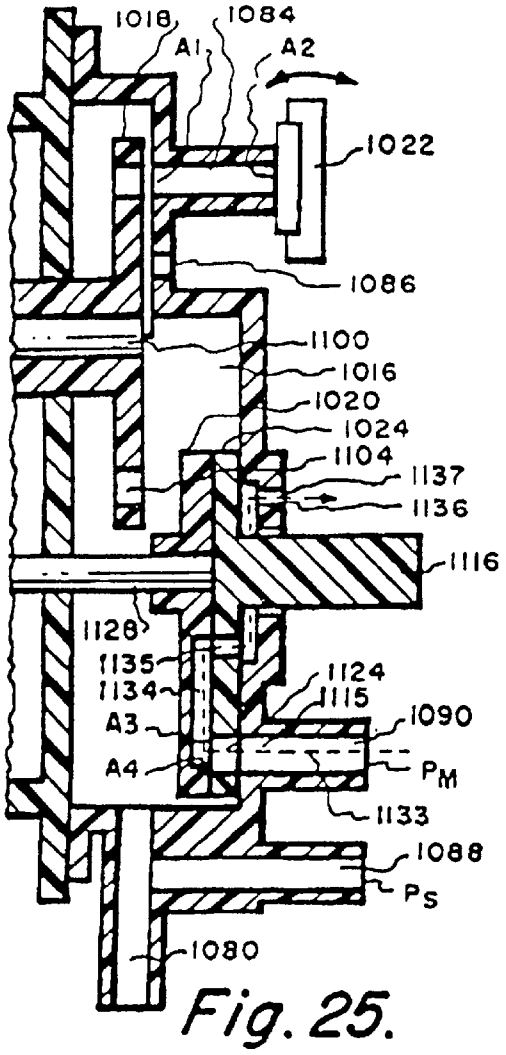

In order to function in the aforedescribed manner, the override disk 1024 is configured with first and second arcuate portions of different radii; i.e., a small radius portion 1120 and a large radius portion 1122. When the large radius portion 1122 is adjacent port entrance 1115, as represented in FIG. 26, condition $\overline{A4}$ is defined in which the port 1090 is blocked from chamber 1016. Thus, for condition $\overline{A4}$, the mode control pressure valve is low $\overline{Pm}$. However, the portion 1122 includes an opening 1124 situated so that it can be aligned with port entrance 1115. When aligned (condition A4 as represented in FIG. 25), the override disk is essentially disabled and port 1090 will either be open or closed dependent on the position of mode disk 1020. FIG. 27 depicts the third condition A4 when the small radius portion 1120 of override disk 1024 is proximate to the port entrance 1115. This position establishes an open path to the chamber 1016 regardless of the orientation of mode disk 1020.

The mode disk 1020 is mounted on and is rotated by shaft 1128 which is continually driven by turbine 1012 via gearing (not shown) in gear box 1014. The mode disk 1020 is configured with first and second arcuate portions of different radii; i.e., a small radius portion 1130 and a large radius portion 1132. The mode disk 1020 is mounted immediately adjacent to the override disk 1024. When the override disk is in the position represented in FIG. 25, the orientation of mode disk 1020 determines whether the output mode port 1090 opens to chamber 1016. Port 1090 will be open to chamber 1016 when mode disk portion 1130 is proximate to opening 1124 in override disk 1024. When mode disk 1020 rotates to move portion 1132 proximate to opening 124, the mode disk will cover and close the opening. The open and closed conditions are respectively defined by the terms A3 and $\overline{A3}$.

The following table 11 summarizes the aforementioned terms and in logic notation sets forth the respective conditions for producing the mode control pressure value Pm or $\overline{Pm}$.

| VARIABLES | OPEN | CLOSED | DISABLE |
|---|---|---|---|
| (1) State Disk Aperture | A1 | $\overline{A1}$ | |
| (2) Motion Sensor Aperture | A2 | $\overline{A2}$ | |
| (3) Mode Disk Aperture | A3 | $\overline{A3}$ | |
| (4) Override Disk Aperture | A4 | $\overline{A4}$ | A4 |
| (5) Periodic Backup Aperture | A0 | $\overline{A0}$ | |
| STATE | | | |
| BACKUP | $\overline{Ps} = (A1*A2) + A0$ | | |
| FORWARD | $Ps = (\overline{A1} + \overline{A2})*\overline{A0}$ | | |
| MODE | | | |
| WATER SURFACE | $\overline{Pm} = [(\overline{A1} + \overline{A2})*\overline{A0}]*[(\overline{A3}*A4) + \overline{A4}]$ | | |
| WALL SURFACE | $Pm = [(\overline{A1} + \overline{A2})*\overline{A0}]*[(A3*A4) + A4]$ | | |

When the mode control pressure drops from high Pm to low $\overline{Pm}$, the mode actuator spring 1069 forces the actuator piston to the right requiring the displacement of water from port 1068 back through tube 1072. To permit this reverse flow through tube 1072, drainage paths are defined by the override disk 1024 and the mode disk 1132 as shown in FIGS. 25 and 26. More particularly, FIG. 25 shows a drainage path 1133 through port 1090, override disk opening 1024, one of the multiple radial trenches 1134 in mode disk 1020, override disk opening 1135, annular recess 1136 and out through housing drainage port 1137.

In FIG. 26, the drainage path 1138 is via radial trench 1139 and then through annular recess 1136 and housing drainage port 1137.

Reference is now directed to FIG. 28 which depicts a timing chart describing the operation of the controller assembly 1010 for an exemplary situation.

It will be assumed that the state disk 1018 completes a full cycle in about three minutes and the mode disk 1020 completes a full cycle in about twelve minutes. It will also be assumed that the water surface mode and wall surface mode have substantially equal durations; i.e., that the mode disk arcuate portions 1130 and 1132 subtend equal angles. It should be understood that these assumed quantities can be readily modified by a change in gearing and/or disk geometry. It should also be understood that although sharp edge transitions have been shown for the sake of simplicity in FIG. 28, in actuality all transitions would have a discernable slope.

Line (a) of FIG. 28 represents aforementioned aperture A0 which is opened once per state disk cycle at 1140 as a consequence of opening 1112 aligning with relief port 1086.

Line (b) represents aforementioned aperture A1 which opens periodically as state disk openings 1104 align with the entrance to main relief port 1084. Note that line (b) represents long openings 1104 at 1142 and short openings at 1144.

Line (c) represents the functioning of aperture A2 for an assumed action of the motion sensor paddle 1022. When the cleaner body forward motion exceeds a threshold rate, paddle 1022 closes aperture A2 (as at 1146) and when the body encounters an obstruction to drop the rate of forward motion below the threshold, aperture A2 opens (as at 1148).

Line (d) represents aperture A3 which is closed at 1150 when the mode disk large arcuate portion 1132 blocks port entrance 1115. When the mode disk rotates to bring the small arcuate portion 1130 proximate to the port entrance, aperture A3 opens at 1152.

Line (e) represents the functioning of aperture A4 for an assumed action of the override disk 1024. The values $\overline{A4}$ A4, and A4 are represented at 1158, 1160, and 1162, respectively.

Line (f) represents the pressure applied to state control port 1066 attributable to the conditions represented in lines (a) through (e). It will be recalled that pressure values $\overline{Ps}$ and Ps respectively produce the backup and forward states. Line (f) shows the pressure at Ps 1164 because the aforementioned equation $Ps=(\overline{A1}+\overline{A2})*\overline{A0}$ is satisfied. The pressure drops to Ps at 1166 to initiate the backup state because aperture A1 and A2 are both open (lines (b) and (c)) at 1144 and 1148 thus satisfying the equation $\overline{Ps}=(A1*A2)+A0$.

Line (g) represents the pressure applied to mode control port 1068 attributable to the conditions represented in lines (a) through (e). Note that the pressure value is $\overline{Pm}$ (water surface mode) at 1170 because the aperture A3 is closed (i.e. value $\overline{A3}$) at 1150 in line (d). The pressure value is show as changing to Pm (wall surface mode), at 1172 attributable to the override disk (line (e)) being switched to value A4 at 1160. With the override disk disabled (i.e., A4) at 1162, the value of aperture A3 at 1152, causes the mode port pressure to have a value of Pm (wall surface mode) at 1174. The mode port pressure is shown as switching to $\overline{Pm}$ at 1176 when the override disk (line (e)) is switched to A4.

Figure 29:
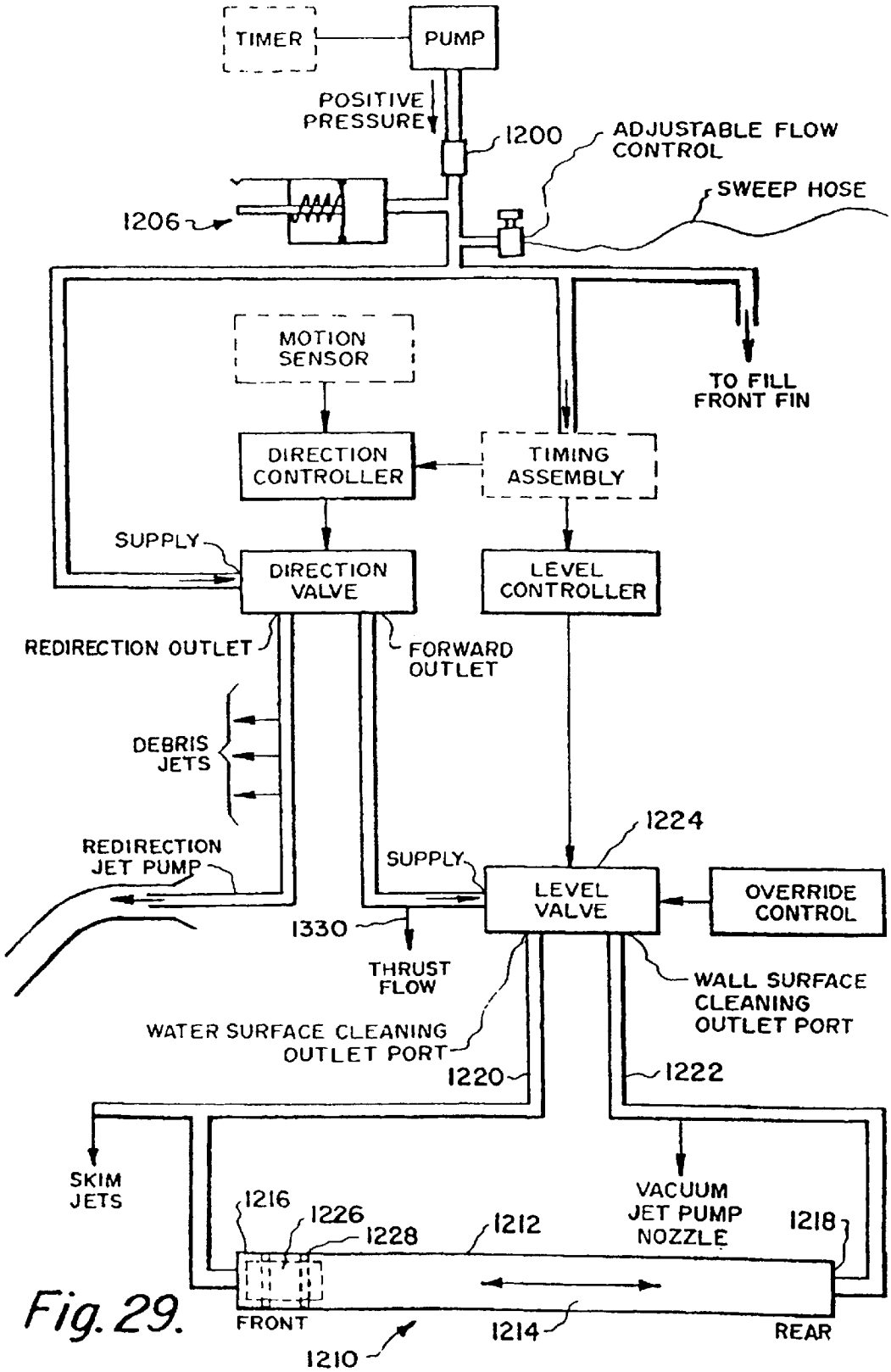
FIG. 29 is a functional block diagram similar to FIG. 18C but modified particularly to introduce a weight shift subsystem for controlling the pitch of the cleaner body.
Figure 30:
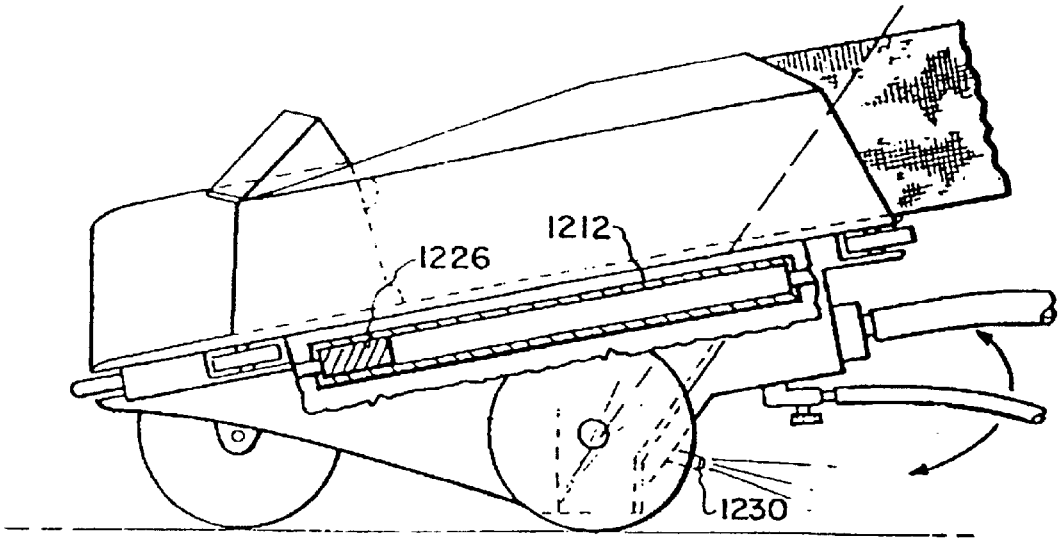
FIGS. 30 and 31 respectively depict the body pitch in (1) a nose down/tail up orientation and (2) a nose up/tail down orientation.
Figure 31:
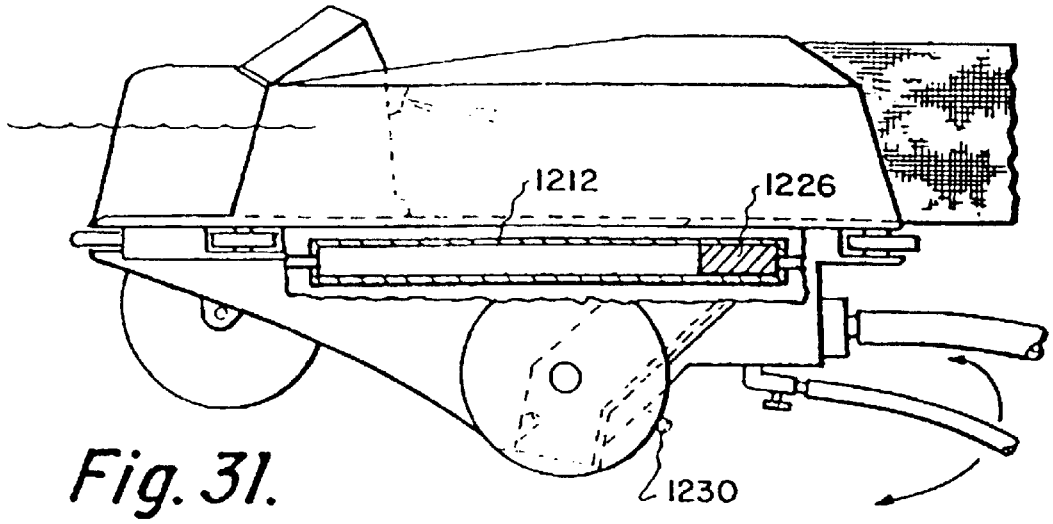

Attention is now directed to FIG. 29 which depicts a functional block diagram similar to FIG. 18C but modified to incorporate various enhancements including in-line filter 1200 and pressure indicator 1206, which are identified to the corresponding elements discussed in conjunction with FIG. 22A. Most significantly, however, FIG. 29 incorporates a pitch control subsystem 1210 which is used to selectively orient the body 6 either (1) nose (i.e., front) up/tail (i.e., rear) down, as represented in FIG. 31, or (2) nose down/tail up as represented in FIG. 30.

The pitch control subsystem 1210 includes a tube 1212 defining an elongate interior volume 1214. The tube defines end fittings 1216 and 1218 respectively coupling opposite ends of the elongate volume 1214 to the outlet ports 1220 and 1222 of level valve 1224.

The tube 1212 contains a weighted member 1226 bearing ring seals 1228. The member 1226 is configured to slide in the elongate volume 1214 from one end to the other with the ring seals 1220 engaging and sealing against the tube interior wall surface. The tube 1212 is mounted on the body 6 extending in the longitudinal direction from front to rear as depicted in FIGS. 30, 31.

Fitting 1216 is coupled to level valve outlet port 1220 which supplies a positive pressure when the water surface cleaning mode is defined by level valve 1224. As a result, weighted member 1226 is forced along tube 1212 toward the rear of body 6 to orient body 6 as shown in FIG. 31 in the nose up pitch orientation.

Fitting 1218 is coupled to level valve outlet port 1222 which supplies a positive pressure when the wall surface cleaning mode is defined to force weighted member 1226 toward the front of body 6 to orient body 6 as shown in FIG. 30 in the nose down pitch orientation.

FIG. 29 depicts a single nozzle 1230 used to provide propulsion thrust when direction valve 1232 defines the forward state. The thrust provided by nozzle 1230 will drive the body 6 either to the water surface or wall surface depending on the body's pitch and will then propel it along the selected surface.

Figure 32:
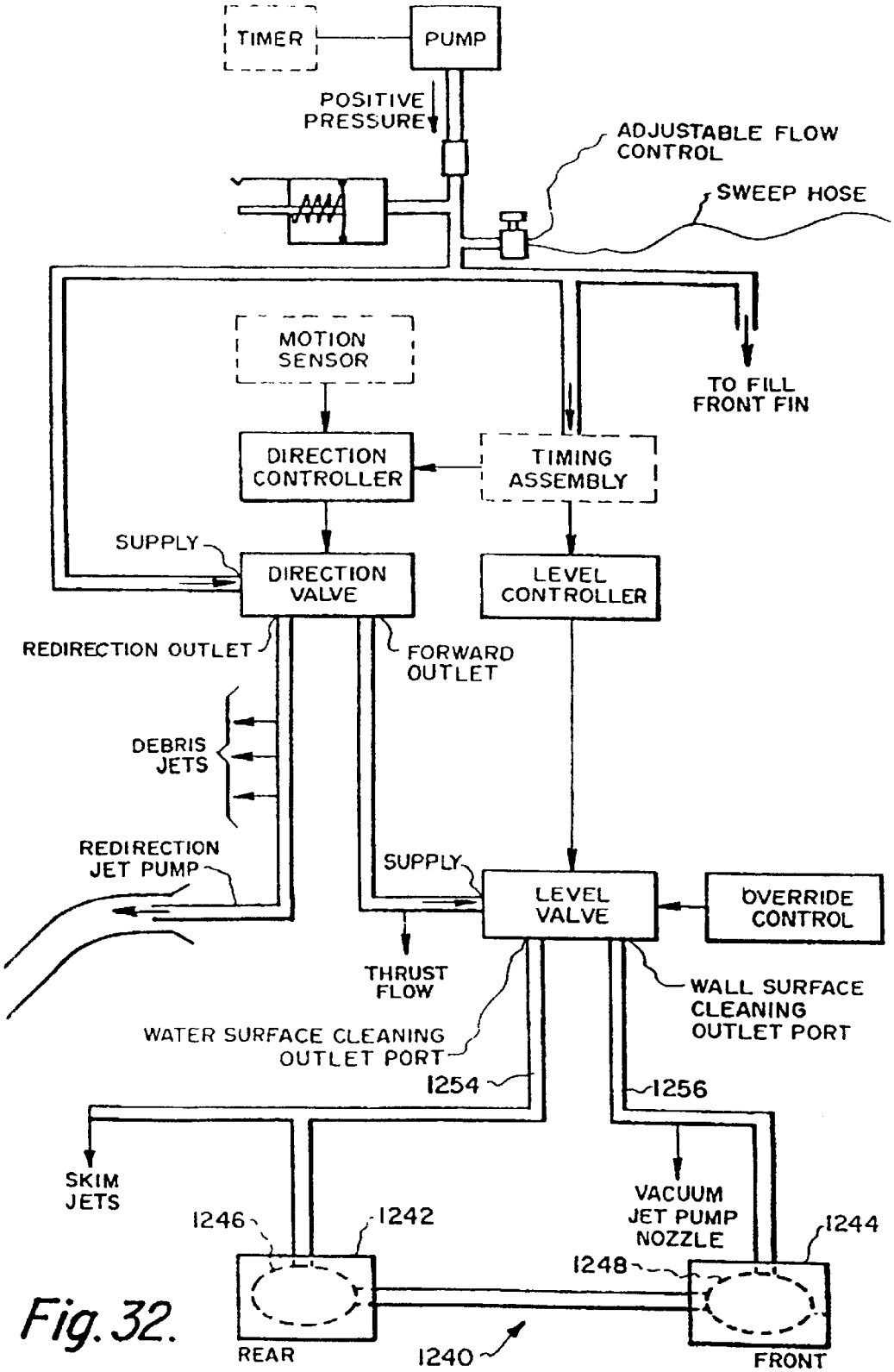
FIG. 32 is a functional block diagram similar to FIG. 29 but showing a buoyancy shift subsystem for controlling body pitch.

FIG. 32 depicts a functional block diagram identical to FIG. 29 except that it uses buoyancy shift pitch control rather than the weight shift pitch control used in FIG. 29. More particularly, FIG. 32 shows a buoyancy shift pitch control subsystem 1240 comprised of chambers 1242 and 1244 respectively containing flaccid bags 1246 and 1248. An air tube 1250 couples the bags 1246 and 1248 which together contain sufficient air to fully distend one of the bags.

The chambers 1242 and 1244 are respectively coupled to the water surface cleaning port 1254 and the wall surface cleaning port 1256. When port 1254 supplies a positive pressure to chamber 1242, it acts to squeeze the air out of bag 1246 and transfer it to bag 1248 housed in chamber 1244 located at the front of body 6. This increases the buoyancy of the body front end and consequently orients the body nose up. On the one hand, when port 1256 supplies a positive pressure, this squeezes air out of bag 1248 and transfers it via tube 1250 to bag 1246. This increases the relative buoyancy of the body rear end to place it in a nose down pitch.

Figure 33:
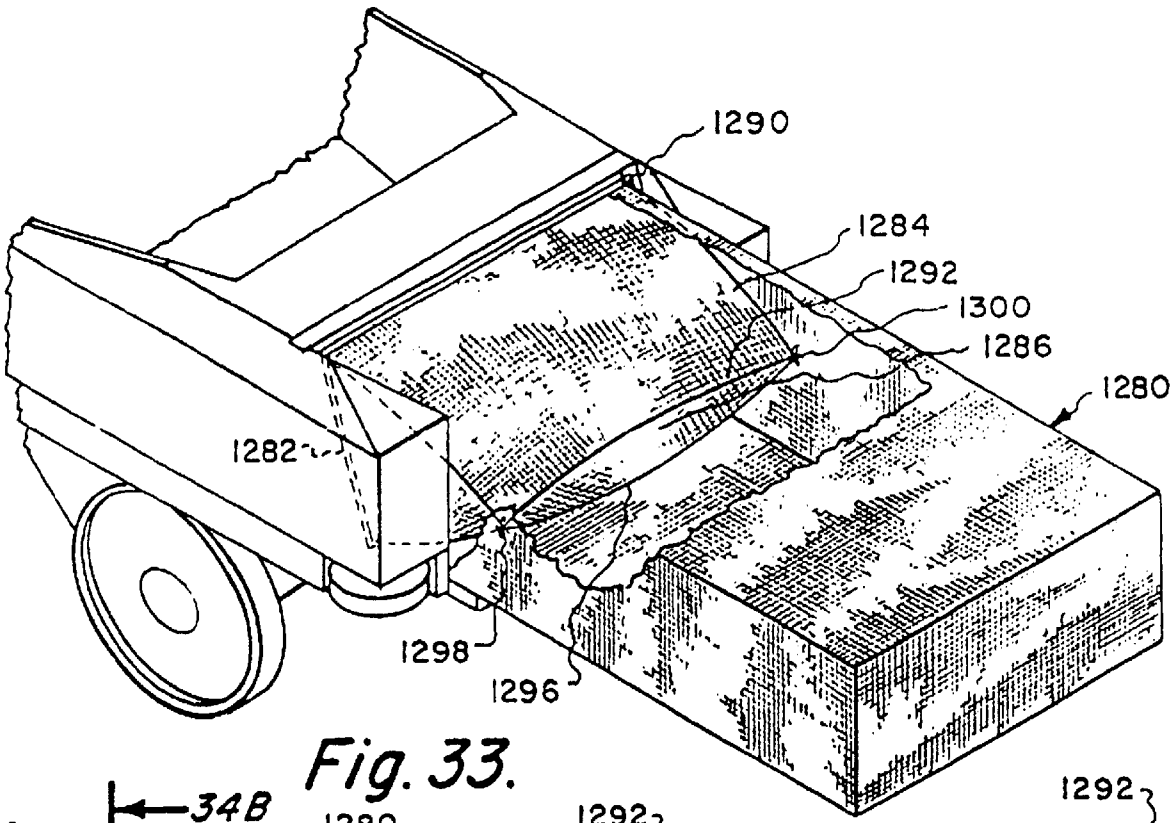
FIG. 33 is an isometric view of a preferred debris bag showing sheets in the bag for permitting debris inflow but blocking debris outflow.

Attention is now directed to FIG. 33 which depicts an enhanced debris bag 1280 formed of a flexible water permeable, preferably mesh, material. The bag defines an entrance opening 1282 for passing water borne debris into the bag when operating in the forward state at either the wall surface or water surface. In order to block debris from exiting the bag when in the redirection or backup state, one or more flexible baffle sheets is mounted in the bag proximate to the bag opening 1282.

More particularly, FIGS. 33 and 33A show first and second baffle sheets 1284 and 1286, each depicted as being substantially rectangular. Sheet 1284 defines upstream edge 1290 and downstream edge 1292. Sheet 1268 defines upstream edge 1294 and downstream edge 1296. Upstream edges 1290 and 1294 are secured along their lengths to bag 1280 adjacent to opening 1282. The corners of downstream edges 1292 and 1296 are secured to the bag sides as 1298 and 1300.

Figure 34C:
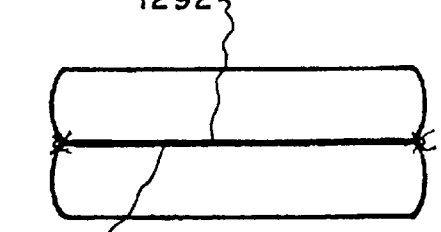
FIG. 34C is a view identical to FIG. 24B but showing the sheet edges closed to block debris outflow.
Figure 34B:
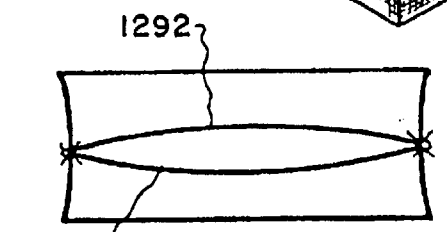
FIG. 34B is a schematic sectional representation taken along line 34B—34B of FIG. 34A.
Figure 34A:
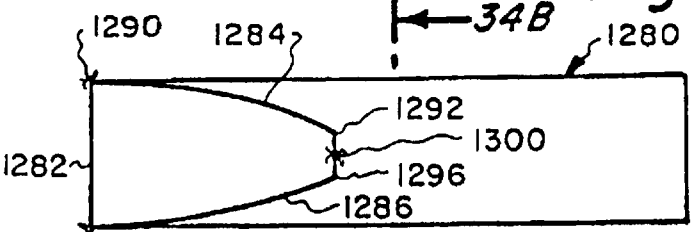
FIG. 34A is a schematic side representation of the debris bag showing its interior sheets open to permit debris entry.

In the forward state, water and debris flows into the bag from opening 1282, between sheets 1284 and 1286 and acts to separate the downstream edges 1292 and 1296 as shown in FIG. 34B, allowing debris to move therepast. When the redirection state is defined to move the body laterally and/or rearwardly through the water, water may tend to move through the bag toward the opening 1282. This action causes the edges 1292 and 1294 to close, i.e, move adjacent to one another to effectively block debris from exiting from the bag opening 1282.

From the foregoing, it should be appreciated that a method and apparatus has been disclosed herein responsive to a positive pressure water source for cleaning the interior surface of a pool containment wall and the upper surface of a water pool contained therein. Apparatus in accordance with the invention includes an essentially unitary cleaner body and a level control subsystem for selectively moving the body to a position either proximate to the surface of the water pool for water surface cleaning or proximate to the interior surface of the containment wall for wall surface cleaning.

The invention can be embodied in a cleaner body having a weight/buoyancy characteristic to cause it to normally rest either (1) proximate to the pool bottom adjacent to the wall surface (i.e., heavier-than-water) or (2) proximate to the water surface (i.e., lighter-than-water). With the heavier-than-water body, the level control subsystem in an active state produces a vertical force component for lifting the body to proximate to the water surface for operation in a water surface cleaning mode. With the lighter-than-water body, the level control subsystem in an active state produces a vertical force component for causing the body to descend to the wall surface for operation in the wall surface cleaning mode. The level control subsystem can produce the desired vertical force component by any of several different mechanisms used alone or in combination; e.g., by discharging an appropriately directed water outflow from the body, by modifying the body's weight/buoyancy characteristic, or by orienting a hydrodynamic surface.

Although the present invention has been described in detail with reference only to a few specific embodiments, those of ordinary skill in the art will readily appreciate that various modifications can be made without departing from the spirit and scope of the invention.

What is claimed:

1. Apparatus configured to be driven by a positive pressure water source for cleaning the interior surface of a containment wall and the upper surface of a water pool contained therein, said apparatus comprising:

a body configured for immersion in said water pool;

means for supplying a positive pressure water flow to said body from said source;

a level control subsystem responsive to said water flow for producing a vertical force to selectively place said body either (1) in a first mode proximate to said water surface or (2) in a second mode proximate to said wall surface below said water surface;

at least one pool water inlet in said body; and a propulsion control subsystem responsive to said water flow for selectively moving said body either (1) along a path adjacent to said water supply for collecting pool water through said inlet from adjacent to said water surface or (2) along a path adjacent to said wall surface for collecting pool water through said inlet from adjacent to said wall surface.

said propulsion control subsystem including a controller for selectively causing said body to move either in a forward direction or in a second direction different from said forward direction;

said controller including (1) a periodic control device for alternately defining first and second conditions and (2)

a motion responsive control device for defining a first condition when the rate of forward motion of said body is greater than a certain threshold and a second condition when the rate of forward motion of said body is less than a certain threshold; and wherein said controller causes said body to move in said second direction when said periodic control device and said motion responsive control device both define said second condition.

2. The method of claim 1 wherein said body has a weight/buoyancy characteristic biased to cause said body to normally rest proximate to said interior wall surface; and wherein said level control subsystem selectively defines an active state for producing a vertical force component for lifting said body to proximate to said water surface.

3. The apparatus of claim 2 wherein said level control subsystem in said active state discharges a water outflow from said body in a direction to produce a vertically upward force on said body to lift said body to said water surface.

4. The apparatus of claim 2 wherein said level control subsystem in said active state produces a water flow to modify said weight/buoyancy characteristic to lift said body to said water surface.

5. The apparatus of claim 1 wherein said body has a weight/buoyancy characteristic biased to cause said body to normally rest proximate to said water surface; and wherein said level control subsystem selectively defines an active state for producing a vertical force component for holding said body proximate to said wall surface.

6. The apparatus of claim 1 further including:

means for removing debris from pool water collected through said inlet.

7. The apparatus of claim 6 wherein said means for removing debris includes a water permeable debris container for retaining debris removed from water received through water inlet.

8. The apparatus of claim 1 wherein said pool water inlet comprises a wall surface inlet port; and means for creating a suction adjacent to said inlet port when said body is proximate to said wall surface for drawing in pool water from proximate to said wall surface.

9. The apparatus of claim 8 wherein said body defines a discharge port communicating with said wall surface inlet port; and a debris container mounted adjacent to said discharge port for passing water and retaining debris discharged from said discharge port.

10. The apparatus of claim 9 wherein said debris container comprises a bag formed of mesh material and having an open mouth removably mounted adjacent to said discharge port.

11. The apparatus of claim 1 wherein said pool water inlet comprises a water surface inlet port for passing pool surface water when said body is proximate to said water surface; and a debris container carried by said body for collecting debris borne by said surface water passed through said water surface inlet port.

12. The apparatus of claim 1 wherein said body defines a front portion and a rear portion spaced in a longitudinal direction; and further including a water discharge device carried by said body and responsive to said direction controller second state for discharging a water outflow in a direction having a component oriented substantially perpendicular to said longitudinal direction.

13. The apparatus of claim 12 wherein said water discharge device comprising a jet pump.

14. The apparatus of claim 1 further including a pressure indicator carried by said body for visually indicating the magnitude of positive pressure supplied thereto.

15. The apparatus of claim 1 further including an in-line filter carried by said body for filtering said positive pressure water supplied from said source.

16. Apparatus configured to be driven by a positive pressure water source for cleaning a water pool contained by a containment wall having an interior surface, said apparatus comprising:

a body configured for immersion in and movement through said water pool;

a controller for selectively causing said body to move either in a forward direction or in a second direction different from said forward direction;

said controller including (1) a periodic control device for alternately defining first and second conditions and (2) a motion responsive control device for defining a first condition when the rate of forward motion of said body is greater than a certain threshold and a second condition when the rate of forward motion of said body is less than a certain threshold; and wherein said controller causes said body to move in said second direction when said periodic control device and said motion responsive control device both define said second condition.

17. The apparatus of claim 16 further including a turbine for driving said periodic control device; and a water source for driving said turbine.

18. The apparatus of claim 16 wherein said motion responsive control device includes a paddle mounted for pivotal movement between a first position and a second position; and wherein said paddle is mounted on said body so that forward motion of said body through said water pool at a rate greater than said certain threshold maintains said paddle in said first position.

19. The apparatus of claim 16 further including:

a level controller for selectively moving said body to either the surface of said water pool or to said wall surface.

20. Apparatus configured to be driven by a positive pressure water source for cleaning the interior surface of a containment wall and the upper surface of a water pool contained therein, said apparatus comprising:

a body configured for immersion in said water pool, said body defining a front portion and a rear portion;

means for supplying a positive pressure water flow to said body from said source;

a pitch control subsystem responsive to said water flow to selectively orient said body either (1) front up/rear down or (2) front down/rear up;

at least one pool water inlet in said body; and a propulsion control subsystem responsive to said waterflow for propelling said body in a forward direction to (1) said water surface when said body is oriented front up/rear down for collecting pool water through said inlet from adjacent to said water surface or (2) said wall surface when said body is oriented front down/rear up for collecting pool water through said inlet from adjacent to said wall surface.

21. The apparatus of claim 20 wherein said pitch control subsystem includes a mechanism for selectively shifting weight between said front and rear positions.

22. The apparatus of claim 20 wherein said pitch control subsystem includes a mechanism for selective shifting buoyancy between said front and rear positions.

23. Apparatus configured to be driven by a positive pressure water source for cleaning the interior surface of a containment wall and the upper surface of a water pool contained therein, said apparatus comprising:

a body configured for immersion in said water pool;

means for supplying a positive pressure water flow to said body from said source;

a level control subsystem responsive to said water flow for producing a vertical force to selectively place said body either (1) in a first mode proximate to said water surface or (2) in a second mode proximate to said wall surface below said water surface;

at least one pool water inlet in said body;

a propulsion control subsystem responsive to said water flow for selectively moving said body either (1) along a path adjacent to said water surface for collecting pool water through said inlet from adjacent to said water surface or (2) along a path adjacent to said wall surface for collecting pool water through said inlet from adjacent to said wall surface;

a debris container carried by said body for collecting debris borne by pool water passed through said inlet, said debris container formed of water permeable material and having an entrance opening; and at least one sheet mounted in said container for passing debris borne by water flowing into said container in a first direction and for blocking debris outflow from said container.

24. The apparatus of claim 23 wherein said container is formed of flexible mesh material; and wherein said at least one sheet is comprised of first and second sheets of flexible mesh material each defining a sheet edge; and wherein said first and second sheets are mounted into said container with said respective sheet edges proximate to one another such that water flowing into said container acts to separate said edges to enable debris to flow into said bag and water flowing in an opposite direction acts to close said edges to retain debris in said container.

25. Apparatus configured to be driven by a positive pressure water source for cleaning a water pool, said apparatus comprising:

a body configured for immersion in said water pool;

means for supplying a positive pressure water flow to said body from said source;

at least one pool water inlet in said body;

a debris container carried by said body for collecting debris borne by pool water passed through said inlet, said debris container formed of water permeable material and having an entrance opening; and at least one sheet mounted in said container for passing debris borne by water flowing into said container in a first direction and for blocking debris outflow from said container.

26. Apparatus configured to be driven by a positive pressure water source for cleaning a water pool, said apparatus comprising:

a body configured for immersion in said water pool;

means for supplying a positive pressure water flow to said body from said source; and a pressure indicator carried by said body for visually indicating the magnitude of positive pressure supplied to said body.

27. Apparatus configured to be driven by a positive pressure water source for cleaning a water-pool, said apparatus comprising:

a body configured for immersion in said water pool;

said body defining a water supply inlet adapted for coupling to said water source for receiving a positive pressure water flow therefrom;

a propulsion subsystem carried by said body and coupled to said water supply inlet for receiving a positive pressure water flow therefrom for propelling said body through said water pool; and an in-line filter carried by said body interposed between said water supply inlet and said propulsion subsystem for filtering said positive pressure water flow to said propulsion subsystem.

*28. Apparatus configured to be driven by a positive pressure water source for cleaning a water pool, said apparatus comprising:*

*a body configured for immersion in said water pool;*

*said body defining a water supply inlet adapted for coupling to said water source for receiving a positive pressure water flow therefrom;*

*a valve assembly carried by said body including a valve actuator mounted for reciprocal linear movement between a first position for directing at least a portion of said water flow along a first path to produce a thrust acting to move said body in a forward direction and a second position for directing at least a portion of said water flow along a second path to produce a thrust acting to move said body in a second direction different from said forward direction; and*

*a controller driven by said positive pressure water flow for alternately defining first and second states, said controller configured to apply water pressure to said valve actuator to place said actuator in said first position when said first state is defined and said second position when said second state is defined.*

*29. The apparatus of claim 28 further including:*

*a plurality of wheels carried by said body each having a traction surface for engaging a wall surface to be cleaned, said wheels including at least one front wheel and at least one rear wheel and wherein said front wheel traction surface has a lower coefficient of friction than said rear wheel traction surface.*

*30. Apparatus configured to be driven by a positive pressure water source for cleaning a water pool, said apparatus comprising:*

*a body configured for immersion in said water pool;*

*said body defining a water supply inlet adapted for coupling to said water source for receiving a positive pressure water flow therefrom;*

*a plurality of traction wheels carried by said body for engaging a wall surface to be cleaned, said wheels including at least one front wheel and at least one rear wheel and wherein said wheels collectively define a contact plane tangential to said wheels;*

*said body including a deck having a substantially planar upper surface rearwardly inclined relative to said wheel contact plane;*

*a cross member defining a rearwardly inclined hydrodynamic surface supported above and spaced from said deck upper surface; and*

*a propulsion subsystem carried by said body responsive to said water flow for propelling said body in a forward*

*direction whereby said deck and cross member surfaces moving through said water pool produce a force acting to hold said traction wheels against said wall surface to be cleaned.*

*31. Apparatus configured to be driven by a positive pressure water source for cleaning a water pool, said apparatus comprising:*

*a body configured for immersion in said water pool;*

*said body defining a water supply inlet adapted for coupling to said water source for receiving a positive pressure water flow therefrom;*

*a plurality of rotatable traction wheels carried by said body for engaging a wall surface to be cleaned, said wheels including at least one front wheel and at least one rear wheel and wherein said wheels collectively define a contact plane tangential to said wheels;*

*said body including a deck having a substantially planar upper surface rearwardly inclined relative to said wheel contact plane;*

*a propulsion subsystem carried by said body responsive to said water flow for propelling said body in a forward direction whereby said deck upper surface moving through said water pool produces a force acting to hold said traction wheels against said wall surface to be cleaned;*

*said body defining a vacuum inlet opening located proximate to said wheel contact plane and a rearwardly inclined passageway extending from said vacuum inlet opening to a vacuum discharge opening in said deck upper surface; and*

*a vacuum jet pump nozzle mounted within said passageway proximate to said vacuum inlet opening oriented to discharge a high velocity water stream upwardly and rearwardly through said passageway to create a suction at said vacuum inlet opening for drawing water and debris from adjacent to said wall surface to be cleaned and produce a force acting to hold said traction wheels against said wall surface.*

*32. The apparatus of claim 31 further including a water permeable debris container for collecting water and debris discharged from said vacuum discharge opening.*

* * * * *